(12) United States Patent
Mitani et al.

(10) Patent No.: US 12,543,750 B2
(45) Date of Patent: Feb. 10, 2026

(54) HAND DEVICE, FOOD DISHING DEVICE USING HAND DEVICE, AND FOOD BATCH FORMATION DEVICE

(71) Applicant: NIPPON CAREER INDUSTRY CO., LTD., Matsuyama (JP)

(72) Inventors: Suguru Mitani, Matsuyama (JP); Masakazu Ogiyama, Matsuyama (JP); Yasuo Miwa, Matsuyama (JP); Takahiro Mukai, Matsuyama (JP); Shinji Makino, Matsuyama (JP); Kenji Takechi, Matsuyama (JP); Yu Yamada, Matsuyama (JP)

(73) Assignee: NIPPON CAREER INDUSTRY CO., LTD., Matsuyama (JP)

( * ) Notice: Subject to any disclaimer, the term of this patent is extended or adjusted under 35 U.S.C. 154(b) by 68 days.

(21) Appl. No.: 18/286,996

(22) PCT Filed: Mar. 30, 2022

(86) PCT No.: PCT/JP2022/016182
§ 371 (c)(1),
(2) Date: Oct. 13, 2023

(87) PCT Pub. No.: WO2022/220135
PCT Pub. Date: Oct. 20, 2022

(65) Prior Publication Data
US 2024/0196912 A1    Jun. 20, 2024

(30) Foreign Application Priority Data

Apr. 16, 2021  (JP) .................................. 2021-069994
May 12, 2021  (JP) .................................. 2021-081193

(Continued)

(51) Int. Cl.
*A22C 17/00* (2006.01)
*B25J 9/00* (2006.01)
(Continued)

(52) U.S. Cl.
CPC ......... *A22C 17/0093* (2013.01); *B25J 9/0093* (2013.01); *B25J 9/1612* (2013.01);
(Continued)

(58) Field of Classification Search
CPC ............. B65B 5/04; B65B 5/08; B65B 5/105; B65B 25/065; B65B 35/16; A22C 17/0093;
(Continued)

(56) References Cited

U.S. PATENT DOCUMENTS

| | | |
|---|---|---|
| 7,887,108 B1 | 2/2011 | Cawley et al. |
| 8,172,292 B1 * | 5/2012 | Andersen ............. B25J 15/0293 294/2 |

(Continued)

FOREIGN PATENT DOCUMENTS

| | | |
|---|---|---|
| DE | 102013015000 A1 | 3/2015 |
| EP | 2551222 A1 | 1/2013 |

(Continued)

OTHER PUBLICATIONS

"Partial Supplementary Search Report of Europe Counterpart Application", issued on Mar. 11, 2025, p. 1-p. 12.
(Continued)

*Primary Examiner* — Stephen F. Gerrity
(74) *Attorney, Agent, or Firm* — JCIPRNET

(57) ABSTRACT

A hand device for holding a food article with left and right finger-shaped portions that are configured to be operated to open and close. Each of the left and right finger-shaped portions includes a first member and a second member that are configured to be independently operated to open and close, wherein the first member and the second member are (Continued)

disposed in a vicinity of each other in each of the left and right finger-shaped portion. For each of the left and right finger-shaped portions, an inner edge portion of the first member is configured to be projected and retracted relative to an inner edge portion of the second member when the first member is being operated to open and close.

16 Claims, 51 Drawing Sheets

(30) Foreign Application Priority Data

| May 29, 2021 | (JP) | 2021-090715 |
|---|---|---|
| Oct. 11, 2021 | (JP) | 2021-166614 |
| Jan. 28, 2022 | (JP) | 2022-011365 |
| Feb. 9, 2022 | (JP) | 2022-019117 |
| Mar. 28, 2022 | (JP) | 2022-051335 |

(51) Int. Cl.

| B25J 9/16 | (2006.01) |
|---|---|
| B25J 11/00 | (2006.01) |
| B25J 15/02 | (2006.01) |
| B25J 15/08 | (2006.01) |
| B25J 19/04 | (2006.01) |
| B65B 5/04 | (2006.01) |
| B65B 5/08 | (2006.01) |
| B65B 5/10 | (2006.01) |
| B65B 25/06 | (2006.01) |

(52) U.S. Cl.
CPC ....... *B25J 11/0045* (2013.01); *B25J 15/0293* (2013.01); *B25J 15/08* (2013.01); *B25J 19/04* (2013.01); *B65B 5/04* (2013.01); *B65B 5/08* (2013.01); *B65B 5/105* (2013.01); *B65B 25/065* (2013.01)

(58) Field of Classification Search
CPC ................ B25J 11/0045; B25J 15/0066; B25J 15/0253; B25J 15/0293; B25J 15/08; B25J 15/10; B25J 9/0093; B25J 9/1612; B25J 19/023; B25J 19/04
USPC .................................... 294/67.33, 119.1, 207
See application file for complete search history.

(56) References Cited

U.S. PATENT DOCUMENTS

| 2009/0317221 A1 | 12/2009 | Hawes |
|---|---|---|
| 2011/0265311 A1 | 11/2011 | Kondo et al. |
| 2012/0161459 A1 | 6/2012 | Weber |
| 2018/0178396 A1* | 6/2018 | Ochiishi .............. B25J 15/0253 |
| 2019/0161289 A1 | 5/2019 | Hashimoto et al. |
| 2020/0101617 A1 | 4/2020 | Koike et al. |
| 2020/0180878 A1* | 6/2020 | Ochiishi et al. ..... B25J 15/0293 |
| 2020/0346792 A1* | 11/2020 | Curhan et al. ........ B25J 15/0253 |
| 2021/0291384 A1* | 9/2021 | Chintalapalli Patta et al. ............. B25J 15/0253 |
| 2021/0331327 A1* | 10/2021 | Lee et al. ............. B25J 15/0253 |
| 2022/0371207 A1* | 11/2022 | Wakayama et al. ........................ B25J 15/0293 |
| 2023/0107716 A1* | 4/2023 | Georgeson et al. . B25J 15/0066 156/64 |

FOREIGN PATENT DOCUMENTS

| JP | H03239494 | 10/1991 |
|---|---|---|
| JP | H041838 | 1/1992 |
| JP | H07-329919 A | 12/1995 |
| JP | 2004-25326 A | 1/2004 |
| JP | 2007-307631 A | 11/2007 |
| JP | 2008184265 | 8/2008 |
| JP | 2012030045 | 2/2012 |
| JP | 2014-24159 A | 2/2014 |
| JP | 2015-112684 A | 6/2015 |
| JP | 2015112065 | 6/2015 |
| JP | 2016-52700 A | 4/2016 |
| JP | 2018-153884 A | 10/2018 |
| JP | 2018-203371 A | 12/2018 |
| JP | 2019-10719 A | 1/2019 |
| JP | 6626411 B2 | 12/2019 |
| JP | 2019214435 | 12/2019 |
| JP | 6650119 B1 | 2/2020 |
| JP | 2020-110860 A | 7/2020 |
| WO | WO-2018/202286 A1 | 11/2018 |
| WO | WO-2021/006147 A1 | 1/2021 |

OTHER PUBLICATIONS

"Notice of Reasons for Refusal of Japan Counterpart Application", issued on May 26, 2025, with English translation thereof, p. 1-p. 10.
"Search Report of Europe Counterpart Application", issued on Jun. 4, 2025, p. 1-p. 10.
International Search Report for PCT/JP2022/016182, mailed Jun. 21, 2022.
"Notice of Reasons for Refusal of Japan Counterpart Application, Application No. 2021-166614", issued on Nov. 5, 2025, with English translation thereof, p. 1-p. 6.
"Notice of Reasons for Refusal of Japan Counterpart Application, Application No. 2022-019117", issued on Nov. 5, 2025, with English translation thereof, p. 1-p. 8.

\* cited by examiner

HAND DEVICE, FOOD DISHING DEVICE USING HAND DEVICE, AND FOOD BATCH FORMATION DEVICE

TECHNICAL FIELD

The present disclosure relates to a hand device of a robot arm or the like, a food arrangement device for arranging food using the hand device, and a food batch formation device for forming a food batch.

BACKGROUND ART

For example, in a food processing factory, a cutting apparatus is used to cut a block of food such as raw meat at predetermined intervals from its leading end. Multiple food articles (such as meat slices) thus cut to a predetermined thickness are manually scooped from the conveyor and arranged on food trays.

The food articles that are arranged on a tray and form a batch (food batch) are packed together with the tray, labeled with the type of food, measured total weight, price, and the like, and then shipped as a product.

In recent years, attempts have been made to automate the formation of such food batches. Patent Literature 1 discloses a technique that forms a food batch by repeatedly collecting and transferring food on a conveyor using a suction head of a robot arm.

Also, a technique is disclosed that collects the food batch by gripping it with a pair of gripping members of a hand device and arranges it on a tray.

CITATION LIST

Patent Literature

Patent Literature 1: Japanese Patent No. 6626411

SUMMARY OF INVENTION

Technical Problem

However, when the technique of Patent Literature 1 is used to collect food that contains fat, such as raw meat, or sticky food, through suction or gripping, the food adheres to the suction head or the gripping members.

Thus, the food is not easily removed when the suction or gripping is discontinued, making it difficult for the collected food to be placed at an appropriate position in a stable orientation.

Also, the technique disclosed in Patent Literature 1 merely collects and moves food and fails to arrange the shape of the collected food into a predetermined shape for placement.

Furthermore, a block of food, such as raw meat, does not have a uniform cross-sectional shape from the leading end to the trailing end, and its cross-sectional shape changes irregularly. Accordingly, slicing the block to a uniform thickness does not result in sliced food articles of a uniform size (e.g., surface area) or weight.

As such, when batches are formed of the same number of cut food articles, these food batches vary in weight.

When the food batches vary in weight, the weights and the resulting prices, which are indicated on the batches as products, are less likely to be in the same range. This causes a problem where manual weight adjustment (such as adding a food piece) is required, lowering the production efficiency.

It is an objective of the present disclosure to achieve a hand device that is capable of placing collected food at an appropriate position in a stable orientation and arranging and placing the collected food in a predetermined shape, a food arrangement device that arranges food at an appropriate position in a stable orientation using the hand device, and a food batch formation device that is capable of automatically adjusting the weight of a food batch formed using the hand device to be within a set range to improve production efficiency.

Solution to Problem

In order to achieve these foregoing objectives, the present disclosure takes the following technical measures.

A first aspect of the present disclosure provides a hand device for holding a food article with left and right finger-shaped portions that are configured to operate to open and close. The hand device is characterized in that each of the left and right finger-shaped portions includes a first member and a second member that are configured to independently operate to open and close. The first member and the second member are disposed in a vicinity of each other in each finger-shaped portion. An inner edge portion of the first member is configured to project and retract relative to an inner edge portion of the second member.

A second aspect of the present disclosure provides the hand device according to the first aspect, in which the second member includes a space portion, and the inner edge portion of the first member is configured to project from and retract into the space portion.

A third aspect of the present disclosure provides the hand device according to the first aspect or the second aspect, in which the inner edge portion of each of the left and right first members and the left and right second members is formed in an up-down direction, and lower end portions of the left and right first members include engagement portions extending toward each other.

A fourth aspect of the present disclosure provides the hand device according to the first, second, or third aspect, in which, when the hand device holds a food article with the left and right finger-shaped portions, the left and right first members operate in closing directions before the left and right second members, and the inner edge portions of the left and right first members project inward beyond the inner edge portions of the left and right second members. When the hand device removes the held food article from the left and right finger-shaped portions, the left and right first members open before the second members, and the inner edge portions of the left and right first members retract outward beyond the inner edge portions of the left and right second members.

A fifth aspect of the present disclosure provides the hand device according to any one of the first to fourth aspects, in which a driving device is disposed in an upper portion of the hand device, the driving device being configured to cause the left and right first members to open and close and cause the left and right second members to open and close.

A sixth aspect of the present disclosure provides the hand device according to any one of the first to fifth aspects, further including a removal aid means configured to operate in conjunction with opening operation of the left and right first members to aid removal of the held food article. The removal aid means includes a means for ejecting fluid toward a center position between the left and right finger-shaped portions or a position adjacent to the center position.

A seventh aspect of the present disclosure provides a food arrangement device using the hand device according to any one of the first to sixth aspects further including a controller configured to perform the steps of: holding a middle portion in a length direction of a food article located at a collection position with the left and right finger-shaped portions of the hand device to cause opposite end portions of the food article to hang down; moving the hand device to a position above a set region that is spaced apart from the collection position; and lowering and laterally moving the hand device relative to the set region to bring the food article into contact with the set region from a hanging end side of the food article, cause the food article to lay down in a folded state, and discontinue the hold by the left and right finger-shaped portions.

An eighth aspect of the present disclosure provides a food batch formation device using the hand device according to any one of the first to fifth aspects. The food batch formation device includes a controller configured to perform the steps of: holding a middle portion in a length direction of a food article located at a collection position by operating the left and right first members and the left and right second members in closing directions and lifting the hand device to collect the food article with opposite end portions of the food article hanging down; moving the hand device that has collected the food article to a position above a set region that is spaced apart from the collection position; and lowering the hand device while laterally moving the hand device at the position above the set region and operating the left and right first members and the left and right second members in opening directions to place the food article in the set region in a state of being folded in half. The controller is configured to automatically and repeatedly perform the steps to form a food batch including a plurality of food articles in the set region.

A ninth aspect of the present disclosure provides a food batch formation device using the hand device according to the sixth aspect. The food batch formation device includes a controller configured to perform the steps of: holding a middle portion in a length direction of a food article located at a collection position by operating the left and right first members and the left and right second members in closing directions and lifting the hand device to collect the food article with opposite end portions of the food article hanging down; changing an orientation in plan view of the hand device that has collected the food article and moving the hand device to a position above a set region that is spaced apart from the collection position; and lowering the hand device while moving the hand device in a direction opposite to a moving direction in the immediately prior step at the position above the set region and removing the held food article by operating the left and right first members and the left and right second members in opening directions and operating the removal aid means to place the food article in the set region in a state of being folded in half. The controller is configured to automatically and repeatedly perform the steps to form a food batch including a plurality of food articles in the set region.

A tenth aspect of the present disclosure provides the hand device according to any one of the first to sixth aspects, further comprising a scooping portion configured to advance into and retract from a space between the left and right finger-shaped portions. The scooping portion includes a belt-shaped conveyance member that is inclined at a predetermined angle with respect to an up-down direction.

An eleventh aspect of the present disclosure provides the hand device according to the tenth aspect, in which, when the scooping portion advances to between the left and right finger-shaped portions, the left and right first members operate in the closing directions before the left and right second members. The left and right first members are configured to open before the scooping portion retracts from between the left and right finger-shaped portions. The left and right second members are configured to open in a process in which the scooping portion retracts from between the left and right finger-shaped portions or when the scooping portion has retracted from between the left and right finger-shaped portions.

A twelfth aspect of the present disclosure provides a food batch formation device using the hand device according to the tenth or eleventh aspect. The food batch formation device comprising a controller configured to perform the steps of: scooping a food article located at a collection position obliquely upward with the scooping portion of the hand device and operating the left and right first members and the left and right second members in closing directions to collect the scooped food article in a state of being deformed in a shape of letter U; moving the hand device that has collected the food article to a position above a set region that is set on a base surface of a tray or the like spaced apart from the collection position; and operating the left and right first members in opening directions at a position above the set region and lowering the food article obliquely downward with the scooping portion while limiting opening of an end portion of the food article with the second members to place the food article remaining in the shape of letter U in plan view in the set region. The controller is configured to automatically and repeatedly perform the steps to form a food batch including a plurality of food articles in the set region.

A thirteenth aspect of the present disclosure provides a hand device attachable to a distal end of a robot arm. The hand device is characterized by a collection portion including an upper belt and a lower belt extending obliquely downward, a belt drive source configured to drive and rotate the upper belt and the lower belt in forward and reverse directions, a folding portion configured to fold, toward the lower belt, an end portion of a food article that is scooped by the upper belt and thus hangs down, and a folding portion drive source configured to cause the folding portion to perform folding operation and unfolding operation.

A fourteenth aspect of the present disclosure provides a food arrangement device using the hand device according to the thirteenth aspect. The food arrangement device comprising a controller configured to: allow for selection between a first state in which the folding portion folds both end portions of the food article and a second state in which the folding portion folds only one end portion of the food article, scoop a central portion in a length direction of the food article with the upper belt when the first state is selected, and scoop a section that is offset from the central portion in the length direction of the food article by a set distance with the upper belt when the second state is selected.

A fifteenth aspect of the present disclosure provides a food batch formation device using the hand device according to the thirteenth aspect. The food batch formation device includes a controller configured to perform the steps of: moving a distal end of the upper belt along a food placement surface and toward a food article at a collection position, lifting the hand device during or after scooping of the food article with an upper surface side of the upper belt that drives and rotates in the forward direction, and folding a hanging end portion of the food article with the folding portion toward a lower surface side of the lower belt; moving the hand device to a position above a set region that is spaced apart from the collection position; and driving and rotating the upper belt and the lower belt in the reverse direction while retracting the distal end of the upper belt, removing the scooped food article from the upper belt and the lower belt, and placing the food article in the set region. The controller is configured to automatically and repeatedly perform the steps to form a food batch including a plurality of food articles in the set region.

A sixteenth aspect of the present disclosure provides the food batch formation device according to claim the eighth, ninth, twelfth, or fifteenth aspect, in which a number of food articles forming the food batch is automatically changed according to sizes of the food articles to adjust a weight of the food batch to be within a set range.

A seventeenth aspect of the present disclosure provides the food batch formation device according to the eighth, ninth, twelfth, or fifteenth aspect, in which a plurality of rows and a plurality of columns for arranging food articles are set in the set region. A number of columns in each row is automatically changed according to a size of a food article to adjust a weight of the food batch to be within a set range.

An eighteenth aspect of the present disclosure provides the food batch formation device according to the eighth, ninth, the twelfth, or fifteenth aspect, in which a plurality of rows and a plurality of columns for arranging food articles are set in the set region, and a number of columns in each row, or a number of columns in each row and intervals between the columns are automatically changed according to a size of the food article to be placed at a beginning of each row.

A nineteenth aspect of the present disclosure provides the food batch formation device according to the sixteenth, seventeenth, or eighteenth aspect, further including an image-capturing means for capturing an image of a food article before being collected at the collection position. A size of the food article is obtained from an image-capturing result of the image-capturing means.

A twentieth aspect of the present disclosure provides the food batch formation device according to any one of the sixteenth to nineteenth aspects, in which, when a size of the food article is smaller than a set size, collection of this food article is automatically prohibited.

Advantageous Effects of Invention

The hand device of the present disclosure can place collected food at an appropriate position in a stable orientation.

Also, the hand device can arrange the collected food in a predetermined shape and place it at an appropriate position in a stable orientation.

Furthermore, the food arrangement device using this hand device can arrange the collected food at an appropriate position and in a stable orientation.

The food batch forming method using the hand device can adjust the weight of the formed food batch to be within a set range and improve production efficiency by reducing manual weight adjustment.

DESCRIPTION OF EMBODIMENTS

In the embodiments described in detail below, the target food article is described as raw meat slices E obtained by slicing a chilled block of meat with a slicer 1.

Also, the meat slice E may be a slice that is cut with the slicer 1 and then folded in half.

The food article as used herein is not limited to the meat slice E, and may be other food such as food dough having flexibility or stickiness.

First Conveyance Apparatus and Second Conveyance Apparatus

Figure 1:
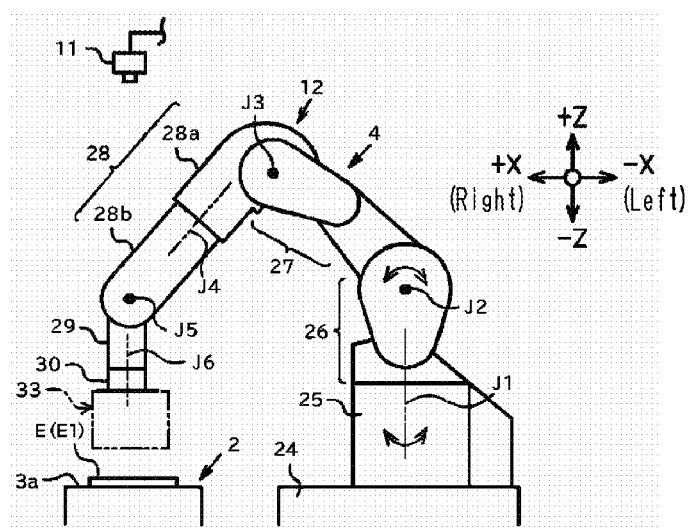
FIG. 1 is a schematic side view of a food arrangement device (food batch formation device) of a first embodiment.
Figure 2:
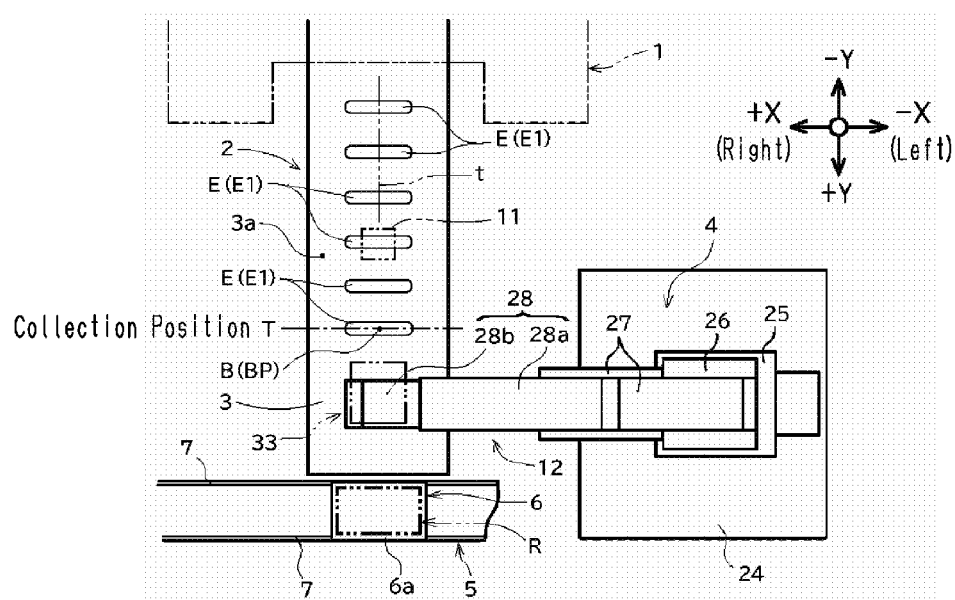
FIG. 2 is a schematic plan view of the food arrangement device of the first embodiment.

As shown in FIGS. 1 and 2, a meat slice E cut and discharged from the slicer 1 is conveyed by a first conveyance apparatus 2 of the slicer 1.

Definition of Directions

In the conveyance direction of the first conveyance apparatus 2, the side corresponding to the slicer 1 is the upstream side, and the opposite side is the downstream side.

In the following figures, −Y indicates the upstream direction and +Y indicates the downstream direction.

+X indicates the right-hand direction when facing the downstream side from the slicer 1, and −X indicates the left-hand direction when facing the downstream side from the slicer 1.

+Z indicates an upward direction, and −Z indicates a downward direction. The directions indicated by X, Y, and Z are perpendicular to each other, and each serves as a three-dimensional coordinate axis.

Accordingly, a meat slice E cut and discharged from the slicer 1 is placed on a conveyance surface 3a of a belt 3 of the first conveyance apparatus 2 such that its length (width) in the X-axis direction is longer than the length in the Y-axis direction.

The food arrangement device (or food batch formation device) 4 is arranged on the left side of the first conveyance apparatus 2 on the downstream side.

The first conveyance apparatus 2 is a belt conveyor in which an endless belt 3 is looped around a group of driven rollers and a drive roller (both not shown).

At the terminal end of the first conveyance apparatus 2, a second conveyance apparatus 5, which is perpendicular to the conveyance direction of the first conveyance apparatus 2 in plan view and extends in the right-left direction, is arranged.

The second conveyance apparatus 5 conveys food trays 6 to a standby position at the conveyance termination end of the first conveyance apparatus 2. The second conveyance apparatus 5 is a chain conveyor in which an endless chain 7 is looped around a driven sprocket and a driving sprocket (both not shown).

The second conveyance apparatus 5 may be a belt-type conveyor that conveys trays 6 in an arranged state.

Figure 18:
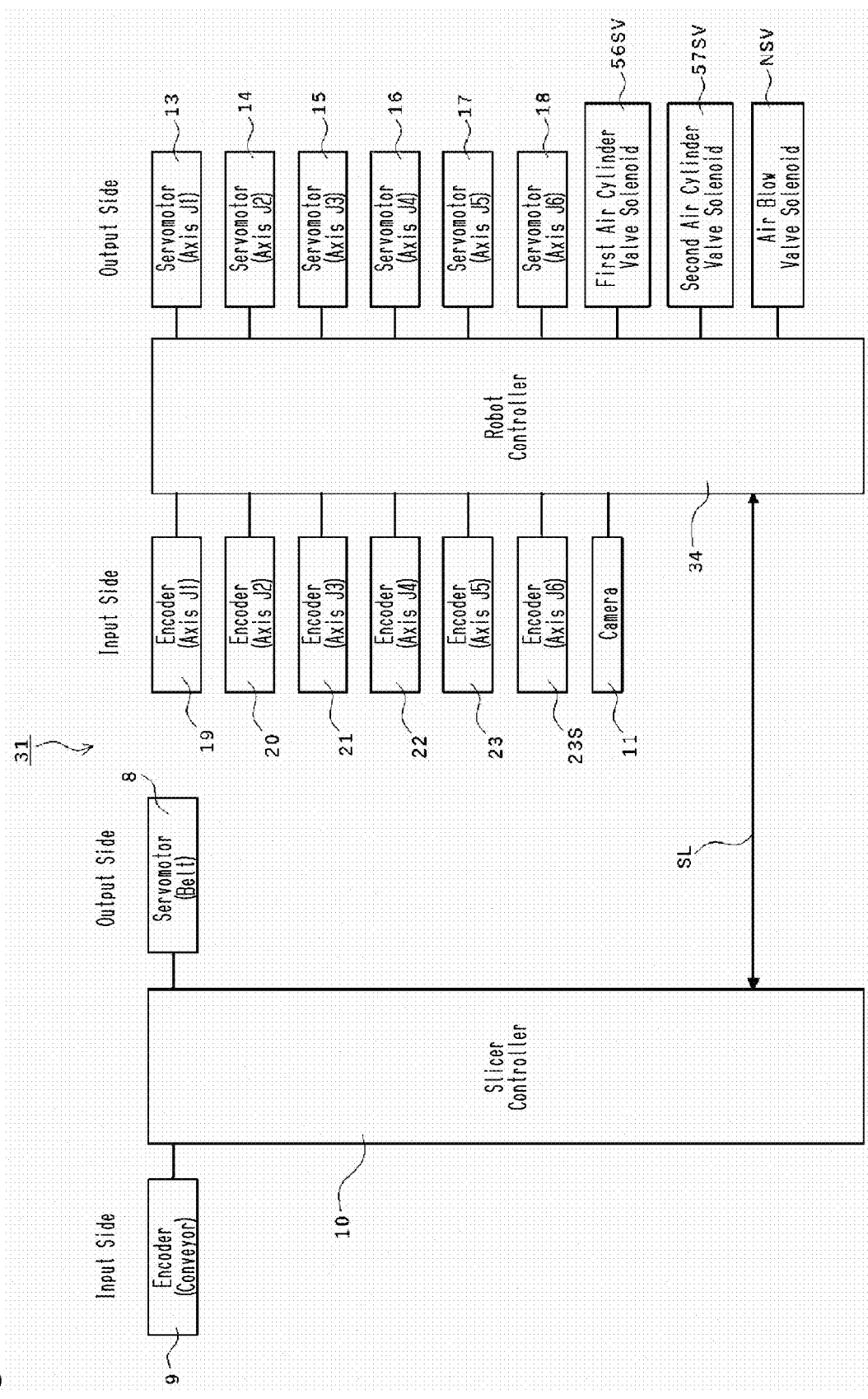
FIG. 18 is a block diagram of a food arrangement controller of an embodiment.

Also, a servomotor 8 shown in FIG. 18 drives the belt 3 of the first conveyance apparatus 2.

An encoder 9 shown in FIG. 18 detects the rotation phase of this servomotor 8, and the detection value is input to a slicer controller 10.

An output from the slicer controller 10 controls the servomotor 8 to drive the belt 3, thereby conveying a meat slice E on the belt 3 to a collection position T shown in FIG. 2.

When a meat slice E is conveyed to the collection position T by the driving of the belt 3, the belt 3 stops temporarily (for a very short time). In this stopped state, the meat slice E at the collection position T is collected.

Meanwhile, the second conveyance apparatus 5 stops conveying the tray 6 until the food arrangement device 4 completes the arrangement of the set number of meat slices E on this tray 6 (until the formation of a food batch is completed).

After the completion of arrangement of meat slices E on the tray 6, the second conveyance apparatus 5 is driven to carry out this tray 6 and move the next empty tray to the above-mentioned standby position.

Camera

As shown in FIGS. 1 and 2, a camera (image-capturing means in the claims) 11 is placed at a position that is higher than and upstream of the collection position T to capture an image of the meat slice E on the conveyance surface 3a before being conveyed to the collection position T (before being collected).

Robot Arm

As shown in FIGS. 1 and 2, the food arrangement device 4 is a robot having a robot arm 12.

The robot arm 12 is configured to selectively swivel as a whole, and its portions can selectively pivot about axes J1 to J6 of multiple active joints.

As shown in FIG. 18, all axes J1 to J6 of the active joints have servomotors 13 to 18, and these servomotors 13 to 18 have respective encoders 19 to 23S as rotational position detectors.

Also, the robot arm 12 includes a base 25, a swivel base 26, a lower arm 27, an upper arm 28, a wrist 29, and a hand mount seat 30.

The base 25 is fixed on the floor of a processing factory or on a support base 24 coupled to the slicer 1. On the base 25, the swivel base 26 is placed to selectively swivel about vertical axis J1.

The lower arm 27 is supported on the swivel base 26 so as to selectively pivot upward and downward about horizontal axis J2. At the upper end of the lower arm 27, a base 28a of the upper arm 28 is supported so as to selectively pivot upward and downward about horizontal axis J3.

A rotation member 28b attached to the distal end of the base 28a is supported so as to selectively rotate about axis J4 extending along the axis of the base 28a. Axis J4 is perpendicular to axis J3.

The wrist 29 is supported by the distal end of the rotation member 28b so as to selectively pivot about lateral axis J5. This axis J5 is perpendicular to axis J4.

The hand mount seat 30 is attached to the distal end of the wrist 29 so as to selectively swivel about vertical axis J6.

The servomotors 13 to 18 for axes J1 to J6 are configured to be driven by an output from a robot controller 34 of the food arrangement controller 31, which will be described below.

Set Region R

As shown in FIG. 2, a set region (arrangement region) R is set on the base surface of the tray 6 that has been conveyed by the second conveyance apparatus 5 and is on standby at a position that is spaced apart from the termination end of the first conveyance apparatus 2 on the downstream side.

Figure 27:
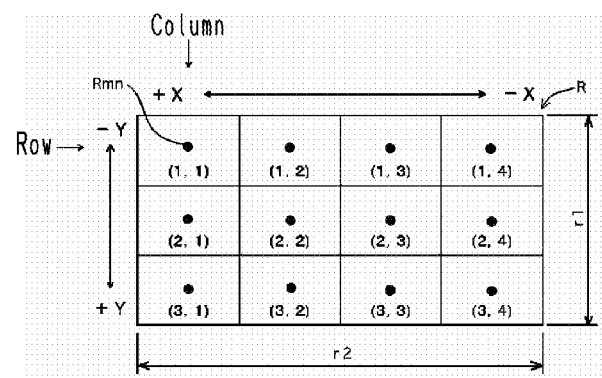
FIG. 27 is an explanatory diagram of food (meat slice) placement segments set in a set region.

As shown in FIG. 27, this set region R is set as a rectangular region having a length in the Y-axis direction of r1 and a length in the X-axis direction of r2.

This set region R can be set at any appropriate location other than the base surface of the tray 6, such as a fixed position near the slicer 1.

Multiple meat slices E are placed in the set region R to form a batch of meat slices E (food batch in the claims).

Definition of Rows and Columns in Set Region R

In the set region R described above, the direction in which meat slices E are successively arranged from one end to the other in the right-left direction of the set region R is defined as a row, and the direction perpendicular to the row is defined as a column.

In this manner, after meat slices E are arranged in one entire row, an arrangement at the beginning of the next row starts. This is repeated to complete arrangement in all rows and all columns in the set region R.

In this embodiment, rows are set in the X-axis direction, and columns are set in the Y-axis direction. As a result, multiple rows are arranged in parallel at intervals in the Y-axis direction.

As shown in FIG. 1, a hand device 33 including a collection portion is attached to the lower surface of the hand mount seat 30.

Figure 3:
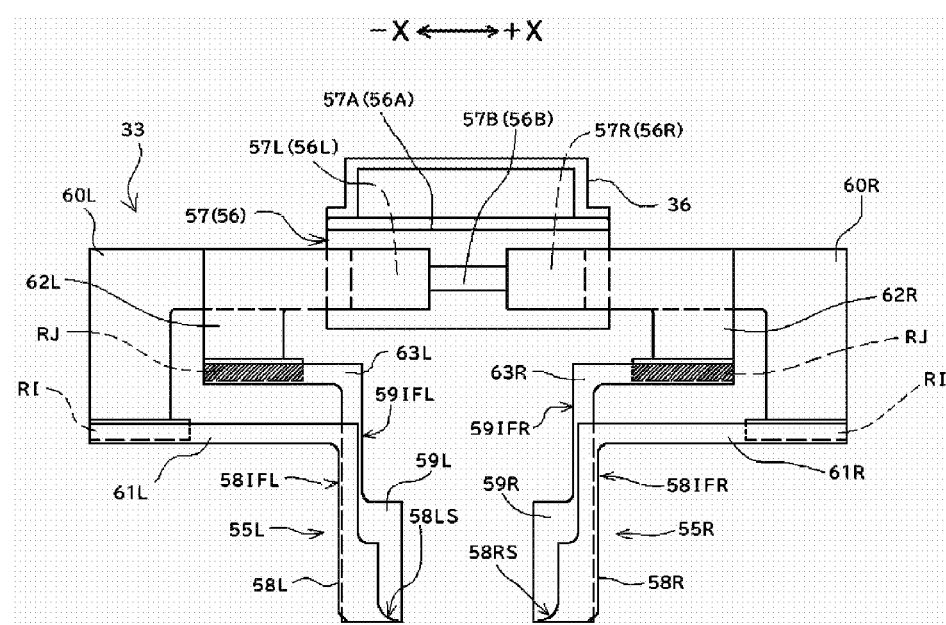
FIG. 3 is a front view for illustrating a hand device.
Figure 4:
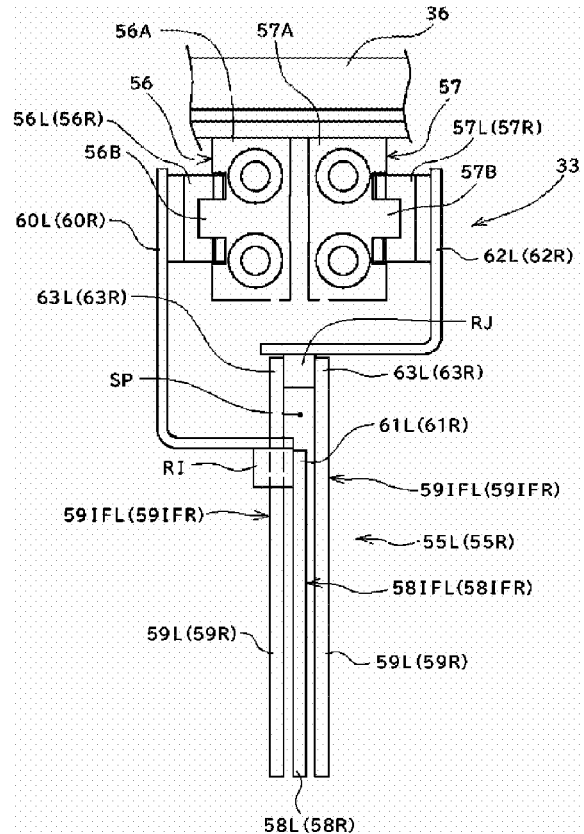
FIG. 4 is a side view for illustrating the hand device.

As shown in FIGS. 3 and 4, the hand device 33 includes a frame 36 as a base, and the upper portion of the frame 36 is attached to the lower surface of the hand mount seat 30 so as to be selectively attached and detached.

First Embodiment

Finger-Shaped Portion

Left and right finger-shaped portions 55L and 55R form the collection portion.

As shown in FIGS. 3 and 4, a first air cylinder (driving device in the claims) 56 and a second air cylinder (driving device in the claims) 57 for opening and closing the left and right finger-shaped portions 55L and 55R are fixed to the lower surface of the frame 36 in parallel and spaced apart from each other.

As such, the first and second air cylinders 56 and 57 are located in the upper portion of the hand device 33 and less likely to be affected by water (such as cleaning water used to clean the slicer 1) or meat scraps.

Figure 5:
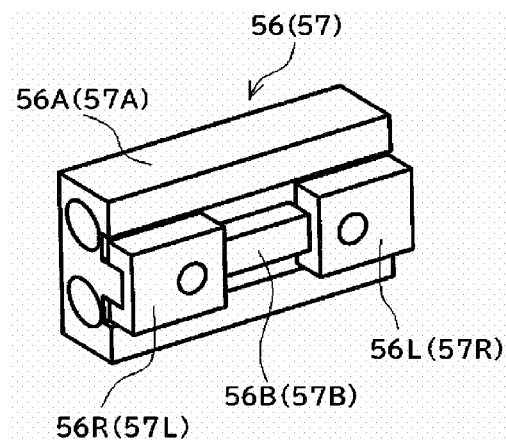
FIG. 5 is a perspective view of an air cylinder portion for opening and closing a finger-shaped portion.

As shown in FIGS. 4 and 5, the first air cylinder 56 on one side includes a cylinder block 56A having an outer side surface including a guide rail 56B extending in the right-left direction.

Two left and right sliders 56L and 56R are fitted to the guide rail 56B in a slidable manner.

Two upper and lower cylinder holes are formed in the cylinder block 56A in parallel in the lateral direction. Each cylinder hole accommodates a separate piston (not shown), which selectively slides in a reciprocating manner. The pistons are coupled to the respective left and right sliders 56L and 56R.

The pistons are configured to slide in directions opposite to each other when air is supplied, so that the left and right sliders 56L and 56R coupled to the pistons slide in directions opposite to each other.

The second air cylinder 57 on the other side includes a cylinder block 57A having an outer side surface including a guide rail 57B extending in the right-left direction.

Two left and right sliders 57L and 57R are fitted to the guide rail 57B in a slidable manner.

Two upper and lower cylinder holes are formed in the cylinder block 57A in parallel in the lateral direction. Each cylinder hole accommodates a separate piston (not shown), which selectively slides in a reciprocating manner. The pistons are coupled to the respective left and right sliders 57L and 57R.

The pistons are configured to slide in directions opposite to each other when air is supplied, so that the left and right sliders 57L and 57R coupled to the pistons slide in directions opposite to each other.

The left and right finger-shaped portions 55L and 55R include left and right first members 58L and 58R and left and right second members 59L and 59R.

First Member

As shown in FIGS. 3 and 4, the left and right first members 58L and 58R are supported by left and right sliders 56L and 56R, respectively, of the first air cylinder 56.

That is, the inner end portions of left and right first support members 60L and 60R, which are plate-shaped and extend in the right-left direction, are fixed to the outer side surfaces of the left and right sliders 56L and 56R.

End portions of the left and right first support members 60L and 60R are extended in the right-left directions, then bent downward to extend downward, and further bent to extend toward the lower side of the first air cylinder 56 in side view.

The left and right extending end portions thus formed have lower surfaces to which the outer end portions of first sub-support members 61L and 61R extending in the right-left direction are fixed through square bar-shaped first reinforcement members RI and RI, respectively.

These left and right first sub-support members 61R and 61L have inner end portions bent and extended downward to form left and right inner fingers 58IFL and 58IFR.

Also, the inner fingers 58IFL and 58IFR each have a section at its lower end that is wider in the right-left direction. This section has a predetermined height from the lower end. These sections that are wider in the right-left direction are referred to as first members 58L and 58R.

The inner edge portions of these left and right first members 58L and 58R are formed to extend in a substantially vertical direction (up-down direction in the claims) to the vicinity of their lower end portions.

Then, at the lower end portions, the inner edges of the left and right first members 58L and 58R extend inward (toward each other in the right-left direction) in arc shapes to form left and right engagement portions 58LS and 58RS.

Second Member

As shown in FIGS. 3 and 4, the left and right second members 59L and 59R are supported by left and right sliders 57L and 57R, respectively, of the second air cylinder 57.

That is, the inner end portions of left and right second support members 62L and 62R, which are plate-shaped and extend in the right-left direction, are fixed to the outer side surfaces of the left and right sliders 57L and 57R.

End portions of the left and right second support members 62L and 62R are bent to extend downward and further bent to extend toward the lower side of the second air cylinder 57 in side view.

The left and right extending end portions thus formed have lower surfaces to which the outer end portions of second sub-support members 63L and 63R extending in the right-left direction are fixed through second reinforcement members RJ and RJ, respectively.

These left and right second sub-support members 63R and 63L have inner end portions bent and extended downward to form left and right outer fingers 59IFL and 59IFR.

Also, the outer fingers 59IFL and 59IFR each have a section at its lower end that is wider in the right-left direction. This section has a predetermined height from the lower end. These sections that are wider in the right-left direction are referred to as second members 59L and 59R.

The inner edge portions of these left and right second members 59L and 59R extend in a substantially vertical direction (up-down direction in the claims) to their lower end portions.

As shown in FIGS. 3 and 4, two sets of a left second sub-support member 63L and a left outer finger 59IFL, which are formed integrally, are provided. One of the sets is fixed to the one side of the left second reinforcement member RJ, and the other set is fixed to the other side.

A gap (space portion in the claims) SP is thus formed between the front and rear second members 59L and 59L.

Additionally, two sets of a right second sub-support member 63R and a right outer finger 59IFR, which are formed integrally, are provided. One of the sets is fixed to the one side of the right second reinforcement member RJ, and the other set is fixed to the other side.

A gap (space portion in the claims) SP is thus formed between the front and rear second members 59R and 59R.

The left and right first members 58L and 58R are arranged to selectively project and retract (project and retract in the claims) relative to the left and right gaps SP and SP, respectively.

As a result, in each finger-shaped portion 55L, 55R, the first member 58L, 58R is positioned close to the second members 59L, 59R.

Removal Aid Means

First Example of Air Blow Type

Figure 6:
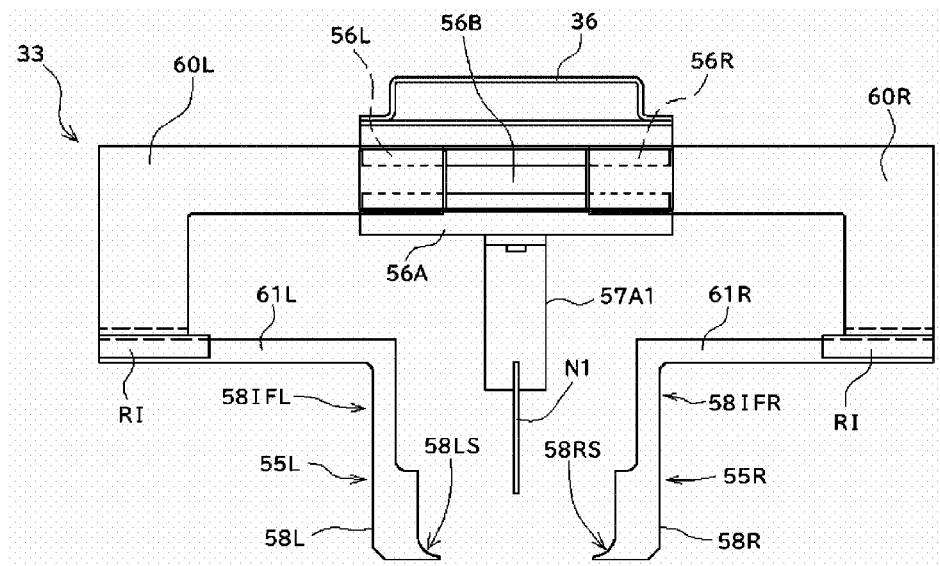
FIG. 6 is a front view for illustrating a hand device of a first example.
Figure 7:
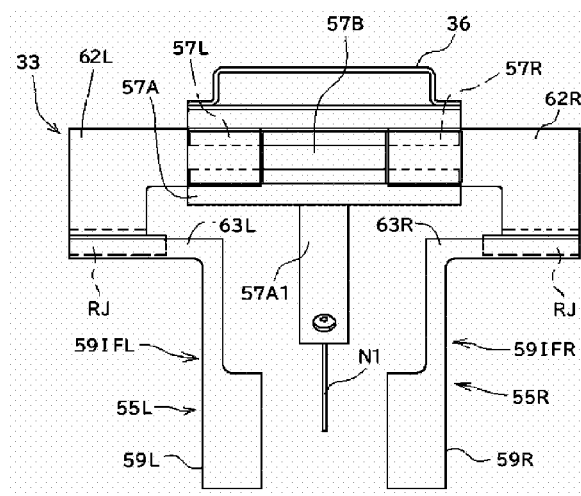
FIG. 7 is a front view for illustrating the hand device of the first example.
Figure 8:
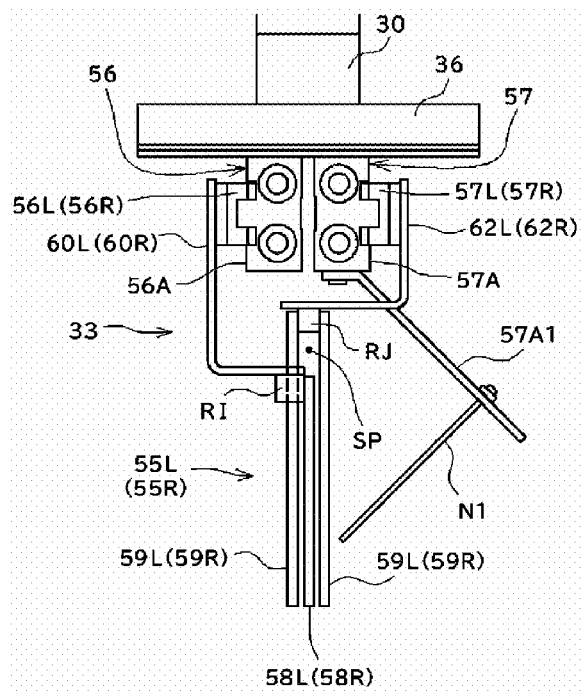
FIG. 8 is a side view for illustrating the hand device of the first example.

In a first example of the hand device 33 shown in FIGS. 6 to 8, the upper end portion of a stay 57A1 is bolted to the lower surface of the cylinder block 57A on one side, and the stay 57A1 extends obliquely downward away from the finger-shaped portions 55L and 55R.

The base of an air blow nozzle N1 (removal aid means in the claims) extends through and is thus attached to the extending end portion of the stay 57A1. The lower end portion of the nozzle N1 extends obliquely downward toward the lower end portions of the finger-shaped portions 55L and 55R.

The lower end portion (distal end portion) of the nozzle N1 is therefore located at the center position between the left and right finger-shaped portions 55L and 55R in front view as shown in FIGS. 6 and 7, and also at a position in the vicinity of (in proximity to) the lower end portion (distal end portion) of the left and right finger-shaped portions 55L and 55R in side view as shown in FIG. 8.

Piping from an air pressure source (not shown) is connected to the base of the nozzle N1.

Second Example of Air Blow Type

Figure 9:
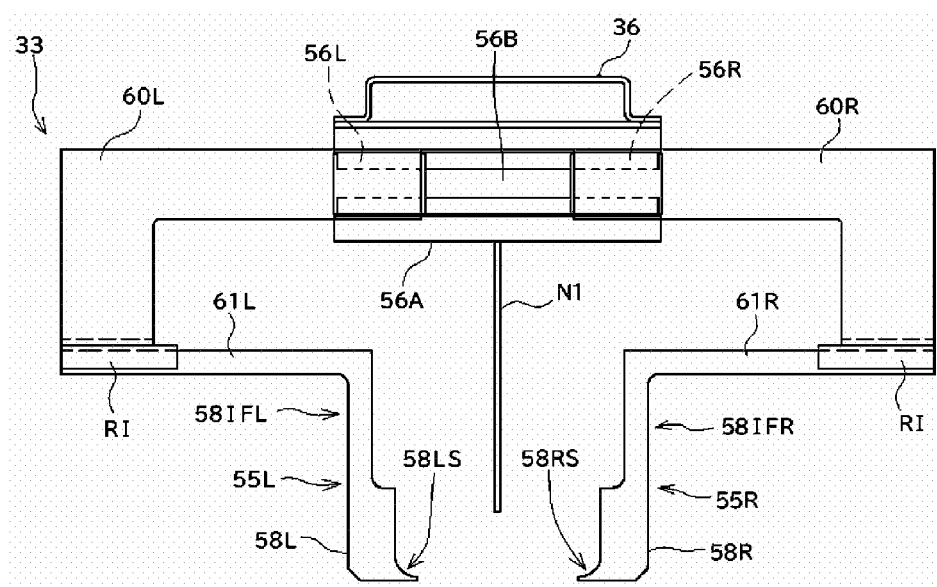
FIG. 9 is a front view for illustrating a hand device of a second example.
Figure 10:
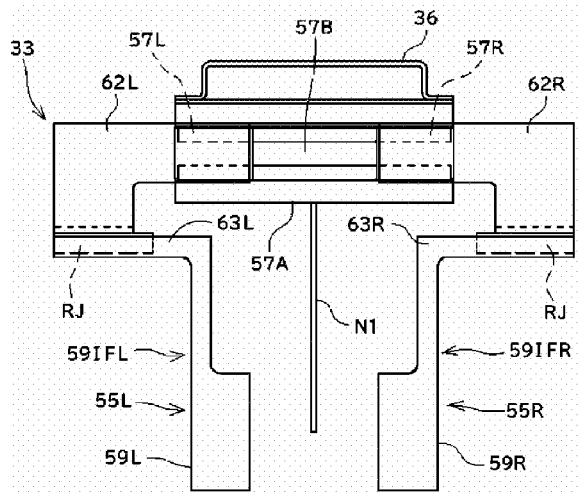
FIG. 10 is a front view for illustrating the hand device of the second example.
Figure 11:
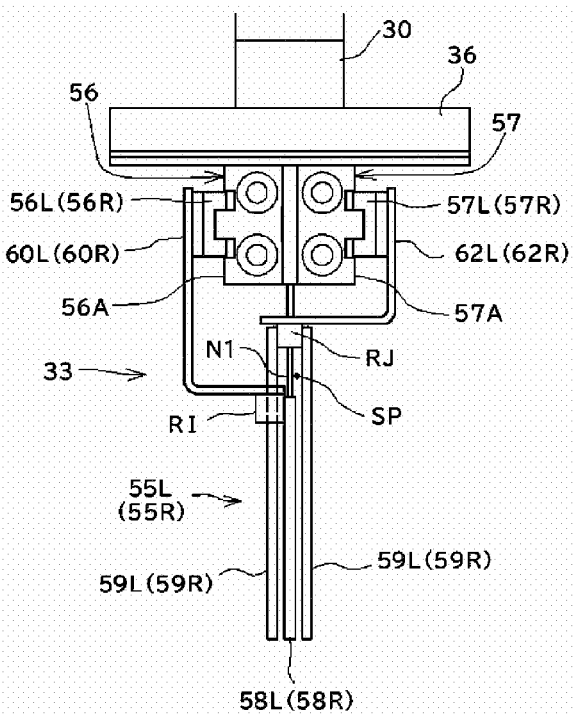
FIG. 11 is a side view for illustrating the hand device of the second example.

FIGS. 9 to 11 shows a second example of a hand device 33 in which an air blow nozzle (removal aid means in the claims) N1 extends downward through a clearance formed between the two cylinder blocks 56A and 57A.

Thus, the nozzle N1 is located at the center position between the left and right finger-shaped portions 55L and 55R in front view as shown in FIGS. 9 and 10, and also a position between the left second members 59L and 59L (between the right second members 59R and 59R) in side view as shown in FIG. 11.

Also, the lower end portion (distal end portion) of the nozzle N1 is located at the center position between the left and right finger-shaped portions 55L and 55R in side view, and also at a position near (in proximity to) the lower end portion (distal end portion) of the left and right finger-shaped portions 55L and 55R in side view.

Piping from an air pressure source (not shown) is connected to the base of the nozzle N1.

Third Example of Air Blow Type

Figure 12:
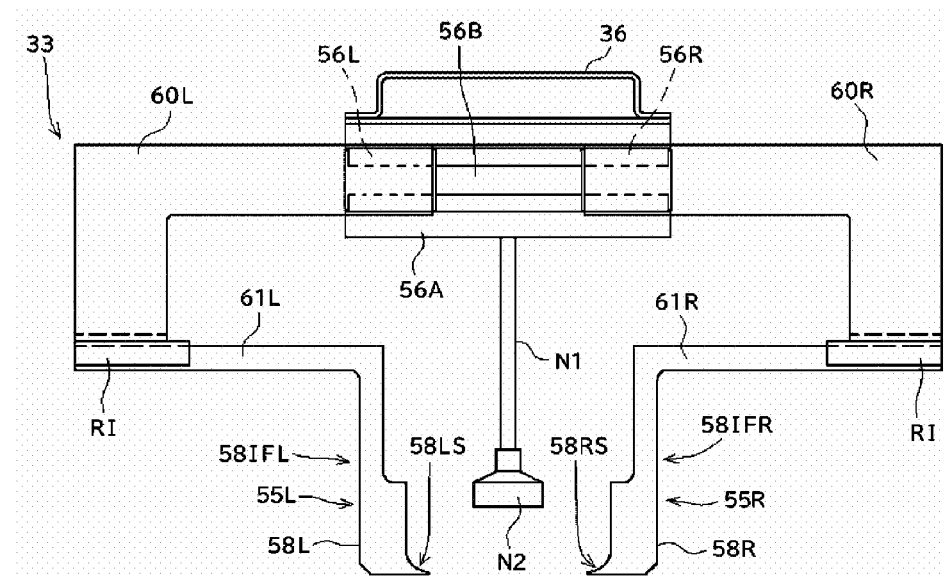
FIG. 12 is a front view for illustrating a hand device of a third example.
Figure 13:
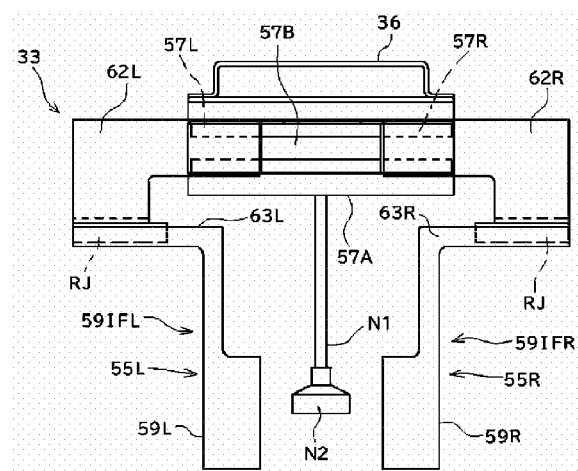
FIG. 13 is a front view for illustrating the hand device of the third example.
Figure 14:
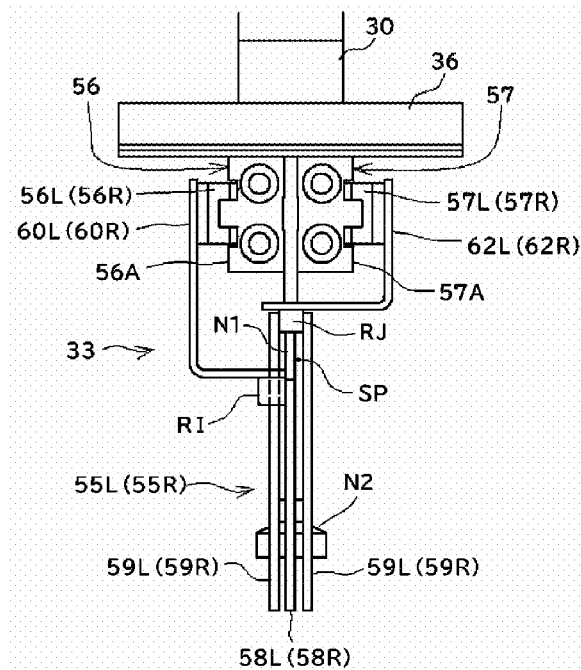
FIG. 14 is a side view for illustrating the hand device of the third example.

FIGS. 12 to 14 show a third example of a hand device 33 in which a diffusion nozzle N2, which discharges and diffuses air, is attached to the lower end portion (distal end portion) of the air blow nozzle N1 (removal aid means in the claims) of the second example.

The other configurations are the same as those of the second example.

Fourth Example of Air Blow Type

Figure 15:
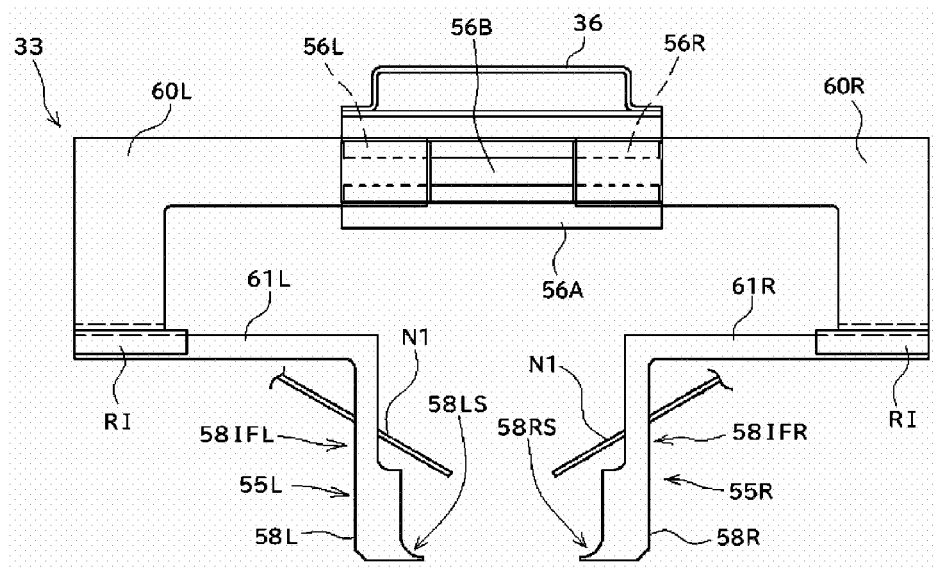
FIG. 15 is a front view for illustrating a hand device of a fourth example.
Figure 16:
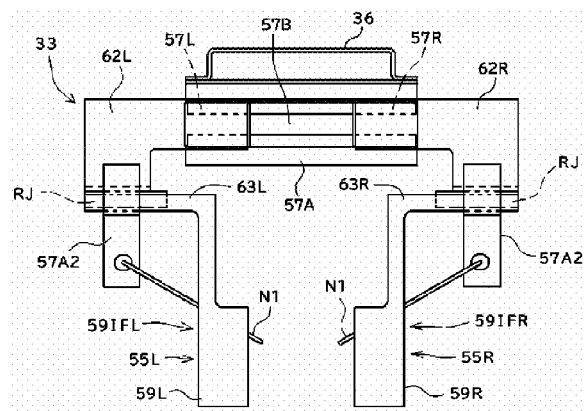
FIG. 16 is a front view for illustrating the hand device of the fourth example.
Figure 17:
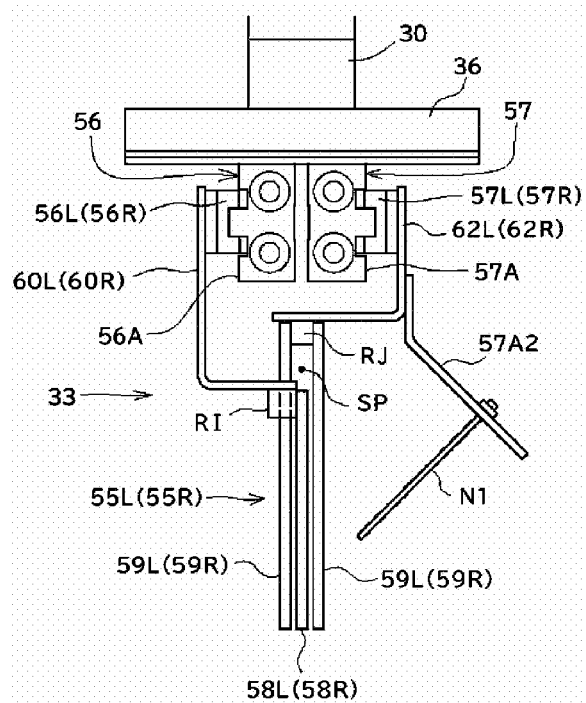
FIG. 17 is a side view for illustrating the hand device of the fourth example.

FIGS. 15 to 17 show a fourth example of a hand device 33 in which the upper end portions of left and right stays 57A2 and 57A2 are welded, and thus fixed, to side surfaces of the left and right second support members 62L and 62R. The left and right stays 57A2 and 57A2 extend obliquely downward away from the finger-shaped portions 55L and 55R.

The bases of the left and right air blow nozzles N1 and N1 (removal aid means in the claims) are extended through and attached to the extending end portions of the stays 57A2 and 57A2. The distal end portions of these nozzles N1 and N1 are tilted toward the lower end portions of the finger-shaped portions 55L and 55R and also extended toward the center position between the left and right finger-shaped portions 55L and 55R.

The lower end portions (distal end portions) of the left and right nozzles N1 and N1 are therefore positioned to face each other in the vicinity of the center position between the left and right finger-shaped portions 55L and 55R.

In this example, the left and right nozzles N1 and N1 move together with the left and right second members 59L and 59R such that the distal end portions of the left and right nozzles N1 and N1 are separated from each other by a predetermined gap when the left and right second members 59L and 59R are positioned closest to each other.

Piping from an air pressure source (not shown) is connected to the bases of the left and right nozzles N1 and N1.

In the above description, air, which is a fluid, is ejected from the nozzle N1, but the fluid is not limited to air, and nitrogen gas, which accounts for a large volume percentage in the air, may be used.

Other Removal Aid Means

In the first to fourth examples, the removal of the meat slice E held by the left and right finger-shaped portions 55L and 55R is aided by blown air. Alternatively, a mechanical system that strikes the held meat slice E down may be used.

Food Arrangement Controller

As shown in FIG. 18, the encoders 19 to 23S described above and the camera 11 are connected to the input side of a robot controller 34 including a calculation portion, a storage portion, and the like.

To the output side of the robot controller 34, the above-mentioned servomotors 13 to 18, a first air cylinder valve solenoid 56SV, a second air cylinder valve solenoid 57SV, and an air blow valve solenoid NSV are connected.

Also, although not shown, on the output side of the robot controller 34, individual relay circuits for operating the servomotors 13 to 18 are interposed.

The air pressure source for blowing air is a compressed-air supply facility in the factory or an air pump provided in the slicer 1.

As for the slicer controller 10 of the slicer 1, the encoder 9 is connected to its input side, and the servomotor 8 is connected to its output side.

The illustration of other sensors and actuators relating to operation control of the slicer 1 is omitted.

A communication line SL connects the robot controller 34 to the slicer controller 10.

The food arrangement controller (food batch formation controller) 31 is configured as described above.

Arrangement Control

The arrangement control (food batch formation control) according to the present invention is now described.

As shown in FIG. 2, the slicer 1 cuts a block of meat to a predetermined thickness, and cut meat slices (or meat slices folded in half) E are successively placed on the conveyance surface 3a of the belt 3 of the first conveyance apparatus 2.

When the encoder 9 detects that a meat slice E reaches the collection position T, the slicer controller 10 outputs a collection start signal to the robot controller 34.

Thus, the moving state of the meat slice E placed on the conveyance surface 3a is synchronized with the timing of collecting the meat slice E on the conveyance surface 3a.

When the set number of meat slices E is collected and the arrangement of all of them is completed, the robot controller 34 outputs an arrangement completion signal to the slicer controller 10.

The control point described below is the center position of the space between the distal end (inner end) of the engagement portion 58LS of the left first member 58L and the distal end (inner end) of the engagement portion 58RS of the right first member 58R.

Figure 22:
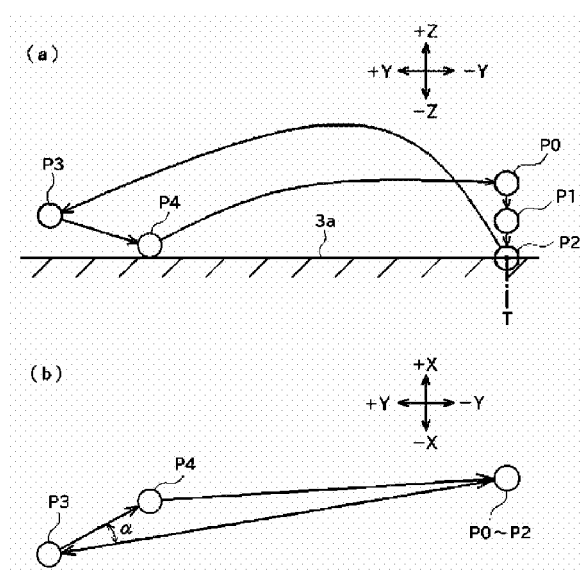
FIG. 22 is a diagram illustrating a path of a control point, part (a) being an explanatory diagram of the path in side view, and part (b) being an explanatory diagram of the path in plan view.

As shown in parts (a) and (b) in FIG. 22, the robot arm 12 is controlled so that the above control point is moved to the center positions of the circles (or spheres) of points P0 to P1 to P2, P2 to P3, P3 to P4, and P4 to P0.

Figure 19:
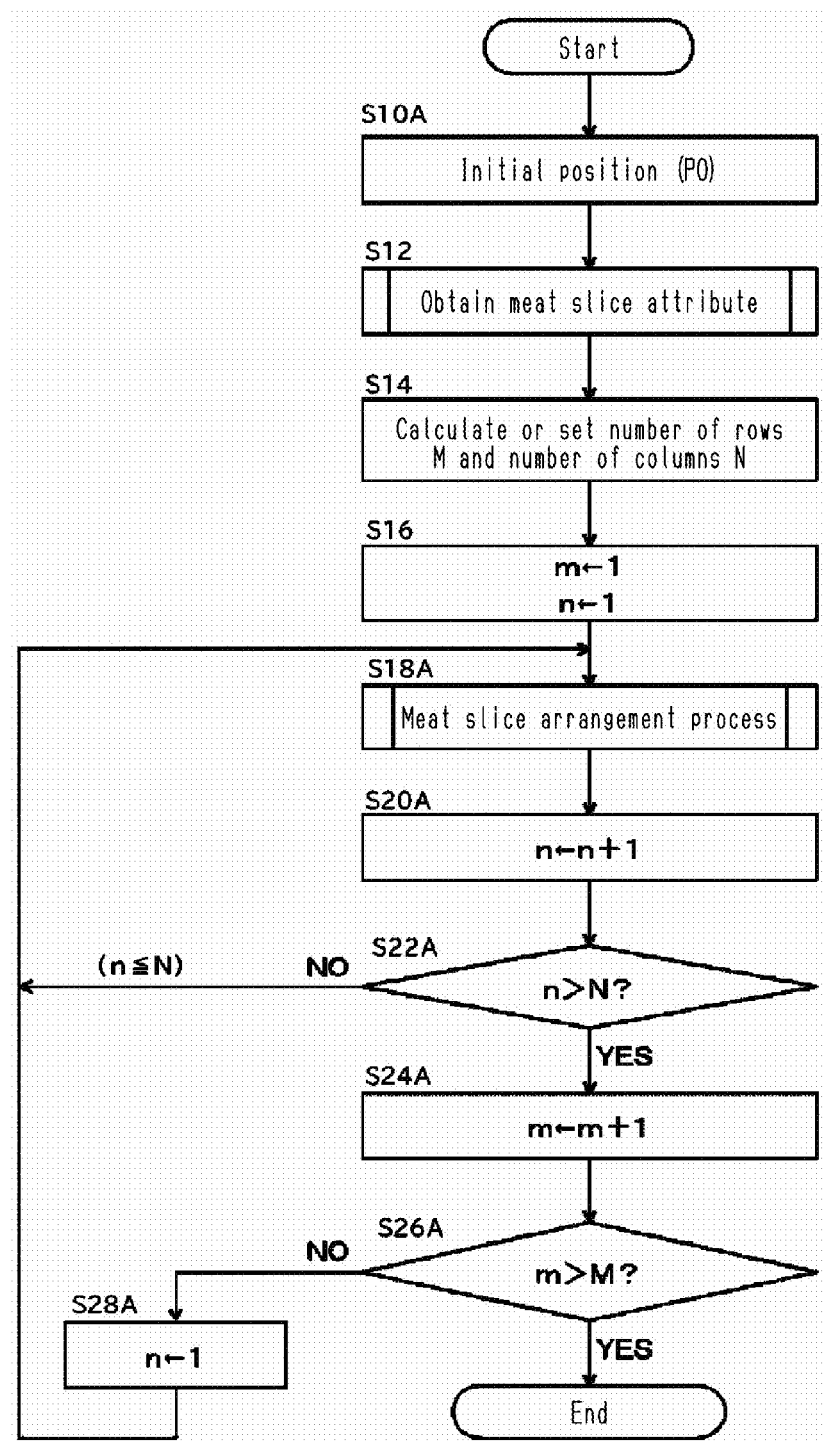
FIG. 19 is the main flowchart of food arrangement control of the embodiment.
Figure 20:
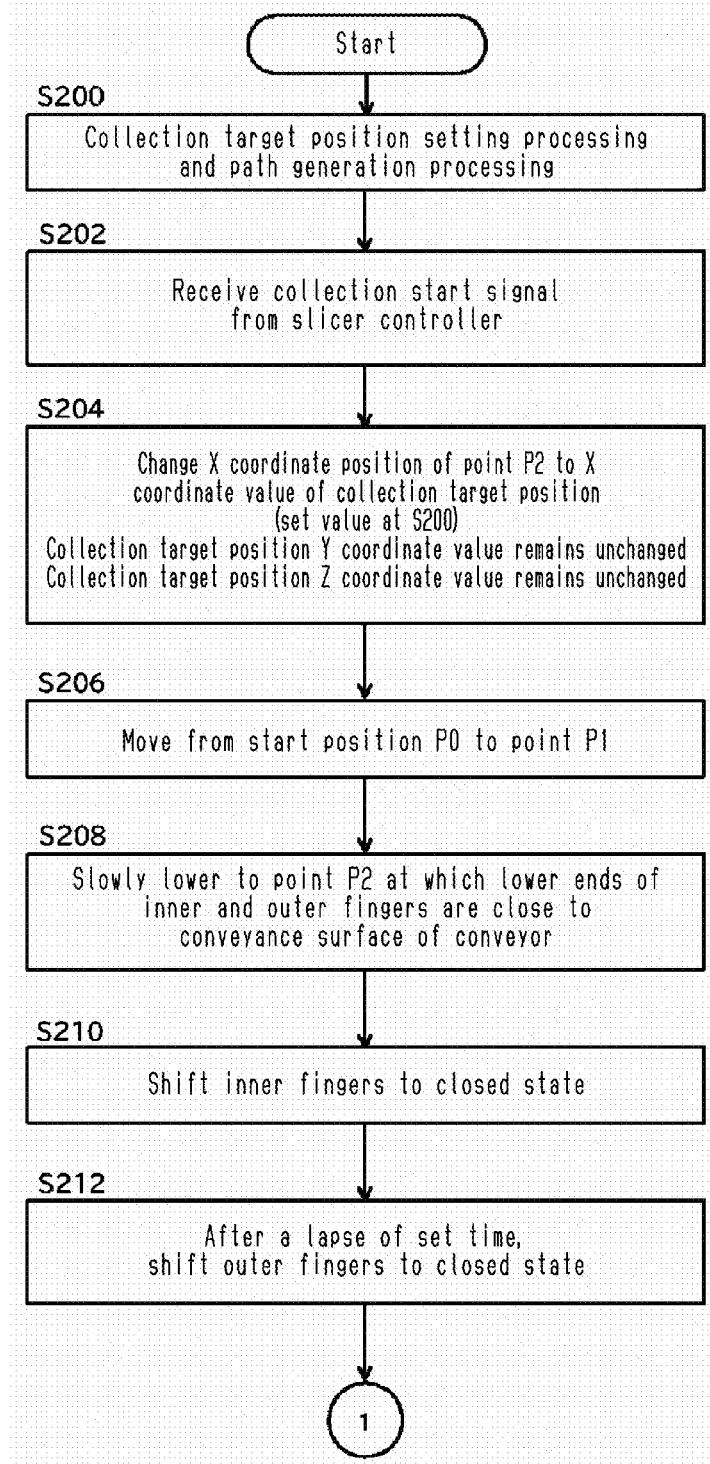
FIG. 20 is a flowchart of food arrangement control of the embodiment.
Figure 21:
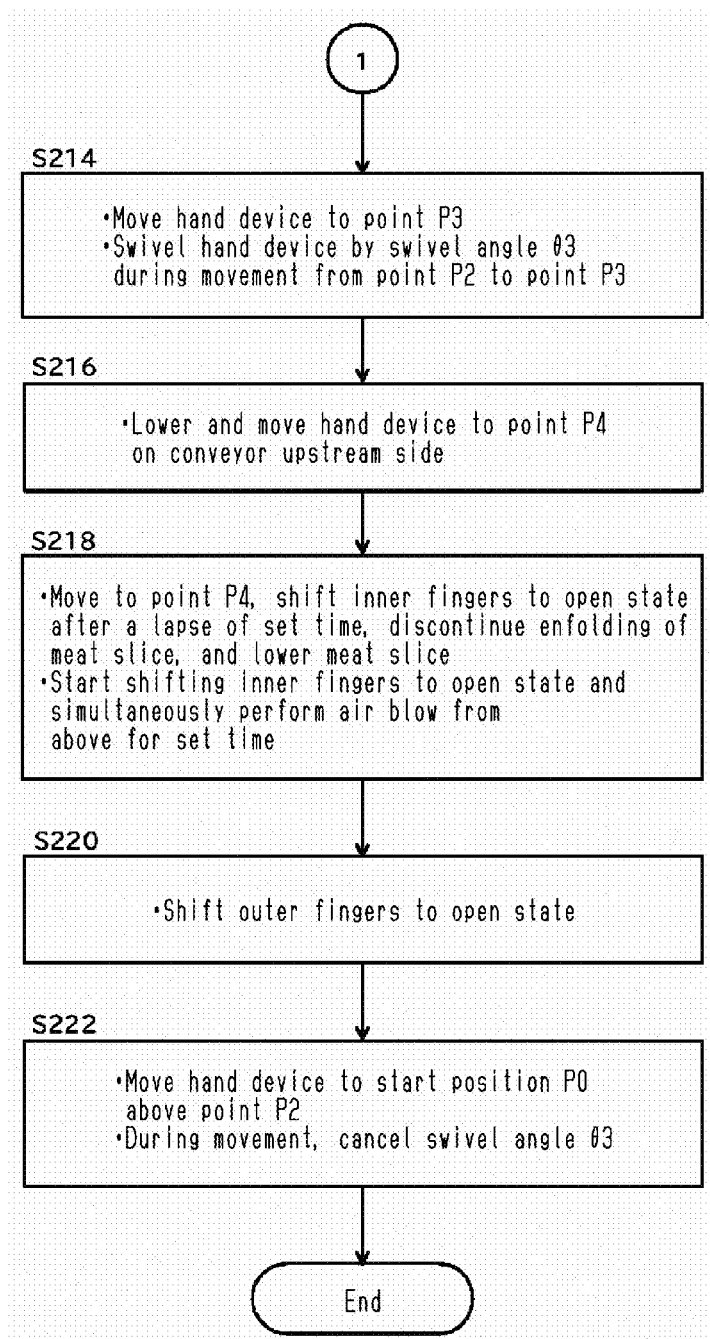
FIG. 21 is a flowchart following FIG. 20.

FIGS. 19 to 21 show flowcharts of the arrangement control, and FIGS. 23 to 26 show the process from collecting a meat slice E with the hand device 33 to folding the meat slice E in half and placing it.

S10A

Referring to FIG. 19, when arrangement control starts, at S10A, an output from the robot controller 34 drives and controls the robot arm 12 to move the hand device 33 from the retracted position and place the control point at point P0, which is the initial position.

Point P0 is set at a position directly above the collection position T of the meat slice E and spaced apart from the conveyance surface 3a by a predetermined distance.

Also, at this point P0, the left and right finger-shaped portions 55L and 55R of the hand device 33 are in an open state and separated from each other.

That is, the left and right inner fingers 58IFL and 58IFR and the left and right outer fingers 59IFL and 59IFR are in an open state and separated from each other by the maximum distance.

In this state, the first members 58L and 58R of the left and right inner fingers 58IFL and 58IFR are retracted in the gaps SP and SP between the second members 59L and 59R of the left and right outer fingers 59IFL and 59IFR.

Also, the inner edge portions of the left and right first members 58L and 58R are retracted outward of the inner edge portions of the left and right second members 59L and 59R (within the gaps SP).

S12

At S12, the slicer controller 10 obtains the attributes of the meat slice E that is being conveyed to the collection position T.

That is, the slicer controller 10 receives a detection result from a thickness (height) sensor (not shown), which is provided in the slicer 1 to detect the thickness (height) of the leading end of the block of meat before slicing.

The slicer 1 cuts the block of meat, which is supplied from the −Y side to the +Y side in a lateral orientation, in the up-down direction from its leading end. As such, the length in the Y-axis direction of the meat slice E that is cut and then placed on the conveyance surface 3a is a dimension that approximates the thickness (height) of the leading end of the block of meat.

When the meat slice E is folded at its central portion in the Y-axis direction, the length of the meat slice E in the Y-axis direction is about ½ the thickness (height) of the leading end of the block of meat.

The slicer controller 10 sends the thickness (height) of the leading end of the block of meat before slicing to the robot controller 34.

Also, the robot controller 34 processes an image of the meat slice E captured by the camera 11 and obtains the size of the meat slice E (the length (width) in the X-axis direction and the area of the meat slice E) based on the result.

According to the obtained size of the meat slice E, the meat slice E is classified into one of four classes of large, medium (standard), small, and unsuitable for collection.

Collection and Arrangement of Meat Slice E Suitable for Collection

The basic process is now described below for a situation where the meat slices E captured by the camera 11 are classified into one of the large, medium, and small classes.

S14

At S14, the robot controller 34 selects, from multiple predetermined numbers of rows M stored as fixed values, the predetermined number of rows M corresponding to the size of the tray 6 to be used.

Also, a predetermined number of columns N are automatically calculated on the basis of the thickness (height) of the leading end of the block of meat and the size of the meat slice E based on the image processing.

As a result, as shown in FIG. 27, rows of a predetermined number of rows M and columns of a predetermined number of columns N are set in the set region R on the inner base surface of the tray 6.

The rows and the columns in each row are set at regular intervals.

The processing is now described in which the initially calculated predetermined number of columns N is applied to all rows (a situation where N columns (N slices) of meat slices E are placed in each row).

The process of calculating the predetermined number of columns N for each row will be described below.

S16

At S16, the robot controller 34 sets the count value m of the row counter and the count value n of the column counter to 1, and then the process proceeds to meat slice arrangement process at S18A.

S18A: Meat Slice Arrangement Process

S200 to S222 shown in FIGS. 20 and 21 are flowcharts of the meat slice arrangement process at S18A.

As shown in FIG. 27, the inner base surface of the tray 6 is divided into multiple meat slice placement segments arranged in a matrix.

In this embodiment, a meat slice arrangement process is performed for the first row, which is the farthest to the −Y side, in the order of columns. After completing one row, a similar arrangement process is performed for the next row that is adjacent to and located on the +Y side of the first row, so that (m, n)=(1, 1), (1, 2), (1, 3), (1, 4), (2, 1), (2, 2), . . . , (M, N).

The first row is represented by m=1 and is the farthest to the −Y side on the inner base surface of the tray 6. The first column is represented by n=1 and is the farthest to the +X side on the inner base surface of the tray 6.

S200

At S200, the robot controller 34 first performs collection target position setting processing and path generation processing.

Collection Target Position Setting Processing

On the basis of the size of the meat slice E obtained from the image-capturing result of the camera 11, the central section in the X-axis direction or a position near this central section of the meat slice E (middle portion in a length direction of a food article in the claims) is set as a holding target portion B (see FIG. 2), and the collection target position of this holding target portion B is calculated.

Path Generation Processing

Path generation processing generates a path of the control point from points P0 to P1 to P2, P2 to P3, and P3 to P4 from collection to arrangement completion, and a path of the control point returning to point P0 from point P4 shown in FIG. 22. The position of the control point and the orientation of the hand device 33 at each time are stored in the robot controller 34.

Movement of Control Point

Referring to FIG. 22, the movement of the control point between different points is now described.

Part (a) shows the path of the control point viewed from the −X side to the +X side, and part (b) shows the path of the control point viewed from the +Z side to the −Z side.

Point P0 is the initial position of the control point and is fixedly set at a position directly above the center line t of the conveyance surface 3a of the first conveyance apparatus 2.

Point P1 is a middle point on the vertical descent path of the control point between points P0 and P2.

The Z-axis coordinate value of point P2 is set to a height that creates a slight gap separating the lower ends of the left and right finger-shaped portions 55L and 55R from the conveyance surface 3a. The food arrangement method performed by the food arrangement controller (food batch formation controller) 31 includes the step of lifting the control point at the start of movement from point P2 to point P3 to collect the meat slice E held by the hand device 33 with opposite end portions of the meat slice E hanging down.

The X-axis coordinate value and the Y-axis coordinate value of point P3 are set to coordinate values above the set region R. The food arrangement method performed by the food arrangement controller 31 includes the step of moving the control point from point P2 to point P3 described above.

The Z-axis coordinate value of point P3 is set to a height that does not cause the opposite ends (hanging ends) of the meat slice E held by the hand device 33 to interfere with the peripheral wall 6a of the tray 6 when the meat slice E passes above the peripheral wall 6a.

The path from point P2 to point P3 is set as a line that extends substantially vertically upward to the +Z side at the start of movement from point P2, then extends obliquely to the +Y side, is curved in an arc in side view to reach the highest point, and then extends gently downward to point P3, which is spaced apart in the +Y direction.

The Y-axis coordinate value of point P4 is set to the coordinate value of a position separated from the Y-axis coordinate value of point P3 by a predetermined distance to the −Y side.

The X-axis coordinate value of this point P4 is set to the coordinate value of a position separated from the X-axis coordinate value of point P3 by a predetermined distance to the +X side.

Also, the Z-axis coordinate value of this point P4 is set to a coordinate value on the upper surface of the set region R separated from the Z-axis coordinate value of point P3 to the −Z side.

As shown in FIG. 27, a meat drop point Rmn is the center point of each meat slice placement segment (m, n).

Thus, the path from point P3 to point P4 is set as a line gently descending to point P4, which is spaced apart from point P3 in the −Y direction and the +X direction.

While the control point moves from point P3 to point P4, the hanging end portions of the meat slice E held by the hand device 33 come into contact with the set region R (the inner base surface of the tray 6), and then the meat slice E is gradually laid down so as to be folded in half. Then, the meat slice E is released and lowered to the meat drop point Rmn.

In the flowchart shown in FIG. 19, each time the column n and/or the row m is updated at S20A, S24A, and S28A, which will be described below, the X-axis coordinate value and Y-axis coordinate value of point P4 are changed to the X-axis coordinate value and Y-axis coordinate value of the updated meat drop point Rmn.

Orientation of Hand Device

In this embodiment, while the control point moves from point P0 to point P2 to collect the meat slice E, the orientation (swivel angle) of the hand device 33 in plan view is maintained such that the left and right finger-shaped portions 55L and 55R are aligned in the Y-axis direction.

While the control point is moved from point P2 to point P3, the orientation of the hand device 33 in plan view is changed (swiveled) by approximately 90 degrees, so that the left and right finger-shaped portions 55L and 55R are substantially aligned in the X-axis direction.

While the control point is moved from point P3 to point P4, the orientation of the hand device 33 in plan view is substantially maintained.

While the control point is moved from point P4 to point P0, the orientation of the hand device 33 in plan view is changed by approximately 90 degrees in the reverse direction, so that the left and right finger-shaped portions 55L and 55R are returned to be aligned in the Y-axis direction.

A configuration may be adopted in which both the change of orientation of the hand device 33 in plan view performed while the control point is moved from point P2 to point P3, and the change of orientation of the hand device 33 in the reverse direction in plan view performed while the control point is moved from point P4 to point P0 are omitted (a configuration that perform neither of those).

S202 to S206

An output from the robot controller 34 controls the robot arm 12 to move the control point from point P0 to point P1.

S202

Figure 23:
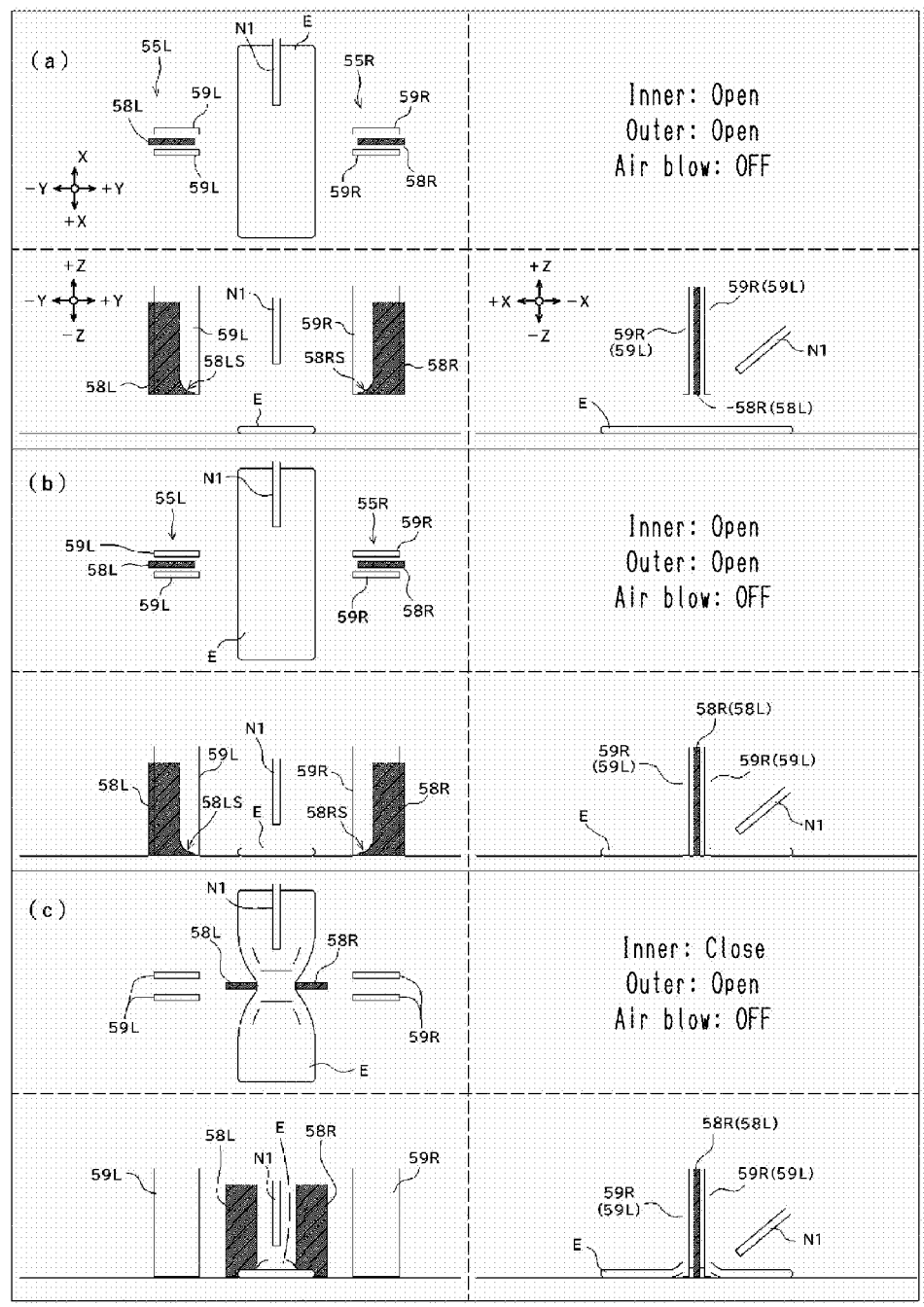
FIG. 23 includes plan views, front views, and side views schematically showing a state before starting collection of food (meat slice) and an initial state of the start of collection, part (a) being an explanatory diagram of a standby state, part (b) being an explanatory diagram of a collection start state, and part (c) being an explanatory diagram of a state in which first members are closed.

As shown in the upper left plan view of part (a) in FIG. 23, when the hand device 33 is in the initial state, the left and right finger-shaped portions 55L and 55R are opened to the positions forming the maximum distance in the Y-axis direction.

That is, the left and right first members 58L and 58R and the left and right second members 59L and 59R are opened to their maximum positions, and the inner edge portions of the first members 58L and 58R are retracted to positions offset outward from the inner edge portions of the second members 59L and 59R.

At S202, when a meat slice E conveyed by the first conveyance apparatus 2 reaches the collection position T as shown in FIG. 2, the robot controller 34 receives (obtains) a collection start signal from the slicer controller 10.

Thus, the process proceeds to S204.

S204

At S204, the robot controller 34 changes the X-axis coordinate value of the three-dimensional coordinates of point P2 to the X-axis coordinate value of the collection target position (holding target portion B) obtained at S200.

The Y-axis coordinate value and Z-axis coordinate value of the collection target position are not changed.

The process then proceeds to S206.

S206

At S206, an output from the robot controller 34 controls the robot arm 12 to move the control point from the start position (point P0) to point P1 at high speed, and the process proceeds to S208.

S208

At S208, an output from the robot controller 34 controls the robot arm 12 to slowly lower the control point from point P1 to point P2.

As a result, as shown in the lower left front view of part (b) in FIG. 23, the lower ends of the finger-shaped portions 55L and 55R (the lower ends of the first members 58L and 58R and the lower ends of the second members 59L and 59R) are positioned in the closest proximity to the conveyance surface 3a while maintaining a slight gap separating the lower ends from the conveyance surface 3a.

The process then proceeds to S210.

S210

At S210, after the control point reaches point P2 as described above, an output from the robot controller 34 to the first air cylinder valve solenoid 56SV operates the first air cylinder 56.

Thus, as shown in the upper left plan view of part (c) in FIG. 23, the left and right inner fingers 58IFL and 58IFR of the left and right finger-shaped portions 55L and 55R move toward each other, and the left and right first members 58L and 58R operate in the closing direction.

In this state, the central portion of the meat slice E in the X-axis direction (the middle portion in the length direction in the claims) is caught between the inner edge portions of the left and right first members 58L and 58R. Also, the left and right engagement portions 58LS and 58RS enter under the lower surface of the central portion, holding the meat slice E.

Even when the left and right inner fingers 58IFL and 58IFR are closest to each other, a gap remains between the left and right first members 58L and 58R, and a slight gap also remains between the opposing end portions of the left and right engagement portions 58LS and 58RS.

The process then proceeds to S212.

S212

At S212, after a set time has elapsed since the left and right first members 58L and 58R completed the operation in the closing direction, an output from the robot controller 34 to the second air cylinder valve solenoid 57SV operates the second air cylinder 57.

Figure 24:
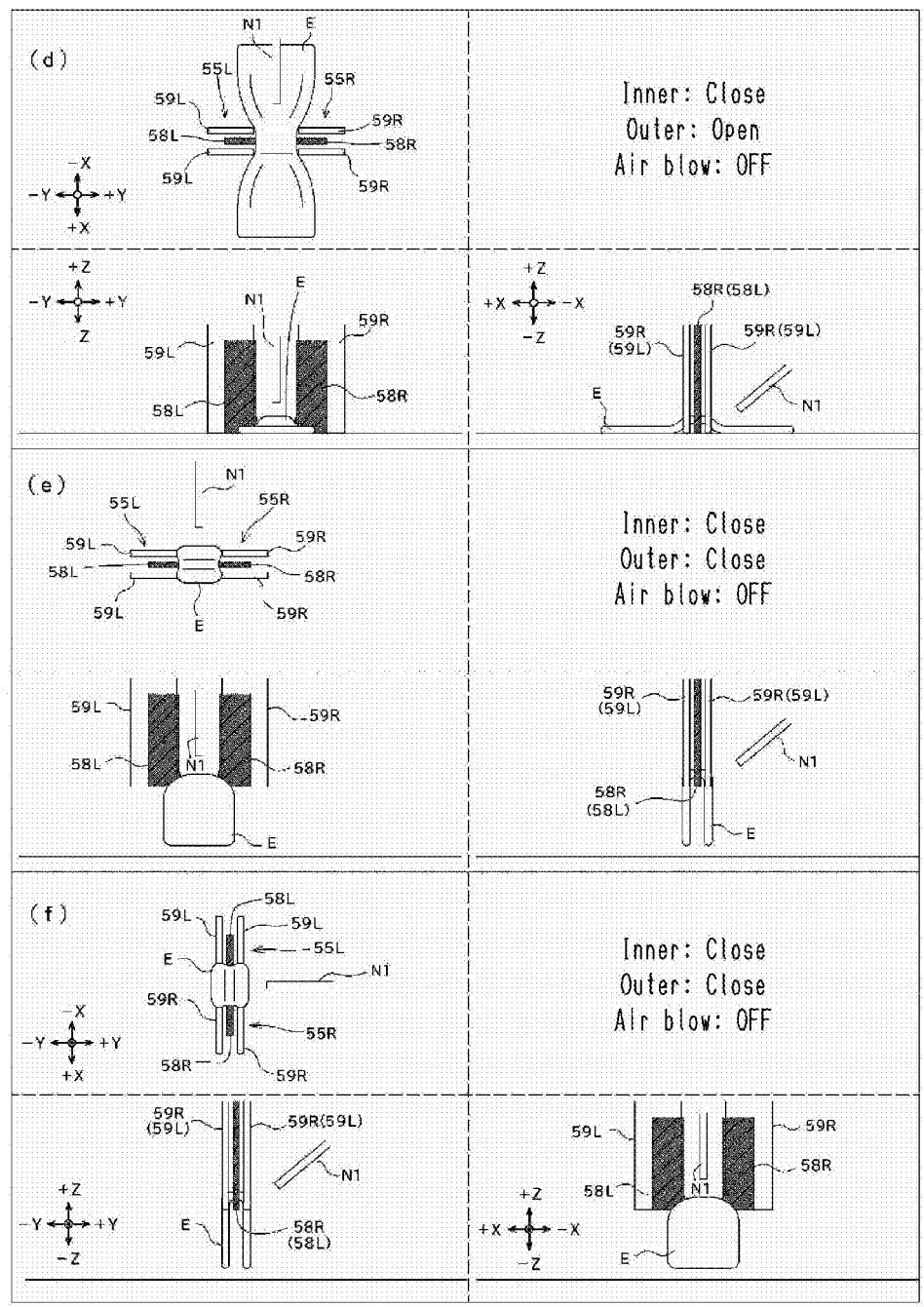
FIG. 24 includes plan views, front views, and side views showing states in which, following part (c) in FIG. 23, the food (meat slice) is held, the hand device is lifted, and the food is collected with opposite end portions of the food hanging down, part (d) being an explanatory diagram of a state in which the food is held, part (e) being an explanatory diagram of a state in which the hand device is lifted with the end portions of the food hanging down, and part (f) being an explanatory diagram of a state of the hand device in a different orientation in plan view.

This moves the left and right outer fingers 59IFL and 59IFR of the left and right finger-shaped portions 55L and 55R toward each other so that the left and right second members 59L and 59R operate in the closing directions as shown in the upper left plan view of part (d) in FIG. 24.

In this state, the central portion of the meat slice E in the X-axis direction is caught between the left and right first members 58L and 58R and the left and right second members 59L and 59R and held stably.

At this time, since a gap remains between the left and right first members 58L and 58R, the meat slice E is not gripped too tightly, preventing any damage.

The process then proceeds to S214.

S214

At S214, an output from the robot controller 34 controls the robot arm 12 to start lifting the control point from point P2.

At the start of the lifting from point P2, the control point ascends along a path that ascends substantially vertically to the +Z side and then extends obliquely to the +Y side.

As a result, as shown in the lower left front view of part (e) in FIG. 24, the central portion of the meat slice E in the X-axis direction is lifted while being caught between the left and right first members 58L and 58R and the left and right second members 59L and 59R. Opposite end portions of this meat slice E rise above the conveyance surface 3a and hang down by their weight.

As described above, the food arrangement method performed by the food arrangement controller 31 includes a first step of holding the central portion in the X-axis direction of the meat slice E located at the collection position T at point P2 and lifting the hand device 33 to collect the meat slice E with opposite end portions of this meat slice E hanging down.

Then, an output from the robot controller 34 controls the robot arm 12 to move the control point to the +Y side while lifting it along the path curving in an arc in side view, cause the control point to reach the highest point, and then gently lower the control point to point P3, which is spaced apart from the collection position T in the +Y direction.

Also, while the control point is moving from point P2 to point P3, an output from the robot controller 34 controls the robot arm 12 to swivel the hand device 33 by approximately 90 degrees about the active joint axis J6 (axis in the up-down direction). This swivel is a clockwise rotation in plan view.

As a result, as shown in the upper left plan view of part (f) in FIG. 24, the left and right finger-shaped portions 55L and 55R that were aligned in the Y-axis direction are aligned in the X-axis direction, changing the orientation of the meat slice E held by the left and right finger-shaped portions 55L and 55R by approximately 90 degrees (θ3 at S214).

That is, the width direction (direction perpendicular to the length direction) of the meat slice E is changed from a direction along the Y axis to a direction along the X axis.

As described above, the food arrangement method performed by the food arrangement controller 31 includes a second step of changing the orientation of the hand device 33 that has collected the meat slice E by approximately 90 degrees in plan view and moving it to point P3.

The process then proceeds to S216.

S216

At S216, an output from the robot controller 34 controls the robot arm 12 to move the control point from point P3 to point P4.

That is, the hand device 33 holding the meat slice E is lowered while moved to the −Y side, and the control point is moved to point P4 on the set region R.

During the movement from point P3 to point P4, both hanging end portions of the meat slice E held by the hand device 33 are laid down while being dragged on the inner base surface of the tray 6, so that the meat slice E reaches point P4, folded into half.

To this end, the X-axis coordinate value of point P4 is set to the coordinate value of a position that is offset to the +X side with respect to the X-axis coordinate value of point P3.

That is, in plan view, a predetermined turning angle α is set between the path from point P2 to point P3 and the path from point P3 to point P4.

As a result, in the third step, the hand device 33 descends while moving in a direction turned at an angle α to the +X side in plan view with respect to the moving direction in the second step.

With respect to the path from point P2 to point P3, the path from point P3 to point P4 may be set in a lateral direction other than the reverse direction.

The process then proceeds to S218.

S218

At S218, when a preset time has elapsed since the control point reached point P4, an output from the robot controller 34 operates the first air cylinder 56 in the reverse direction.

Figure 25:
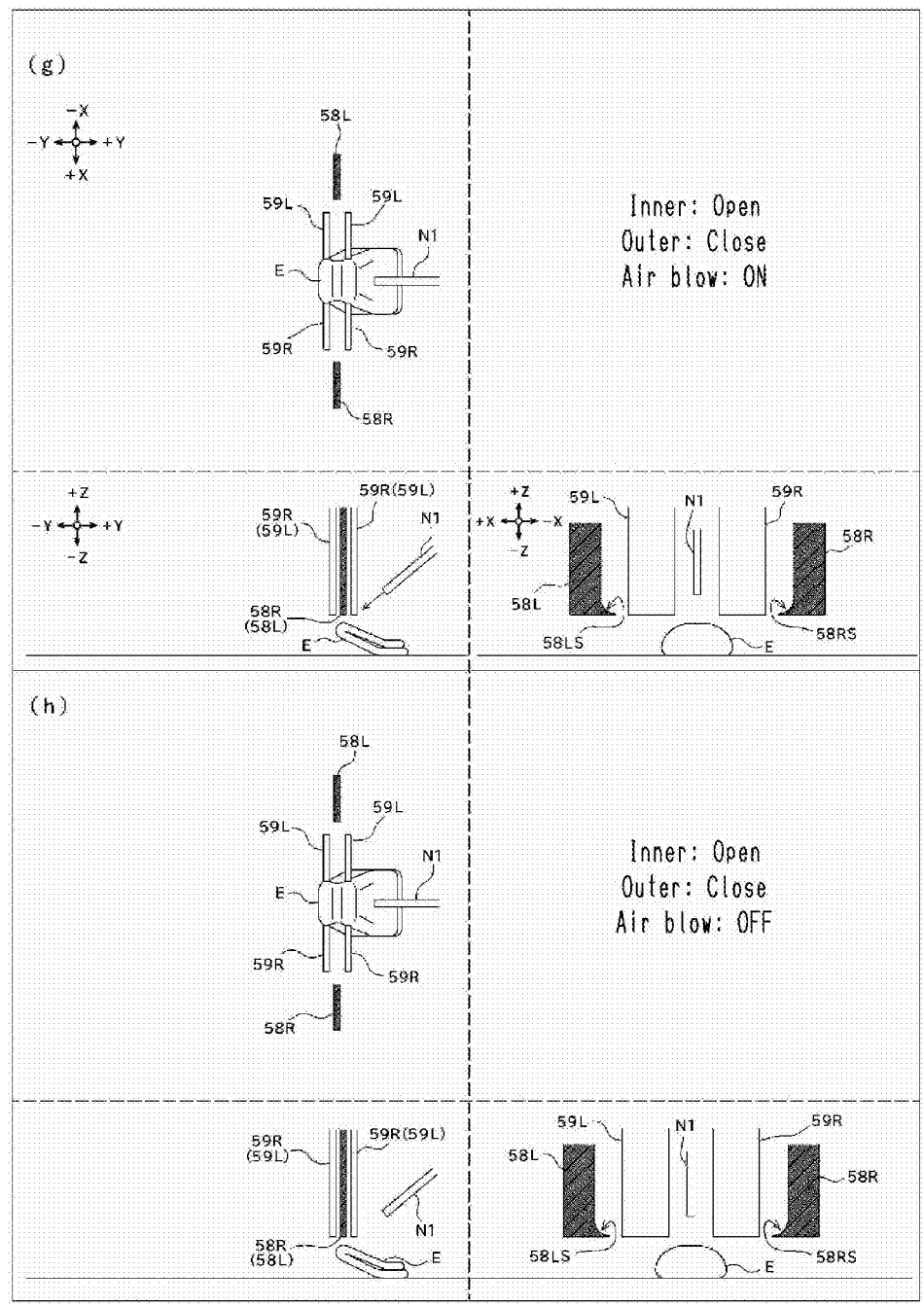
FIG. 25 includes plan views, front views, and side views showing states in which, following part (f) in FIG. 24, the hand device is obliquely lowered to fold the food (meat slice) in half while lowering it onto the set region and then this food is removed from the finger-shaped portions, part (g) being an explanatory diagram of a state in which the first members are opened and a removal aid means is operated, and part (h) being an explanatory diagram of a state in which the operation of the removal aid means is stopped and the removal of the food is completed.

As a result, as shown in the upper left plan view of part (g) in FIG. 25, the left and right first members 58L and 58R of the left and right finger-shaped portions 55L and 55R move outward (in directions away from each other) to the positions that form the maximum distance, thereby discontinuing the holding (enfolding) of the meat slice E by the left and right engagement portions 58LS and 58RS.

However, at this time point, the robot controller 34 does not send an output to the second air cylinder 57, so that the left and right second members 59L and 59R remain at the positions close to each other.

Thus, while the position of the held meat slice E is restricted by the inner edge portions of the left and right second members 59L and 59R (while being scraped off), the inner edge portions of the left and right first members 58L and 58R move away from the meat slice E.

Additionally, substantially at the same time as the start of outward movement of the left and right first members 58L and 58R, an output from the robot controller 34 to the air blow valve solenoid NSV causes high-pressure air to be ejected from the nozzle N1 for a set time and then stopped.

As shown in the lower left side view of part (h) in FIG. 25, the meat slice E is thus removed also from the left and right second members 59L and 59R and transferred onto the set region R.

A configuration in which fluid (air) is not ejected from the nozzle N1 (a configuration in which the removal aid means is not operated) may also be adopted.

As described above, the food arrangement method performed by the food arrangement controller 31 includes a third step of lowering the hand device 33 while moving the hand device 33 in the direction (−Y direction) substantially opposite to the moving direction in the above-described second step above the set region R, and removing the held meat slice E by operating the left and right first members 58L and 58R in the opening directions and simultaneously ejecting high-pressure air from the nozzle N1 to place this meat slice E in the set region R in a state of being folded in half.

The process then proceeds to S220.

S220

At S220, an output from the robot controller 34 to the second air cylinder valve solenoid 57SV operates the second air cylinder 57 in the reverse direction.

This moves the left and right second members 59L and 59R (left and right outer fingers 59IFL and 59IFR) of the left and right finger-shaped portions 55L and 55R in directions away from each other. As shown in the upper left plan view of part (i) in FIG. 26, the left and right second members 59L and 59R open to the positions that form the maximum distance in the X-axis direction.

As a result, the left and right finger-shaped portions 55L and 55R return to the initial state before holding the meat slice E.

The process then proceeds to S222.

S222

At S222, an output from the robot controller 34 controls the robot arm 12 to move the control point from point P4 to point P0.

At the start of this movement from point P4, the control point ascends along a path gently inclined to the −Y side and then moves linearly to the −Y side to reach point P0.

Also, while the control point moves from point P4 to point P0, an output from the robot controller 34 controls the robot arm 12 to swivel the hand device 33 by approximately 90 degrees (θ3 at S222) in the reverse direction about the active joint axis J6 (axis in the up-down direction). This swivel is a counterclockwise rotation in plan view.

Figure 26:
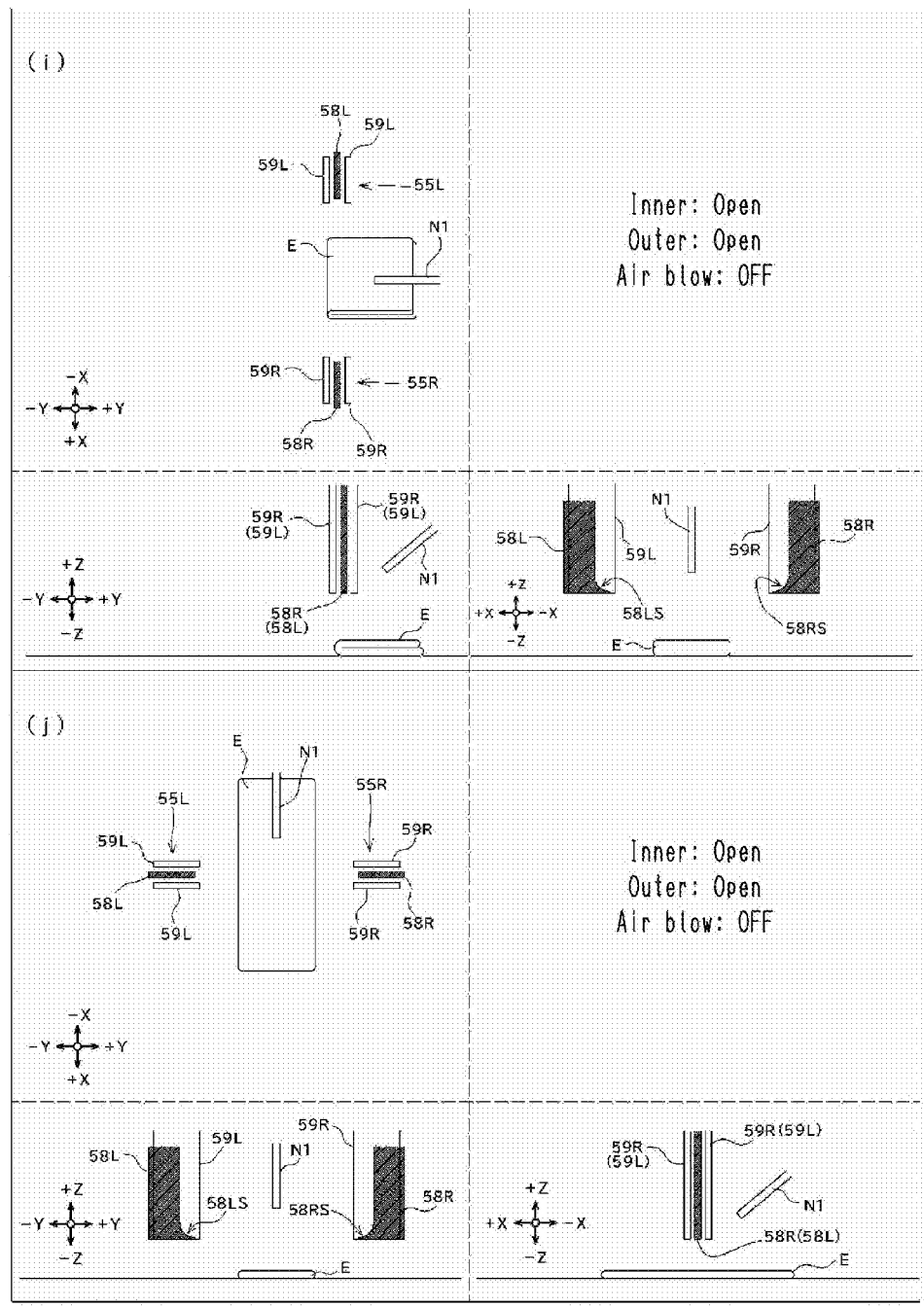
FIG. 26 includes plan views, front views, and side views showing states in which, following part (h) in FIG. 25, the food (meat slice) folded in half is placed in the set region and then the hand device is returned to the standby state, part (i) being an explanatory diagram of a state in which the second members are opened and the placement of the food is completed, and part (h) being an explanatory diagram of a state in which the orientation of the hand device is returned to the original and the hand device is returned to the standby state.

Accordingly, as shown in the upper left plan view of part (j) in FIG. 26, the left and right finger-shaped portions 55L and 55R, which were aligned in the X-axis direction, return to a state in which they are aligned in the Y-axis direction and also return to the orientations substantially perpendicular to the length direction of the meat slice E at the collection position T.

An arrangement process of one meat slice E onto the meat drop point Rmn is completed in this manner, and the process proceeds to S20A in the flowchart shown in FIG. 19.

S20A

After a process of arranging one meat slice E onto the meat drop point Rmn has been completed as described above, the count value n of the column counter is incremented at S20A, and the process proceeds to S22A.

S22A

At S22A, the robot controller 34 determines whether the count value n of the column counter exceeds the predetermined number of columns N.

When the count value n does not exceed the predetermined number of columns N, the process returns to S18A, and a process of arranging a meat slice E onto the meat drop point Rmn in the next column in the current row m is performed.

As such, this process of arranging a meat slice E is performed N times per row.

When the count value n exceeds the predetermined number of columns N, the process proceeds to S24A.

S24A

At S24A, the count value m of the row counter is incremented, and the process proceeds to S26A.

S26A

At S26A, when the count value m of the row counter does not exceed the predetermined number of rows M, the process proceeds to S28A. When the count value m of the row counter exceeds the predetermined number of rows M, the process of this flowchart ends.

S28A

At S28A, the count value n of the column counter is set to 1, and the process returns to S18A.

When the process returns to S18A, a process of arranging a meat slice E onto the meat drop point Rmn in the first column of the next row is started.

The above process is repeated to complete the arrangement of the meat slices E onto all meat drop points Rmn in the predetermined number of rows M and the predetermined number of columns N, so that a meat slice batch (food batch in the claims) E1 is formed.

Example of Arrangement for 3 Rows and 4 Columns

Figure 28:
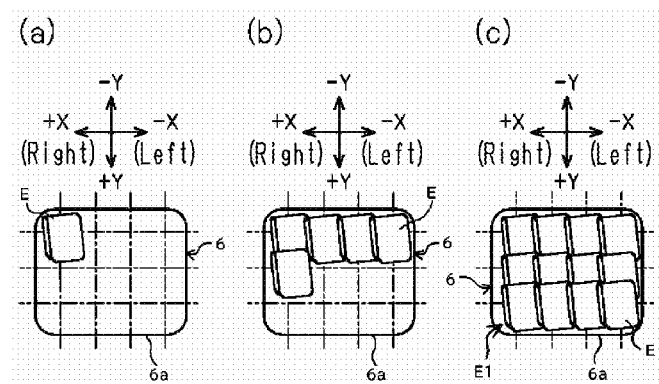
FIG. 28 is an explanatory diagram in which part (a) to (c) show states in which food articles (meat slices) are arranged in a matrix in the set region.

FIG. 27 and parts (a) to (c) in FIG. 28 show an example in which the above flowchart is executed with the predetermined number of rows M set to 3 and the predetermined number of columns N set to 4.

Part (a) in FIG. 28 is a plan view illustrating the state of the tray 6 after an arrangement of a meat slice E is completed for the meat drop point Rmn (1,1) in the first column in the first row.

Part (b) in FIG. 28 is a plan view illustrating the tray 6 in a state in which the arrangement of a meat slice E is completed for all meat drop points Rmn in the first row and the meat drop point Rmn (2, 1) in the first column in the second row.

Part (c) in FIG. 28 is a plan view illustrating the tray 6 in a state in which the arrangement of a meat slice E is completed for all meat drop points Rmn in the first, second, and third rows and the arrangement is finished.

Process of Calculating Predetermined Number of Columns N for Each Row

The above description is directed to the process in which the initially calculated predetermined number of columns N is applied to all rows (a situation where N columns (N slices) of meat slices E are placed in each row).

Figure 29:
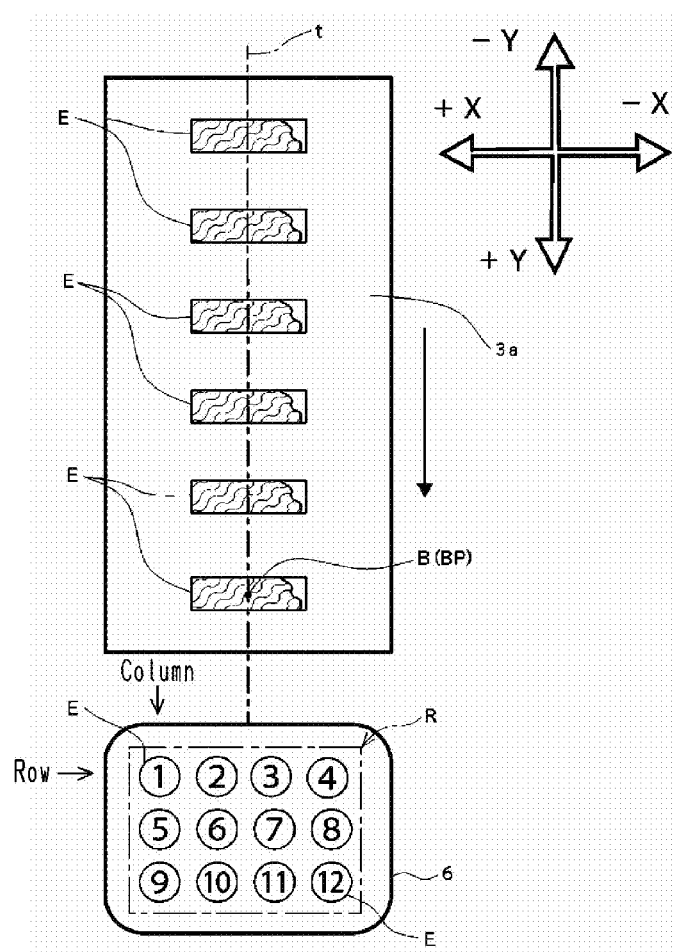
FIG. 29 is an explanatory diagram showing an example of a quantity control state.
Figure 30:
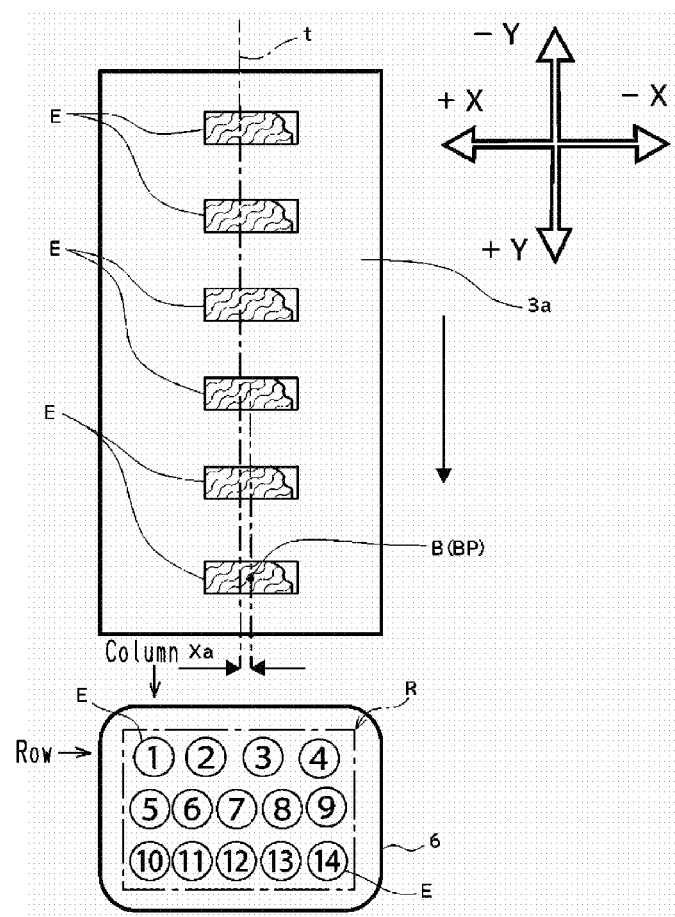
FIG. 30 is an explanatory diagram showing another example of a quantity control state.
Figure 31:
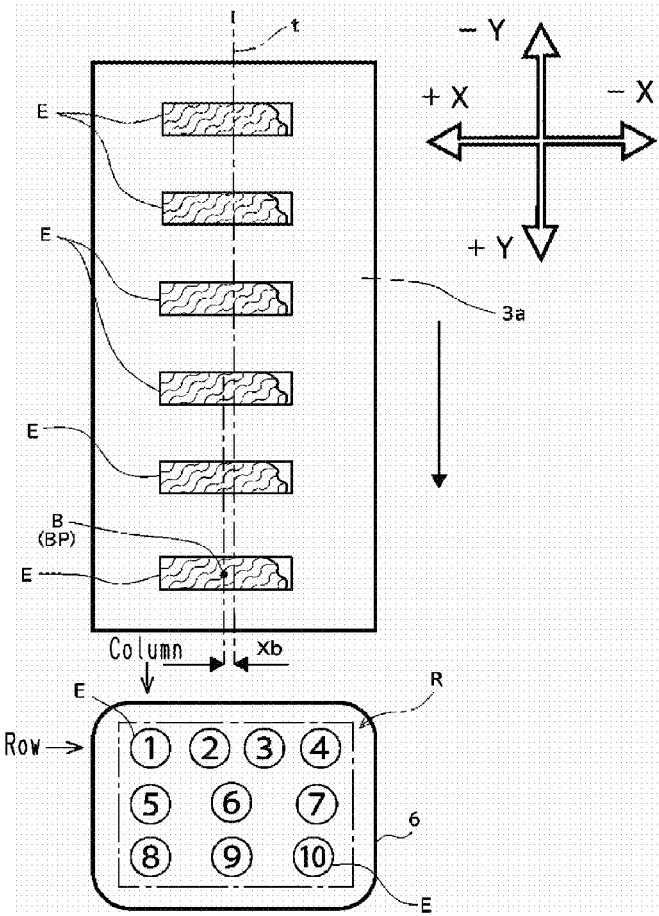
FIG. 31 is an explanatory diagram showing another example of a quantity control state.

However, as shown in FIGS. 29 to 31, a process may also be performed in which the predetermined number of columns N at S14 described above may be calculated for each row according to the size of the food to be placed at the beginning of each row.

In FIGS. 29 to 31, the positions of meat slices E to be placed in the set region R are indicated by circles, and the numbers in the order of placement are given in the circles.

When Medium (Standard) Class Meat Slices E are Available

In a meat slice arrangement process at S18A, an arrangement is performed as shown in FIG. 29.

That is, when the first meat slice E to be placed at the beginning (the farthest position to the +X side) of the first row, which is the farthest to the −Y side in the set region R, is classified into the middle (standard) class, it is determined that four columns (four slices) of meat slices E are placed in (transferred to) the first row.

Accordingly, in the first row, four columns (four slices) of meat slice E are placed at regular intervals in sequence from the first meat slice E to the fourth meat slice E (from the +X side to the −X side).

Subsequently, an arrangement process for the second row adjacent to and on the +Y side of the first row is started.

Then, when the fifth meat slice E to be placed at the beginning of the second row is also classified into the medium class, it is determined that four columns (four slices) of meat slice E are also placed in the second row, and four columns (four slices) of meat slices E are placed at regular intervals in sequence from the fifth meat slice E to the eighth meat slice E.

Subsequently, an arrangement process for the third row adjacent to and on the +Y side of the second row is started.

Then, when the ninth meat slice E to be placed at the beginning of the third row is also classified into the medium class, it is determined that four columns (four slices) of meat slice E are also placed in the third row, and four columns (four slices) of meat slices E are placed at regular intervals in sequence from the 9th meat slice E to the 12th meat slice E.

In this manner, a total of 12 meat slices E are placed in the set region R, and an arrangement process for one tray 6 is finished, forming a meat slice batch.

Because of the position of the meat slice E cut and discharged from the slicer 1 onto the conveyance surface 3a, the holding target portion B of a meat slice E classified into the medium (standard) class substantially agrees in the X-axis direction with the center line t of the width in the X-axis direction of the conveyance surface 3a.

As such, it is not necessary to correct the reference position of the control point at the collection position T in the X-axis direction.

When Meat Slices E of Medium and Small Classes are Mixed

In a meat slice arrangement process at S18A, an arrangement may also be performed as shown in FIG. 30.

That is, for the above-described first row, when the first meat slice E to be placed at the beginning of this first row is classified into the medium class, four columns (four slices) of meat slices E are placed in sequence from the first meat slice E to the fourth meat slices E in the same manner as described above.

Then, an arrangement process for the second row is started, and when the fifth meat slice E to be placed at the beginning of the second row is classified into the small class, it is determined that five columns (five slices) of meat slices E are placed in this second row.

Accordingly, in the second row, five columns (five slices) of meat slice E are placed at regular intervals in sequence from the fifth meat slice E to the ninth meat slice E.

Then, an arrangement process for the third row is started, and when the tenth meat slice E to be placed at the beginning of the third row is also classified into the small class, it is determined that five columns (five slices) of meat slice E are also placed in the third row, and five columns (five slices) of meat slices E are placed at regular intervals in sequence from the 10th meat slice E to the 14th meat slice E.

In this manner, a total of 14 meat slices E are placed in the set region R, and an arrangement process for one tray 6 is finished, forming a meat slice batch.

The holding target portion B of a meat slice E that is classified into the small class is offset in the X-axis direction from the position of the center line t of the conveyance surface 3a to the −X side by distance Xa. Accordingly, the reference position of the control point at the collection position T is corrected to the −X side by the distance Xa.

When Meat Slices E of Medium and Large Classes are Mixed

In a meat slice arrangement process at S18A, an arrangement may also be performed as shown in FIG. 31.

That is, for the above-described first row, when the first meat slice E to be placed at the beginning of this first row is classified into the medium class, four columns (four slices) of meat slices E are placed in sequence from the first meat slice E to the fourth meat slices E in the same manner as described above.

Then, an arrangement process for the second row is started, and when the fifth meat slice E to be placed at the beginning of the second row is classified into the large class, it is determined that three columns (three slices) of meat slices E are placed in this second row.

Accordingly, in the second row, three columns (three slices) of meat slice E are placed at regular intervals in sequence from the fifth meat slice E to the seventh meat slice E.

Then, an arrangement process for the third row is started, and when the eighth meat slice E to be placed at the beginning of the third row is also classified into the large class, it is determined that three columns (three slices) of meat slice E are also placed in the third row, and three columns (three slices) of meat slices E are placed at regular intervals in sequence from the eighth meat slice E to the tenth meat slice E.

In this manner, a total of 10 meat slices E are placed in the set region R, and an arrangement process for one tray 6 is finished, forming a meat slice batch.

When the number of columns in each row is automatically changed according to the size of the food to be placed at the beginning of each row, the intervals between the columns are also automatically changed.

However, a configuration is also possible in which the number of columns in each row is automatically changed according to the size of the food to be placed at the beginning of each row, but the intervals between the columns are not automatically changed.

The holding target portion B of a meat slice E that is classified into the large class is offset in the X-axis direction from the position of the center line t of the conveyance surface 3a to the +X side by distance Xb. Accordingly, the reference position of the control point at the collection position T is corrected to the +X side by the distance Xb.

Total Weight Convergence

Figure 32:
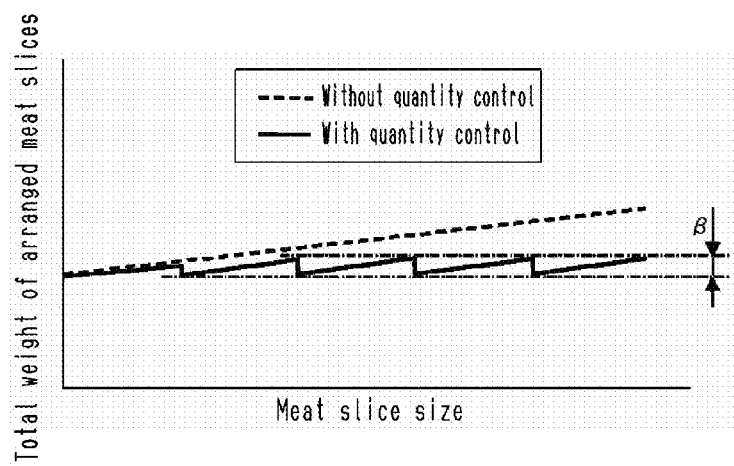
FIG. 32 is an explanatory diagram conceptually showing the relationship between the size of the food (meat slice) and the total weight of arranged food.

As shown in FIG. 32, the automatic adjustment of the quantity of arranged slices in the above arrangement process allows the total weight of the meat slices E arranged in the set region R of each tray 6 (the weight of the food batch in the claims) to be within a set range B.

In FIG. 32, a vertical drop part (step part) in the solid line indicating a situation where the quantity control is performed appears when the number of meat slices E arranged on the tray 6 decreases.

That is, the total weight of the arranged meat slices E gradually increases as the size of each meat slice E increases with the number of slices remaining unchanged, but a reduction in the quantity by one lowers the total weight for a time.

For example, the examples shown in FIGS. 29 to 31 described above have different quantities of arranged meat slices E of 12 slices, 14 slices, and 10 slices. Increasing or reducing the quantity of meat slices E to be arranged according to the size of the meat slice E in this manner allows the total weight to be within the set range.

Moreover, the quantity control of meat slices E also automatically adjusts the intervals between adjacent meat slices E, allowing the meat slices E to be neatly arranged in the set region R.

Nevertheless, a configuration is also possible that does not perform the control for keeping the total weight of the meat slices E arranged in the set region R within the set range as described above.

Another Example of Set Position of Set Region

Figure 33:
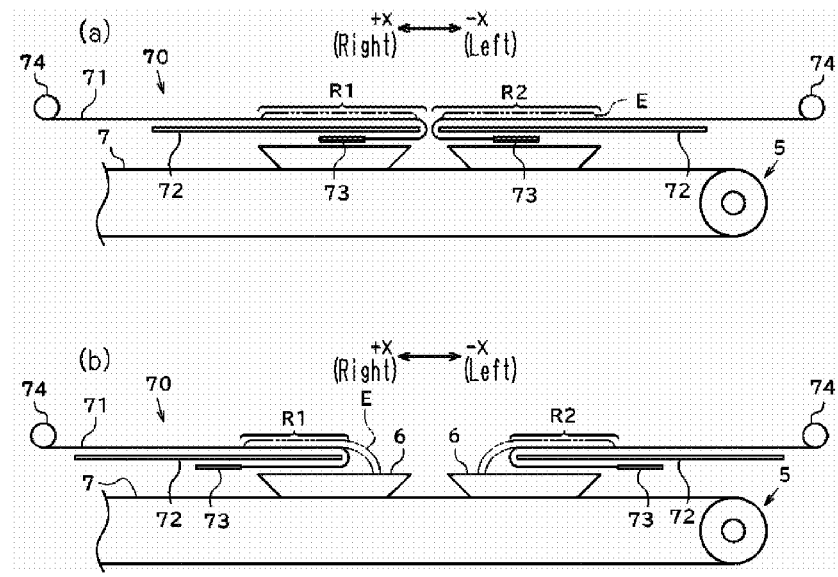
FIG. 33 is an explanatory diagram in which parts (a) and (b) illustrate a transfer device of another embodiment.
Figure 34:
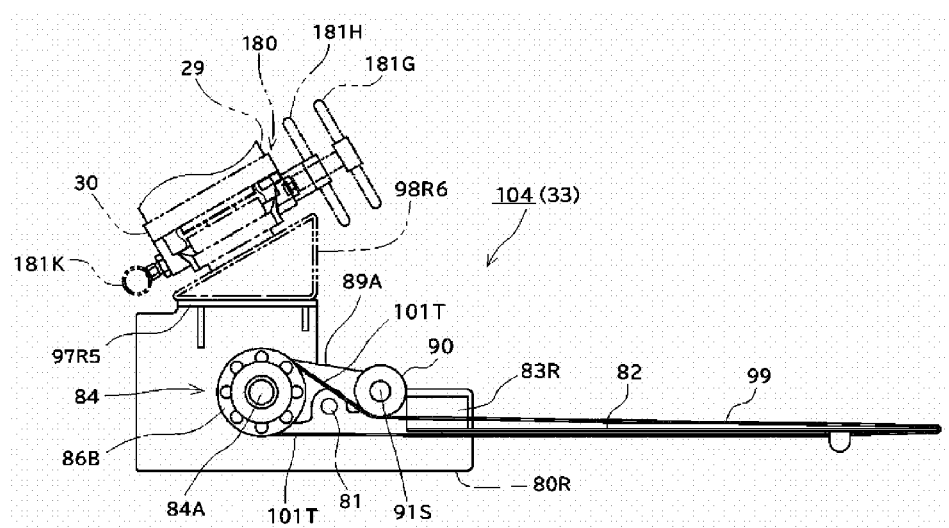
FIG. 34 is a left side view for illustrating a hand device including an article transfer device of a second embodiment.

As shown in parts (a) and (b) in FIG. 33, a transfer device 70 may be arranged above the second conveyance apparatus 5, and set regions R1 and R2 may be set on the transfer device 70.

The transfer device 70 includes two transfer belts 71 and 71, two receiving plates 72 and 72, and two traction plates 73 and 73 arranged directly under the receiving plates 72 and 72.

Both receiving plates 72 and 72 are arranged so as to be in an imaginary plane above the second conveyance apparatus 5 and opposed to each other. A drive source (not shown) reciprocally drives and selectively opens and closes the receiving plates 72 and 72 in the X-axis directions (right-left directions).

Thus, the positions of the receiving plates 72 and 72 are changed between the close positions at which their opposing edge portions are closest to each other and close the upper side of the second conveyance apparatus 5, and the open positions at which their opposing edge portions are spaced apart from each other and open the upper side of the second conveyance apparatus 5.

In part (a) in FIG. 33, the close positions and the open positions represent the positions of the opposing edge portions.

The open positions are positions at which the upper sides of two trays 6 and 6 placed on the second conveyance apparatus 5 are opened.

Two frames 74 and 74 extending in the Y-axis direction are arranged at fixed positions outward in the X-axis direction of the positions of the receiving plates 72 and 72 in the open positions.

Each transfer belt 71 has one end coupled to a frame 74 and the other end coupled to a traction plate 73, so that its middle portion is extended through the gap between the opposing edge portions of the receiving plates 72 and 72 and is wound around the opposing edge portion of the corresponding receiving plate 72.

A drive source (not shown) drives the traction plates 73 and 73 so as to reciprocally move in the X-axis directions (right-left directions).

In a state in which both receiving plates 72 and 72 are at the closed positions and trays 6 and 6 are positioned under the receiving plates 72 and 72, the set regions R1 and R2 are set on the upper surfaces of the transfer belts 71 and 71 to which the meat slices E are placed.

An output from the robot controller 34 causes meat slices E to be arranged onto these set regions R1 and R2 in the manner described above.

In the transfer device 70, when batches of meat slices E are arranged on the set regions R1 and R2 using the upper portions of the transfer belts 71 and 71, the receiving plates 72 and 72 and the traction plates 73 and 73 are driven in the X-axis directions.

As a result, as shown in part (b) in FIG. 33, the movements of the transfer belts 71 and 71 turning back at the opposing edge portions of the receiving plates 72 and 72 cause the batches of meat slices E arranged on the transfer belts 71 and 71 to be separated from the surface of the transfer belts 71 and 71 and fall into the trays 6 and 6 to be accommodated.

The trays 6 and 6 accommodating the batches of meat slices E are then conveyed to the −X side by the second conveyance apparatus 5.

Second Embodiment

FIGS. 34 to 38 show a hand device 33 of a second embodiment.

A coupling member 81 in the shape of a round bar couples the middle portions in the front-rear direction of left and right side plates 80L and 80R to form a framework.

The outer side surfaces of left and right standing portions 83L and 83R standing from the rear end portions of a support plate 82, which is rectangular in plan view, are fixed between and in contact with the inner side surfaces of the front end portions of the left and right side plates 80L and 80R.

Accordingly, the front end portion of the support plate 82 extends forward to a large extent from the left and right side plates 80L and 80R.

Figure 37:
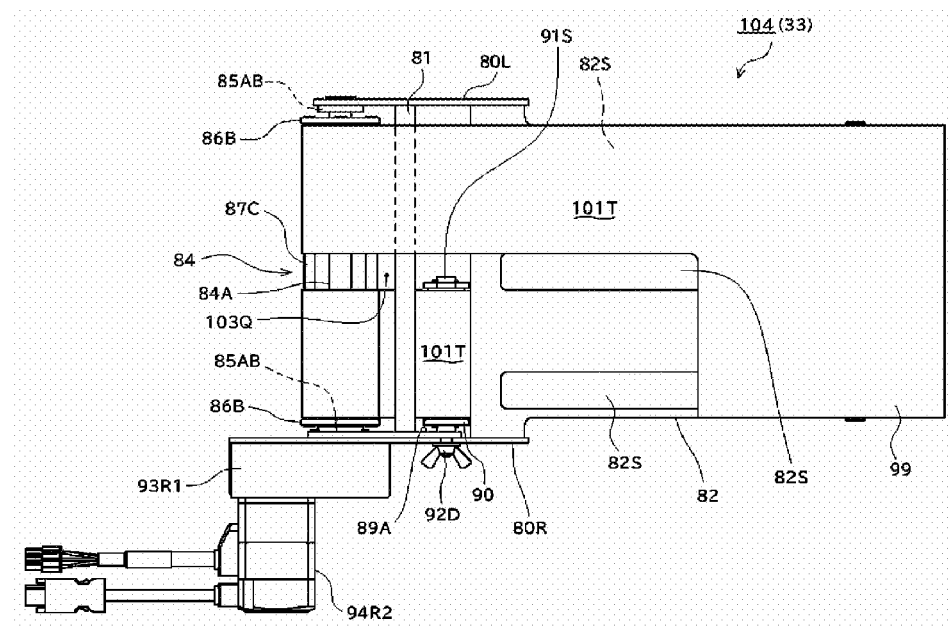
FIG. 37 is a bottom view for illustrating the hand device including the article transfer device of the second embodiment.

As shown in FIG. 37, three reinforcement plates 82S are fixed to the lower surface of the support plate 82 to limit bending and vibration.

The rear end portions of the left and right side plates 80L and 80R rotationally support opposite end portions of a rotation shaft 84A of a rotation frame 84 through bearings 85AB and 85AB.

The rotation frame 84 is formed by fixing circular support discs 86B to opposite ends of the rotation shaft 84A and fixing multiple bar-shaped members 87C between the left and right support discs 86B and 86B by welding.

The bar-shaped members 87C are arranged on an arc having the rotation shaft 84A in the center, in an orientation parallel to the rotation shaft 84A and at substantially equal pitches.

Figure 38:
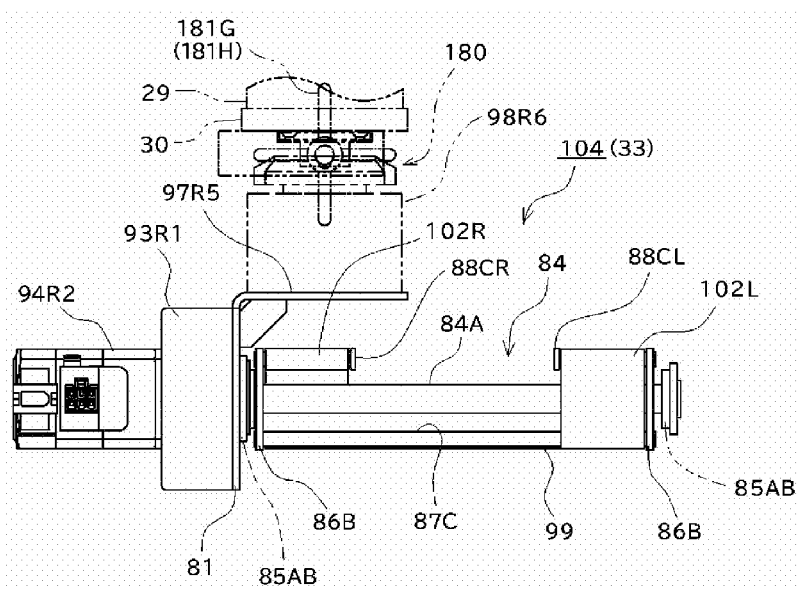
FIG. 38 is a rear view for illustrating the hand device including the article transfer device of the second embodiment.

As shown in FIG. 38, some of the bar-shaped members 87C are shortened to form retaining bar-shaped members 88CL and 88CR, with are fixed at their bases to the inner side surfaces of the left and right support discs 86B and 86B, respectively, so at to extend inward from the inner side surfaces of the support discs 86B and 86B.

The front end portion of a tension arm 89A rotationally supports a tension roller 90 through a support shaft 91S. The rear end portion of this tension arm 89A is supported so as to selectively swing upward and downward coaxially with the above-mentioned rotation shaft 84A.

The tension arm 89A extends along the inner side surface of the right side plate 80R.

The right end portion of the support shaft 91S extends outward through the tension arm 89A, and this projecting end portion is inserted in a cutout groove 92C extending in the up-down direction in the front portion of the right side plate 80R.

The projecting end portion of the support shaft 91S is threadedly engaged with an internal thread member 92D, which is rotated to fasten and fix the tension arm 89A and the right side plate 80R.

By reversely rotating the internal thread member 92D to loosen its fastening state, the tension arm 89A can be operated to swing to adjust the position in the up-down direction of the tension roller 90.

A transmission case 93R1 is attached to the outer side surface of the right side plate 80R, and a servomotor 94R2 is attached to the right side of the transmission case 93R1.

Figure 35:
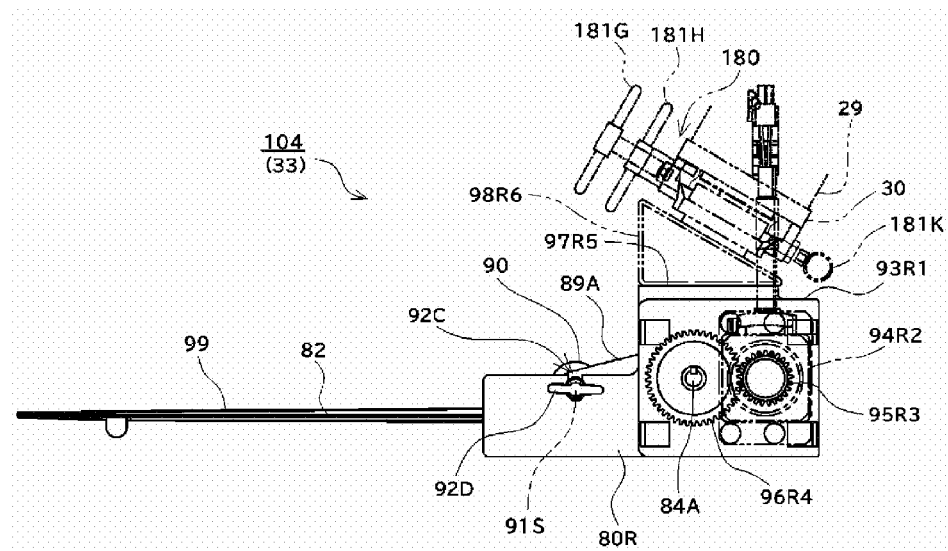
FIG. 35 is a right side view for illustrating the hand device including the article transfer device of the second embodiment.

As shown in FIG. 35, inside the transmission case 93R1, an output gear 95R3, which is fixed to the output shaft of the servomotor 94R2, and an input gear 96R4, which is fixed to the projecting end portion of the rotation shaft 84A, are meshed to each other.

Also, as shown in FIG. 38, the rear portion of the right side plate 80R is extended upward and then bent and extended leftward to form a mount portion 97R5.

The base portion of a spacer 98R6, which has the shape of a right triangle in side view, is fixed to the upper surface of the mount portion 97R5. An attachment/detachment device 180, which will be described below, is set between the inclined surface of the spacer 98R6 and the hand mount seat 30 of the robot arm 12.

The attachment/detachment device 180 attaches the hand device 33 to the wrist 29 of the robot arm 12.

Belt and Belt Looping Configuration of First Example

Figure 39:
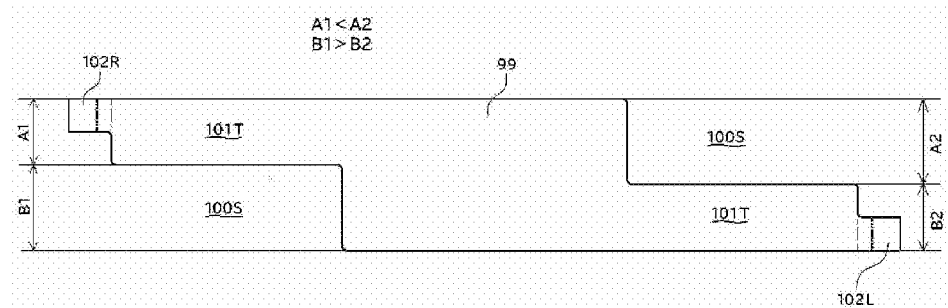
FIG. 39 is a plan view of a first example of a belt-shaped member.

As shown in FIG. 39, a belt 99 is formed of canvas or the like that can convey meat slices E, and a cutout section 100S and a narrow section 101T are formed adjacent to each other in the width direction of the belt 99 at each of opposite ends of the belt 99.

The width B1 of the cutout section 100S formed at one end of the belt 99 is set greater than the width B2 of the narrow section 101T formed at the other end of the belt 99. Likewise, the width A2 of the cutout section 100S formed at the other end of the belt 99 is set greater than the width A1 of the narrow section 101T formed at one end of the belt 99.

Figure 36:
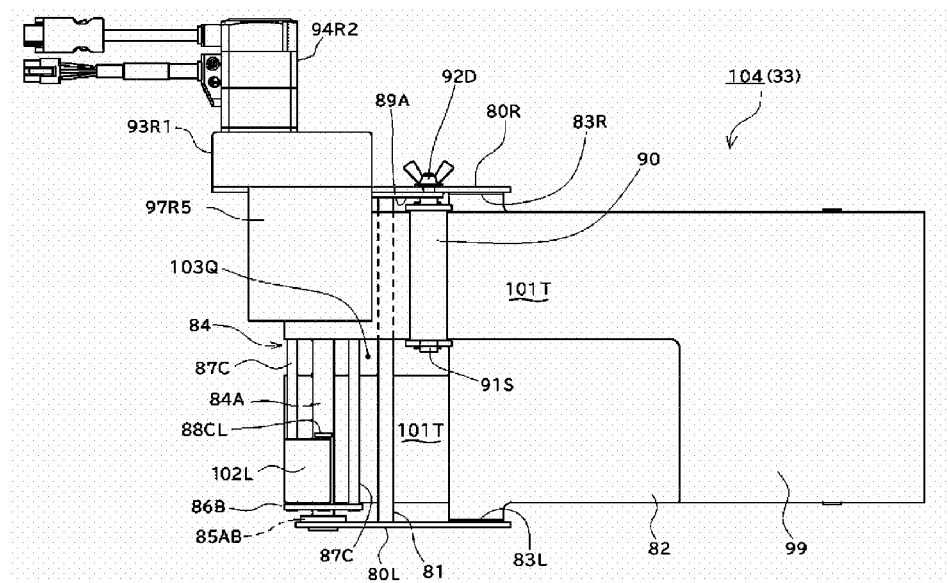
FIG. 36 is a plan view for illustrating the hand device including the article transfer device of the second embodiment.

As shown in FIGS. 36 and 37, the end portion of the narrow section 101T at one end of the belt 99 includes a loop-shaped engagement portion 102R, which is attached to the right retaining bar-shaped member 88CR such that the retaining bar-shaped member 88CR extends through the engagement portion 102R.

The belt 99 extends over the upper surface of the support plate 82 and is folded back at the distal end of the support plate 82 so that the other end portion of the belt 99 is looped to the lower surface of the support plate 82.

Also, the end portion of the narrow section 101T at the other end of the belt 99 includes a loop-shaped engagement portion 102L, which is attached to the left retaining bar-shaped member 88CL such that the retaining bar-shaped member 88CL extends through the engagement portion 102L.

As a result, the narrow section 101T at one end of the belt 99 and the narrow section 101T at the other end of the belt 99 are wound around sections of the rotation frame 84 that are adjacent in the direction of the rotation axis, with a gap 103Q is formed between the narrow sections 101T and 101T in the right-left direction.

That is, interference between the narrow section 101T at one end of the belt 99 and the narrow section 101T at the other end is prevented during winding and unwinding.

As shown in FIG. 38, the winding direction of the narrow section 101T at one end of the belt 99 with respect to the rotation frame 84 is opposite to the winding direction of the narrow section 101T at the other end of the belt 99. The length of the belt 99 that is unwound at one end by rotation of the rotation frame 84 is set to be equal to the length of the belt 99 that is wound at the other end.

That is, the relationship is set such that one of opposite ends of the belt 99 is wound by a predetermined length, and the other is unwound by this predetermined length.

As shown in FIG. 36, at a position immediately before the rotation frame 84, the tension roller 90 is in contact with the upper surface of the narrow section 101T at one end of the belt 99, thereby applying tension to the belt 99.

By adjusting the position in the up-down direction of the tension roller 90, the tension of the belt 99 can be adjusted to accommodate the stretching of the belt 99 caused through operation.

The support plate 82, the rotation frame 84, the belt 99, the servomotor 94R2, and the like form the transfer device 104 of meat slices E as the hand device 33.

Second Example of Belt-Shaped Member

Figure 40:
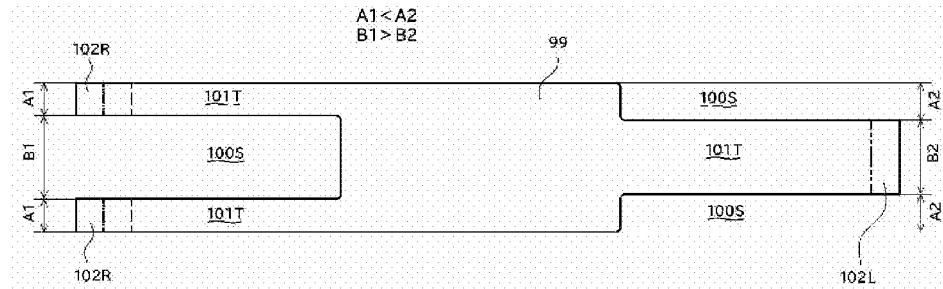
FIG. 40 is a plan view of a second example of a belt-shaped member.

FIG. 40 shows a second example of a belt 99.

A single cutout section 100S is formed by cutting out a central portion in the right-left direction at one end of the belt 99, and left and right narrow sections 101T and 101T are formed on the left and right sides of this single cutout section 100S.

Additionally, left and right cutout sections 100S and 100S are formed by cutting out left and right side portions at the other end of the belt 99, and a single narrow section 101T is formed between the left and right cutout sections 100S and 100S.

The width B1 of the cutout section 100S formed at one end of the belt 99 is set greater than the width B2 of the narrow section 101T formed at the other end of the belt 99.

Likewise, the width A2 of the left and right cutout sections 100S and 100S formed at the other end of the belt 99 is set greater than the width A1 of the left and right narrow sections 101T formed at one end of the belt 99.

As a result, the left and right narrow sections 101T and 101T at one end of the belt 99 and the single narrow section 101T at the other end of the belt 99 are wound around sections of the rotation frame 84 that are adjacent in the direction of the rotation axis, with gaps 103Q formed between one another in the right-left direction (this state is not shown).

That is, interference between the left and right narrow sections 101T at one end of the belt 99 and the narrow section 101T at the other end is prevented during winding and unwinding.

Block Circuit of Arrangement System

Figure 41:
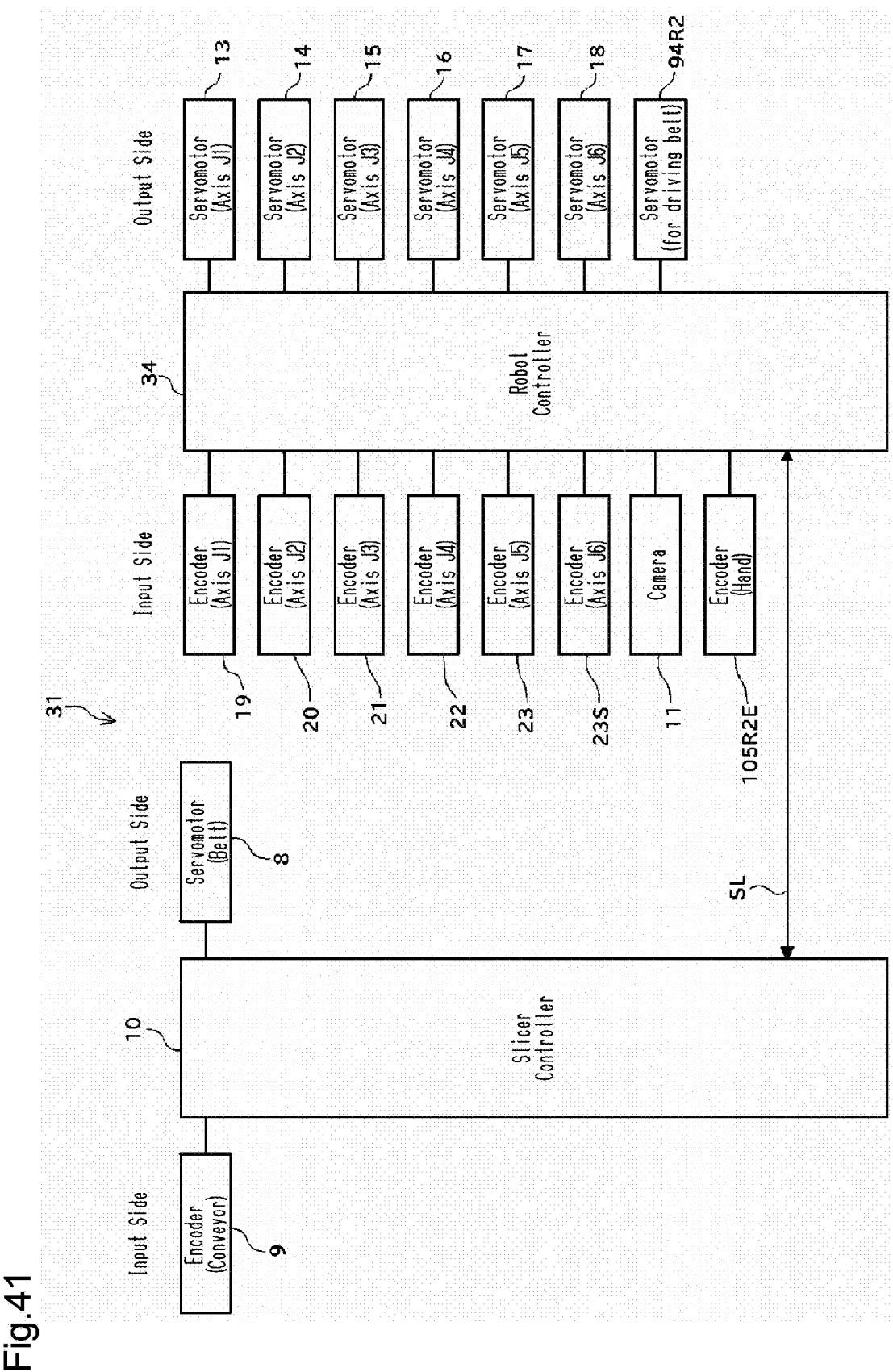
FIG. 41 is a block diagram of an arrangement system using the hand device including the article transfer device of the second embodiment.

As shown in FIG. 41, the above-mentioned encoders 19 to 23S, the encoder 105R2E for the servomotor 94R2, and the camera 11 are connected to the input side of a robot controller 34 including a calculation portion, a storage portion, and the like.

The output side of the robot controller 34 is connected to the above-mentioned servomotors 13 to 18 and the servomotor 94R2.

Although not shown, on the output side of the robot controller 34, individual relay circuits for operating the servomotors 13 to 18 and the servomotor 94R2 are interposed.

As for the slicer controller 10 of the slicer 1, the encoder 9 is connected to the input side, and the servomotor 8 is connected to the output side.

The illustration of other sensors and actuators for operation control of the slicer 1 is omitted.

A communication line SL connects the robot controller 34 to the slicer controller 10. The food arrangement controller (food batch formation controller) 31 is configured as described above.

Arrangement Control

As shown in FIG. 2, the slicer 1 cuts a block of meat to a predetermined thickness, and the cut meat slices E are successively placed on the conveyance surface 3a of the belt 3 of the first conveyance apparatus 2 so as to overlap each other. A meat slice batch (food batch) E1 is thus formed. Meat slice batches E1 are successively formed at predetermined intervals by controlling the driving speed of the belt 3. Each meat slice E forming the meat slice batch E1 may be folded in half.

According to the size of the meat slice batch E1 obtained from the image-capturing result of the camera 11, the center position in the X-axis direction of the end portion on the −Y side of the meat slice batch E1 is set as a target point BP. Alternatively, the position of the centroid of the area of the entire meat slice batch E1 may be set as the target point BP.

When the belt 3 is driven and the meat slice batch E1 reaches the collection position T, the belt 3 is temporarily stopped, and the slicer controller 10 outputs a collection start signal to the robot controller 34.

When this collection signal is input to the robot controller 34, outputs to the servomotors 13 to 18 control the active joints of the robot arm 12, thereby controlling the movement of the hand device 33 attached to the wrist 29.

That is, in a state in which the center point in the width direction of the belt 99 in the distal end portion of the transfer device 104 of the hand device 33 coincides with the above-described target point BP (the center position in the width direction (X-axis direction) of the meat slice batch E1), the hand device 33 is moved in the Y-axis direction from the −Y side to the +Y side so that the transfer device 104 is advanced toward the meat slice batch E1.

At this time, the robot controller 34 sends an output to the servomotor 94R2, and the belt 99 is driven in the forward direction and scoops the meat slice batch E1. The driving of the belt 99 is then stopped.

Then, outputs from the robot controller 34 to the servomotors 13 to 18 control the active joints of the robot arm 12, and the hand device 33 is temporarily lifted and then moved to the set position in the first column in the set region R formed on the upper surface of the base of the tray 6.

At this set position, the hand device 33 is lowered while facing the +Y direction, and the hand device 33 is moved in the −Y direction while driving the belt 99 of the transfer device 104 in the reverse direction.

Figure 42:
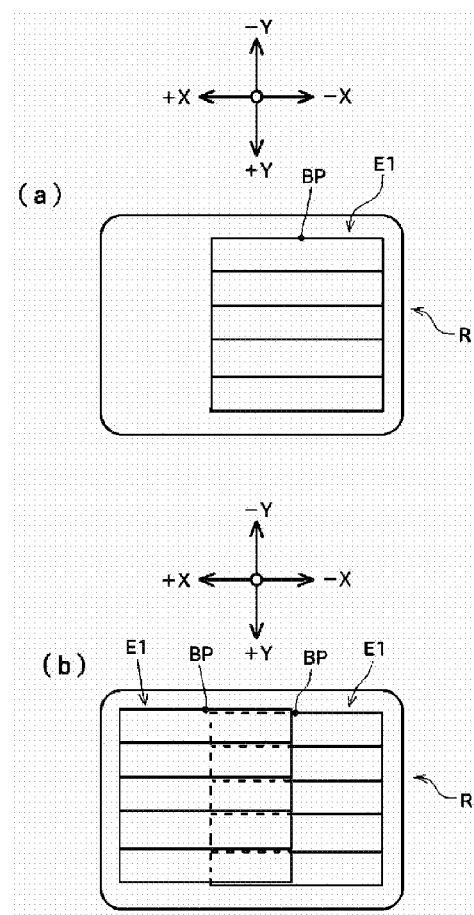
FIG. 42 is an explanatory diagram in which part (a) is an explanatory diagram of a state in which the hand device including the article transfer device of the second embodiment starts arranging, and part (b) is an explanatory diagram of a state in which the arrangement is finished.

As a result, as shown in part (a) in FIG. 42, the meat slice batch E1 of the first row is transferred.

This transfer operation is also performed for the set position in the second column adjacent in the set region R. Consequently, as shown in part (b) in FIG. 42, the arrangement is completed with the meat slice batch E1 of the second column overlapping the meat slice batch E1 of the first column.

The second conveyance apparatus 5 stops conveying the tray 6 until the arrangement of the meat slice batches E1 on the tray 6 is completed.

After the arrangement of the meat slice batches E1 on the tray 6 is completed, the second conveyance apparatus 5 is driven to carry out the tray 6, and the next empty tray is sent to the standby position.

Third Embodiment

FIGS. 43 to 48 show a hand device 33 of a third embodiment.

This hand device 33 includes a collection portion including an upper belt 99 and a lower belt 99.

Figure 46:
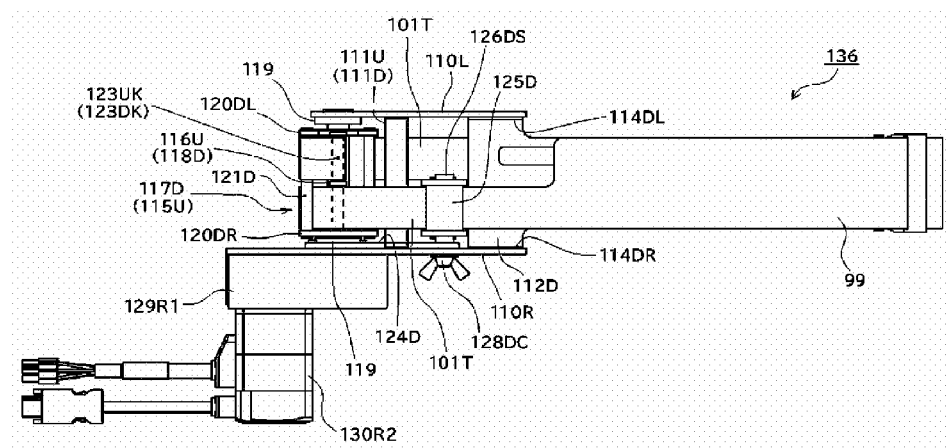
FIG. 46 is a bottom view for illustrating the hand device including the article transfer device of the third embodiment.

As shown in FIG. 46, upper and lower round bar-shaped coupling members 111U and 111D couple the middle portions in the front-rear direction of left and right side plates 110L and 110R to form a framework.

The outer side surfaces of left and right standing portions 113L and 113R standing from the rear end portions of an upper support plate 112U, which is rectangular in plan view, are fixed between and in contact with the inner side surfaces of the front end portions of the left and right side plates 110L and 110R.

The outer side surfaces of left and right hanging portions 114DL and 114DR hanging down from the rear end portion of a lower support plate 112D, which is rectangular in plan view, are fixed between and in contact with the inner side surfaces of the front end portions of the left and right side plates 110L and 110R.

Thus, the upper support plate 112U and the lower support plate 112D are parallel and spaced apart from each other by a predetermined gap.

The front end portions of the upper support plate 112U and the lower support plate 112D extend forward to a large extent from the left and right side plates 110L and 110R.

Figure 43:
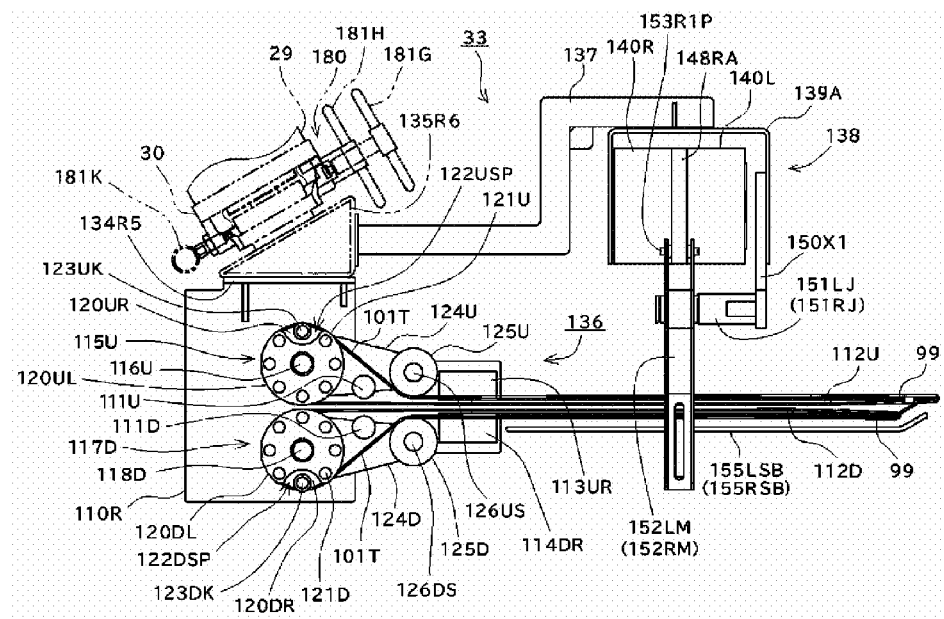
FIG. 43 is a left side view for illustrating a hand device including an article transfer device of a third embodiment.
Figure 44:
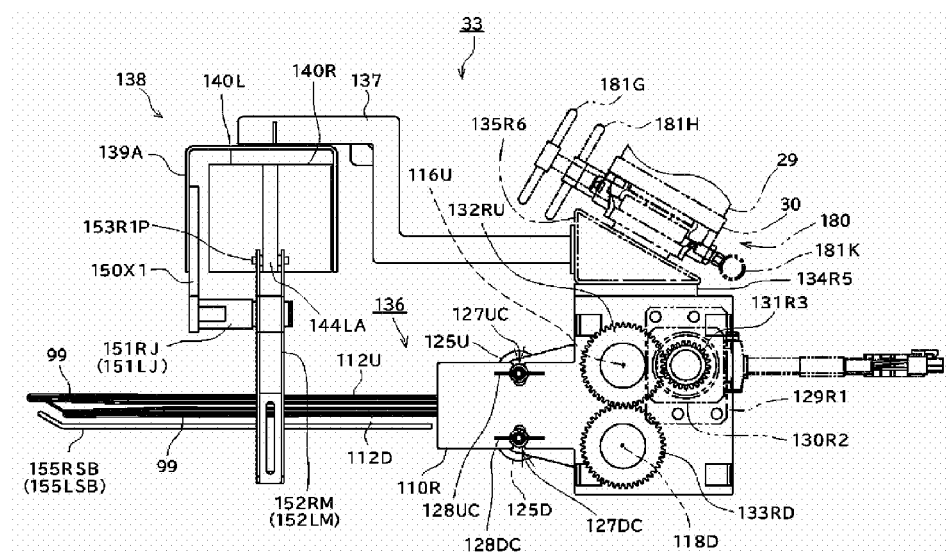
FIG. 44 is a right side view for illustrating the hand device including the article transfer device of the third embodiment.

As shown in FIGS. 43 and 44, the front end portion of the upper support plate 112U extends frontward of the front end portion of the lower support plate 112D.

The middle portions in the front-rear direction of the left and right side plates 110L and 110R rotationally support opposite end portions of a rotation shaft 116U of an upper rotation frame 115U and a rotation shaft 118D of a lower rotation frame 117D through bearings 119 and 119.

These upper and lower rotation frames 115U and 117D include circular support discs 120UL, 120UR, 120DL, and 120DR fixed to opposite end portions of the rotation shafts 116U and 118D.

Multiple upper bar-shaped members 121U are welded and fixed between the left and right upper support discs 120UL and 120UR, and multiple lower bar-shaped members 121D are welded and fixed between the left and right lower support discs 120DL and 120DR.

The bar-shaped members 121U and 121D are arranged on arcs having the rotation shafts 116U and 118D, respectively, in their centers, in orientations parallel to the rotation shafts 116U and 118D and at substantially equal pitches.

Figure 47:
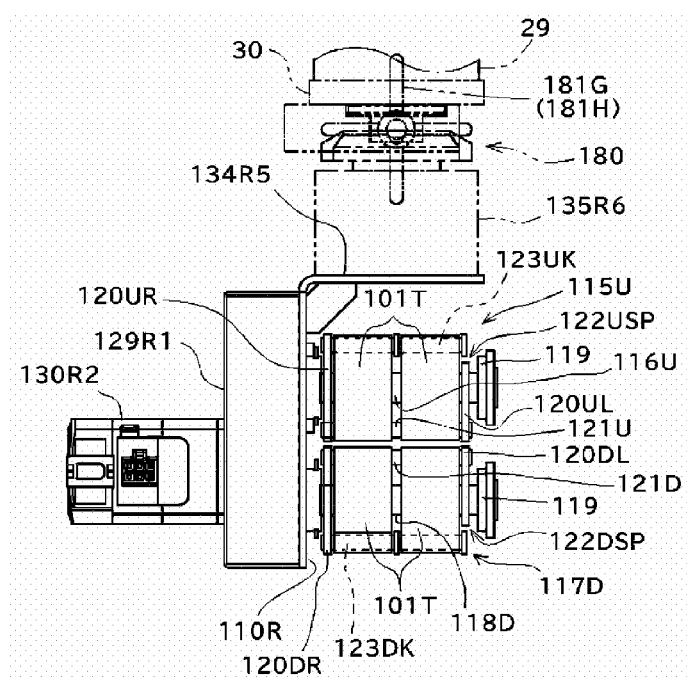
FIG. 47 is a rear view for illustrating the hand device including the article transfer device of the third embodiment.

Furthermore, as shown in FIGS. 43 and 47, the outer circumference portions of the left support discs 120UL and 120DL of the upper and lower rotation frames 115U and 117D are partly cut out to form cutout sections 122USP and 122 DSP.

Each of the sets of bar-shaped members 121U and 121D includes one retaining bar-shaped member 123UK, 123DK having a cantilever structure. The distal end portions of these retaining bar-shaped members 123UK and 123DK face the cutout sections 122USP and 122DSP, respectively.

The gaps between the cutout sections 122USP and 122DSP and the distal end portions of the retaining bar-shaped members 123UK and 123DK are configured to allow the upper and lower belts 99 and 99 to be attached and detached.

Figure 45:
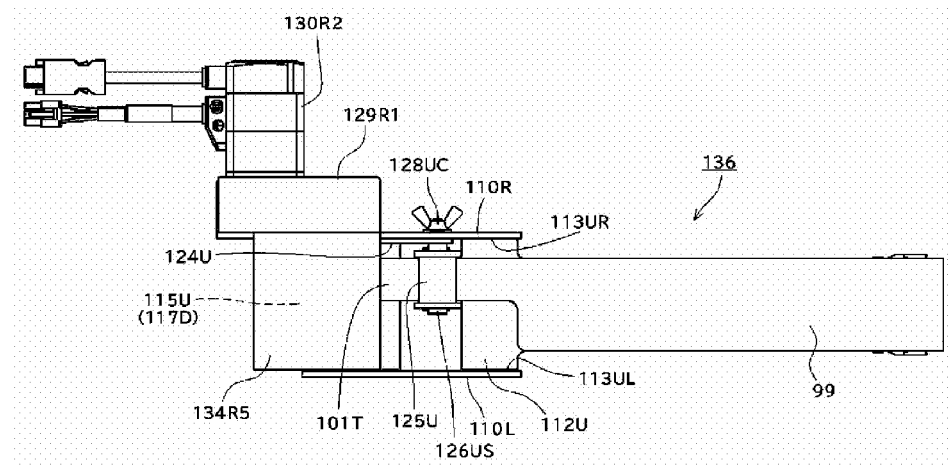
FIG. 45 is a plan view for illustrating the hand device including the article transfer device of the third embodiment.

As shown in FIGS. 43, 45, and 46, the front end portions of upper and lower tension arms 124U and 124D rotationally support upper and lower tension rollers 125U and 125D through support shafts 126US and 126DS.

The rear end portions of the upper and lower tension arms 124U and 124D are supported so as to selectively swing upward and downward coaxially with the above-mentioned upper and lower rotation shafts 116U and 118D.

The upper and lower tension arms 124U and 124D extend along the inner side surface of the right side plate 110R.

The right end portions of the support shafts 126US and 126DS extend outward through the tension arms 124U and 124D, and these projecting end portions are inserted in upper and lower cutout grooves 127UC and 127DC, respectively, which are formed in the front portion of the right side plate 110R to open upward and downward.

The projecting end portions of the support shafts 126US and 126DS are threadedly engaged with internal thread members 128UC and 128DC, which are rotated to fasten and fix the tension arms 124U and 124D and the right side plate 110R.

By reversely rotating the internal thread members 128UC and 128DC to loosen their fastening states, the tension arms 124U and 124D can be operated to swing to adjust the positions in the up-down direction of the tension rollers 125U and 125D.

A transmission case 129R1 is attached to the outer side surface of the right side plate 110R, and a servomotor (belt drive source in the claims) 130R2 is attached to the right side surface of the transmission case 129R1.

As shown in FIG. 44, inside the transmission case 129R1, an output gear 131R3, which is fixed to the output shaft of the servomotor 130R2, and an input gear 132RU, which is fixed to the projecting end portion of the upper rotation shaft 116U, are meshed to each other.

Also, this input gear 132RU is meshed with an input gear 133RD fixed to the projecting end portion of the lower rotation shaft 118D.

Thus, an output from the servomotor 130R2 drives and rotates the upper rotation shaft 116U and the lower rotation shaft 118D in opposite directions.

As shown in FIG. 47, the rear portion of the right side plate 110R is extended upward and then bent and extended leftward to form a mount portion 134R5.

The base portion of a spacer 135R6, which has the shape of a right triangle in side view, is fixed to the upper surface of the mount portion 134R5. An attachment/detachment device 180, which will be described below, is set between the inclined surface of the spacer 135R6 and the hand mount seat 30 of the robot arm 12.

The attachment/detachment device 180 attaches the hand device 33 to the wrist 29 of the robot arm 12.

Belt Looping Configuration

The two belts 99 and 99 formed narrower than the belt 99 shown in FIG. 39 are used. As shown in FIGS. 46 and 47, the end portion of the narrow section 101T at one end of the upper belt (upper belt in the claims) has a loop-shaped engagement portion 102R, which is attached to a section on the base side of the upper retaining bar-shaped member 123UK such that the retaining bar-shaped member 123UK extends through the engagement portion 102R.

The upper belt 99 extends over the upper surface of the upper support plate 112U and is folded back at the distal end of the support plate 112U so that the other end portion of the upper belt 99 is looped to the lower surface of the support plate 112U.

Also, the end portion of the narrow section 101T at the other end of the upper belt 99 has a loop-shaped engagement portion 102L, which is attached to a section on the distal end side of the upper retaining bar-shaped member 123UK such that the retaining bar-shaped member 123UK extends through the engagement portion 102L.

As a result, the narrow section 101T at one end of the belt 99 and the narrow section 101T at the other end are wound around sections of the upper rotation frame 115U that are adjacent in the direction of the rotation axis, with a gap 103Q formed between the narrow sections 101T and 101T in the right-left direction.

That is, interference between the narrow section 101T at one end of the belt 99 and the narrow section 101T at the other end is prevented during winding and feeding.

As shown in FIGS. 43 and 46, the winding direction at one end of the belt 99 with respect to the upper rotation frame 115U is opposite to the winding direction at the other end. The length of the belt 99 that is unwound at one end by rotation of the rotation frame 115U is set to be substantially equal to the length of the belt 99 that is wound at the other end.

That is, the relationship is set such that one of the opposite ends of the upper belt 99 is wound by a predetermined length, and the other is unwound by the predetermined length.

As shown in FIG. 43, at a position immediately before the upper rotation frame 115U, the upper tension roller 125U is in contact with the upper surface of the narrow section 101T at one end of the belt 99, thereby applying tension to the belt 99.

By adjusting the position in the up-down direction of the tension roller 125U, the tension of the belt 99 can be adjusted to accommodate the stretching of the belt 99 caused by operation.

The looping configuration of the upper belt 99 has been described above. The looping configuration of the lower belt (lower belt in the claims) 99 is symmetrical in the up-down direction with the looping configuration of the upper belt 99 and is thus not described.

As described above, the upper belt 99 and the lower belt 99 are arranged in proximity to each other in the up-down direction, extend obliquely downward, and are configured to be driven in opposite directions.

The transfer device 136 is configured as described above.

Figure 48:
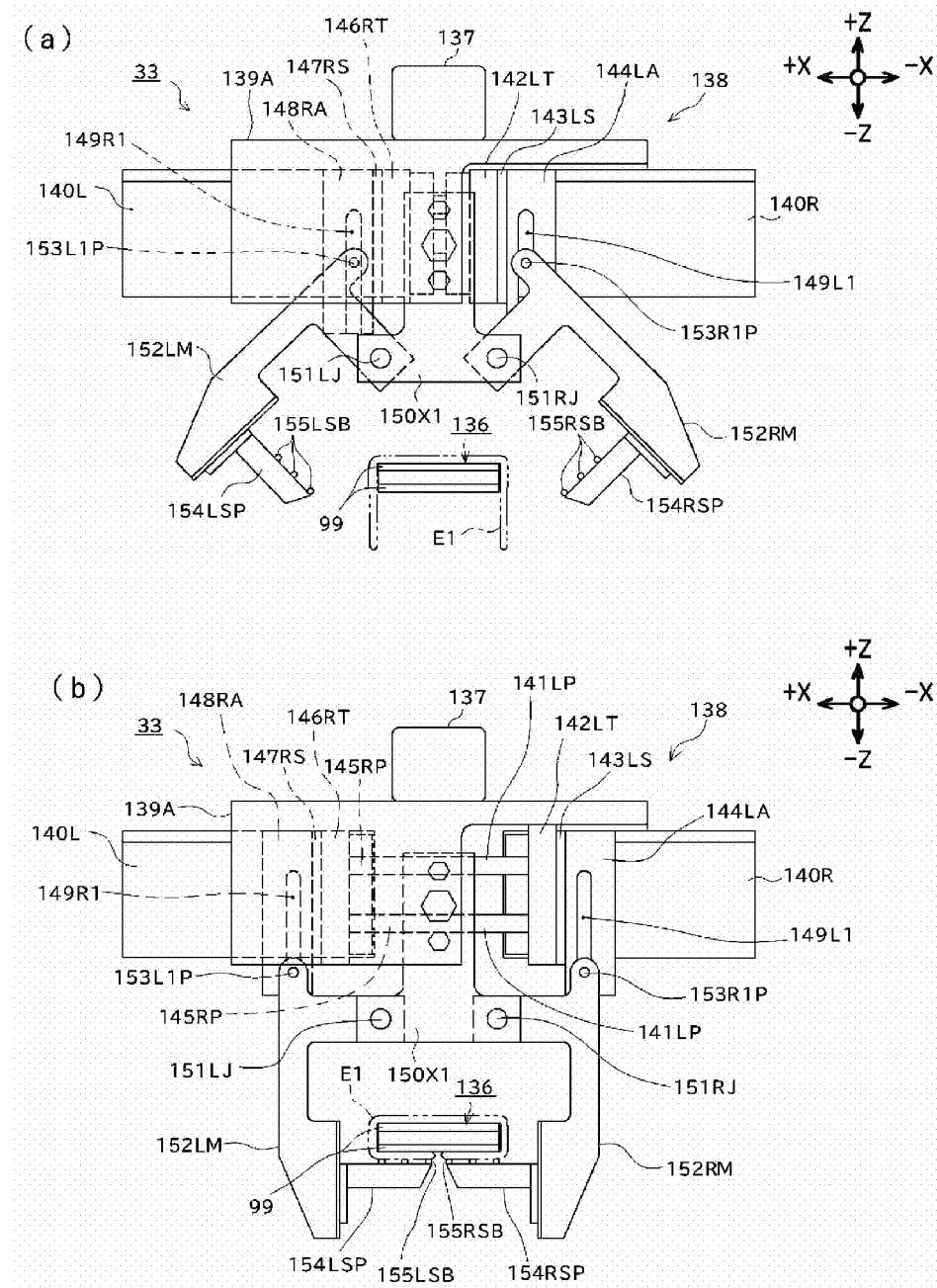
FIG. 48 is a diagram showing operation states of a part of the third embodiment in which part (a) is an explanatory front view of a state before opposite end portions of the meat slice batch are folded, and part (b) is a front view for illustrating a state in which the end portions of the meat slice batch are folded.

As shown in FIGS. 43, 44, and 48, the base of a suspension member 137, which is bent in a crank shape in side view, is fixed to the front surface of a spacer 135R6, and a folding device (folding portion in the claims) 138 is attached to the distal end portion (front end portion) of the suspension member 137.

Left and right air cylinders (folding portion drive source in the claims) 140L and 140R are fixed to the inner portion of a support frame 139A having the shape of inverted letter U in side view. The air cylinders 140L and 140R are at different positions in the front-rear direction.

That is, the right air cylinder 140R is arranged at a position that is offset rearward from the left air cylinder 140L.

The left air cylinder 140L includes upper and lower pistons 141LP and 141LP extending to the right side. A plate 142LT is fixed to the distal ends of the pistons 141LP and 114LP. An operation plate 144LA, which is L-shape in plan view, is fixed to the plate 142LT through a spacer 143LS.

Also, the right air cylinder 140R includes upper and lower pistons 145RP and 145RP extending to the left side. A plate 146RT is fixed to the distal ends of the pistons 145RP and 145RP. An operation plate 148RA, which is L-shape in plan view, is fixed to the plate 146RT through a spacer 147RS.

The left and right operation plates 144LA and 148RA have slots 149L1 and 149R1, respectively, extending in the up-down direction.

The upper portion of an inverted T-shaped support plate 150X1 is fixed to the support frame 139A. Inner projecting portions formed in the upper parts of left and right pivot arms 152LM and 152RM are pivotally attached to the left and right ends of the lower side portion of the support plate 150X1 through left and right support shafts 151LJ and 151RJ.

Furthermore, pins 153L1P and 153R1P, which are fixed to the upper end portions of the left and right pivot arms 151LM and 151RM, are inserted through the slots 149L1 and 149R1 formed in the left and right operation plates 144LA and 148RA, respectively.

The bases of left and right support members 154LSP and 154RSP extending inward are fixed to the inner side surfaces of the lower end portions of the left and right pivot arms 152LM and 152RM. Three thin bar-shaped members 155LSB, 155RSB extending in the front-rear direction are fixed to the upper surface of each of the left and right support members 154LSP and 154RSP.

With the above configuration, when the pistons 141LP and 145RP of the left and right air cylinders 140L and 140R perform contraction operation, the left and right pivot arms 152LM and 152RM are pivoted and opened so as to widen the distance between them, and the left and right bar-shaped members 155LSB and 155RSB are retracted outward from the lower side of the transfer device 136 (corresponding to the unfolding operation in the claims).

In this state, the left and right end portions of the meat slice batch E1 supported on the transfer device 136 hang down. (See part (a) in FIG. 48)

With the above configuration, when the pistons 141LP and 145RP of the left and right air cylinders 140L and 140R perform extension operation, the left and right pivot arms 152LM and 152RM are pivoted and closed so as to shorten the distance between them, and the left and right bar-shaped members 155LSB and 155RSB approach the lower surface of the transfer device 136 (this operation corresponds to the folding operation in the claims).

As a result, the left and right end portions of the meat slice batch E1 supported by the transfer device 136 and hanging down are lifted toward the lower surface of the transfer device 136, so that the left and right end portions of the meat slice batch E1 are folded. (See part (b) in FIG. 48)

According to the size of the meat slice batch (food) E1 obtained by the camera 11, selection is automatically made between a first state in which the folding device 138 folds both end portions of the meat slice batch E1, and a second state in which the folding device 138 only folds one end portion of the meat slice batch E1. It may also be configured that the first state and the second state are switched with a manual switch (not shown) connected to the robot controller 34.

The robot controller 34 (controller in the claims) is provided that controls each portion such that, when the first state is selected, the upper belt 99 scoops the central portion in the length direction of the meat slice batch E1, and when the second state is selected, the upper belt 99 scoops a section of the meat slice batch E1 that is offset by a set distance from the central portion in the length direction.

The transfer device 136, the folding device 138, and the like form the hand device 33.

Block Circuit of Arrangement System

Figure 49:
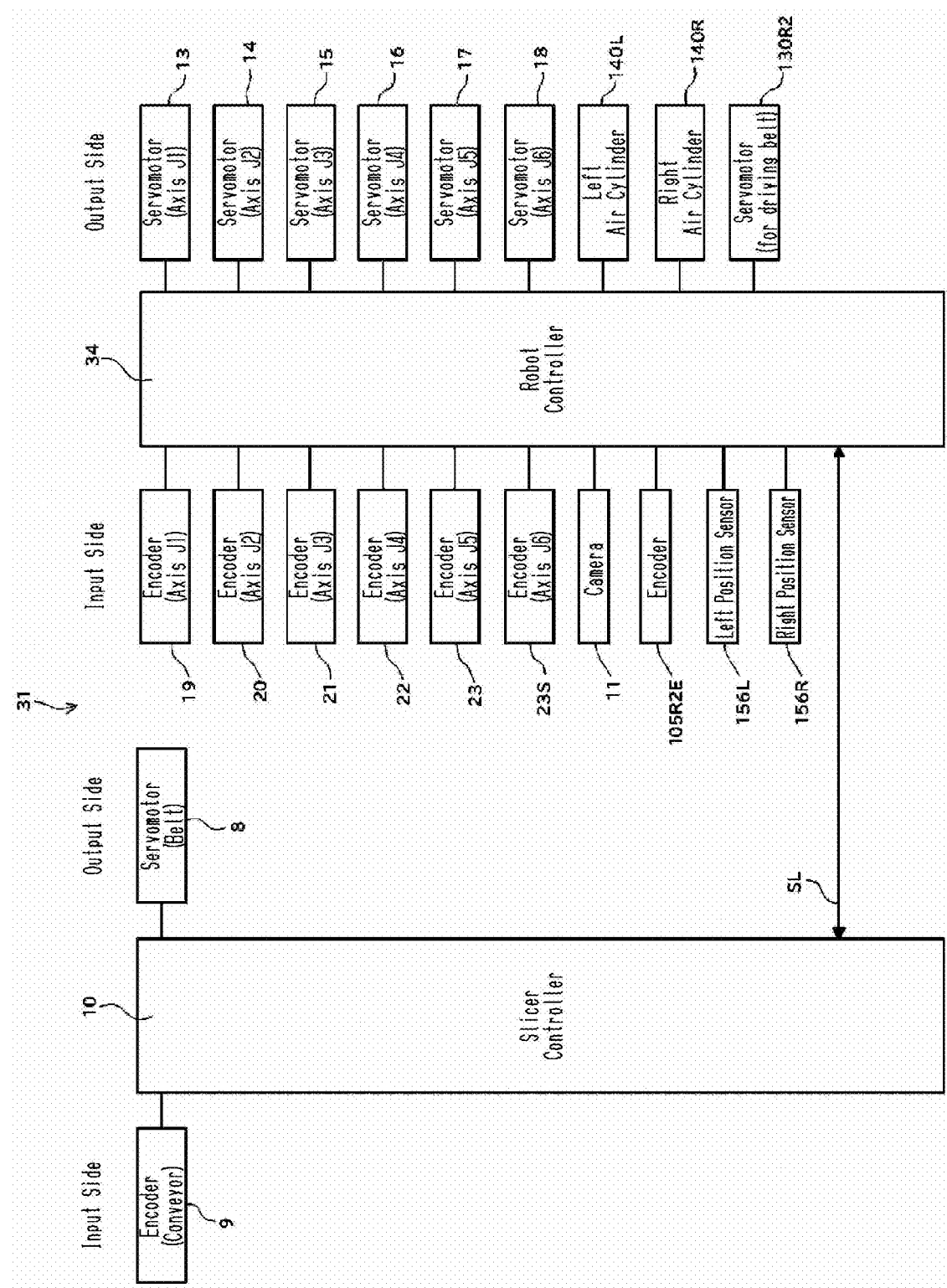
FIG. 49 is a block diagram of an arrangement system using the hand device including the article transfer device of the third embodiment.

As shown in FIG. 49, in place of the servomotor 94R2 coupled to the output side of the robot controller 34 in the block diagram of FIG. 41, left and right air cylinders 140L and 140R and a servomotor 130R2 are coupled.

Also, in addition to the encoder 105R2E connected to the input side of the robot controller 34, left and right position sensors (or stroke sensors) 156L and 156R for detecting the extension and contraction positions of the left and right air cylinders 140L and 140R are connected.

Figure 50:
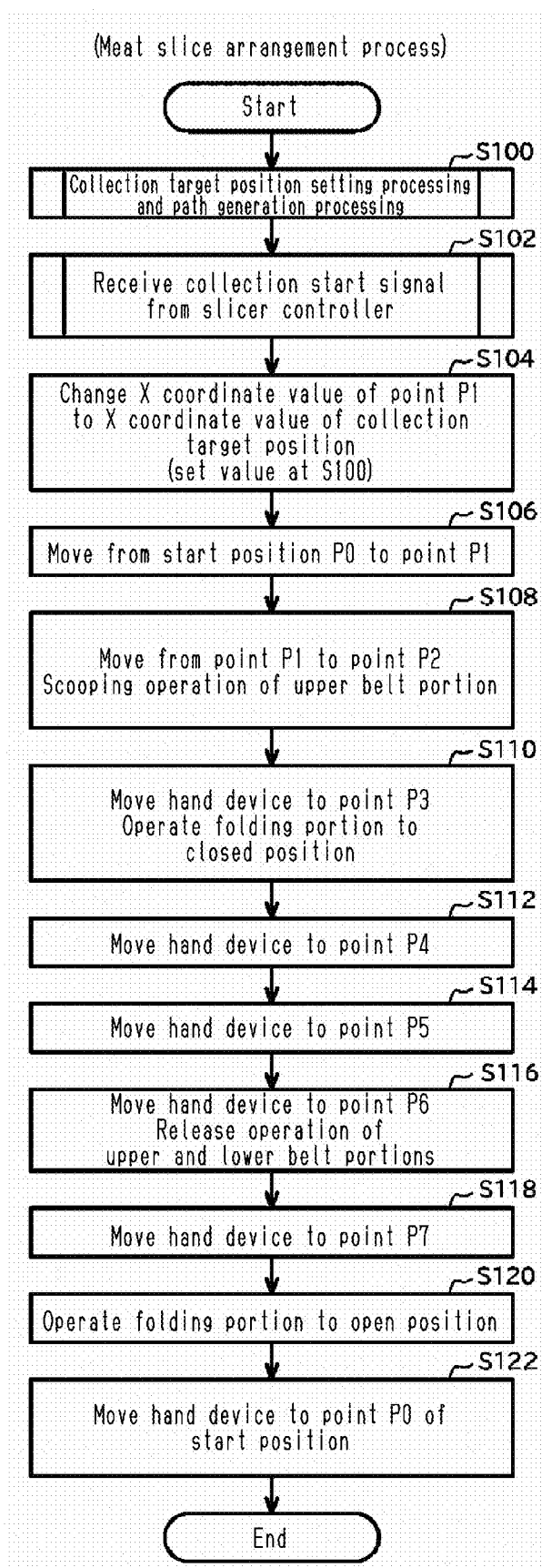
FIG. 50 is a flowchart to be performed by a food arrangement controller of the third embodiment.

The flowchart shown in FIG. 50 shows another example of the process at S18A in the flowchart shown in FIG. 19.

Arrangement Process

S100

The robot controller 34 performs collection target position setting processing and path generation processing.

In the collection target position setting processing, according to the size of the meat slice batch (food) E1 obtained by the camera 11, the central portion of the meat slice batch E1 in the length direction or a position adjacent to the central portion is set as the target point BP for collection.

The control point in this embodiment is the center position in the width direction of the distal end portion of the upper belt 99.

Figure 51:
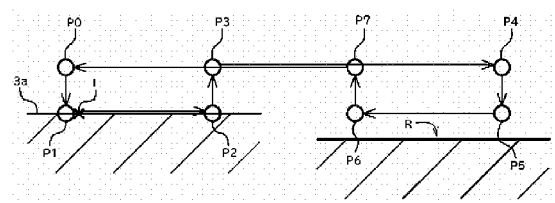
FIG. 51 is an explanatory diagram showing a path of the hand device of the third embodiment in side view.

In the path generation processing, a path for moving from point P0 to P7 and returning from point P7 to P0 shown in FIG. 51 is generated.

Point P0 is the initial position of the hand device 33 and is set as a fixed value. Point P0 is set directly above the center line t of the width of the belt 3 of the first conveyance apparatus 2 of the slicer 1.

Point P1 is located below point P0 and set as the position of the hand device 33 to maintain a position that is offset to the −Y side from the target point BP at the collection position T.

This point P1 is set at a height that allows the distal end of the upper belt 99 to slide on the conveyance surface 3a.

Point P2 is set to a position that has the same X-axis coordinate and the Z-axis coordinate as point P1 and is on the downstream side (+Y side) of the Y-axis coordinate of point P1.

The hand device 33 moves from point P1 to point P2 to scoop the meat slice batch E1 at the collection position T onto the upper surface of the upper belt 99.

Point P3 has the same X-axis and Y-axis coordinates as point P2, and the Z-axis coordinate of point P3 is set greater (higher) than the Z-axis coordinate of point P2. The height of point P3 from the conveyance surface 3a is set such that the ends of the meat slice batch E1 are not in contact with the conveyance surface 3a with the meat slice batch E1 scooped by the hand device 33.

Point P5 is at a position above and spaced apart from the set region R and set as a placement start position of the meat slice batch E1 held by the hand device 33.

Point P4 is set at a position directly above point P5.

Point P6 is positioned on the −Y side of the Y-axis coordinate of point P5, and is set as a placement end position of the meat slice batch E1.

Point P7 is set at a position directly above point P6.

S102

The robot controller 34 waits until it receives a collection start signal, which is output from the slicer controller 10 when the meat slice batch E1 is positioned at the collection position T. Upon receiving the collection signal, the robot controller 34 proceeds to S104.

S104

The robot controller 34 changes the X-axis coordinate value of point P1 to the X-axis coordinate of the collection target position obtained at S100.

S106

The robot controller 34 controls the robot arm 12 to lower the control point, which is the center point in the width direction of the upper belt 99 of the hand device 33, from point P0 to point P1, thereby moving the distal end of the upper belt 99 into contact with or in proximity to the conveyance surface 3a.

S108

The robot controller 34 controls the robot arm 12 to move the control point from point P1 to point P2.

That is, in a state in which the center point in the width direction of the distal end portion of the upper belt 99 in the distal end portion of the transfer device 136 of the hand device 33 (control point) coincides with the target point BP (the center position in the width direction (X-axis direction) of the meat slice batch E1), the hand device 33 is moved in the Y-axis direction from the −Y side to the +Y side so that the transfer device 136 is advanced toward the meat slice batch E1.

At this time, the robot controller 34 sends an output to the servomotor 130R2 to drive the upper belt 99 in the forward direction (at this time, the lower belt 99 is driven in the direction opposite to the upper belt 99), thereby starting a scooping operation of the meat slice batch E1.

S110

After the meat slice batch E1 is scooped and the driving of the upper belt 99 is stopped, or while the meat slice batch E1 is scooped by continuing the driving of the upper belt 99, the robot controller 34 controls the robot arm 12 to lift the control point from point P2 to point P3.

At this time, outputs from the robot controller 34 to the servomotors 13 to 18 control the active joints of the robot arm 12, and the hand device 33 is temporarily lifted and then moved to the set position in the first column in the set region R formed on the upper surface of the base of the tray 6.

During this time, the robot controller 34 sends outputs to the left and right air cylinders 140L and 140R so that the pistons 141LP and 145RP of the left and right air cylinders 140L and 140R perform an extension operation.

The left and right pivot arms 152LM and 152RM thus pivot and are closed to shorten the distance between them, moving the left and right bar-shaped members 155LSB and 155RSB closer to the lower surface of the transfer device 136.

As a result, the left and right end portions of the meat slice batch E1 hanging down and supported by the transfer device 136 are lifted toward the lower surface of the transfer device 136, so that the left and right end portions of the meat slice batch E1 are folded when the above-mentioned first state is selected.

S112

The robot controller 34 then controls the robot arm 12 to move the control point from point P3 to point P4.

S114

The robot controller 34 then controls the robot arm 12 to move the control point from point P4 to point P5 while keeping the orientation of the hand device 33 facing the +Y direction.

S116

Then, the robot controller 34 controls the robot arm 12 to move the control point from point P5 to point P6.

At this time, the hand device 33 is moved (retracted) in the −Y direction while driving the belt 99 of the transfer device 136 in the reverse direction (while performing a releasing operation).

Figure 52:
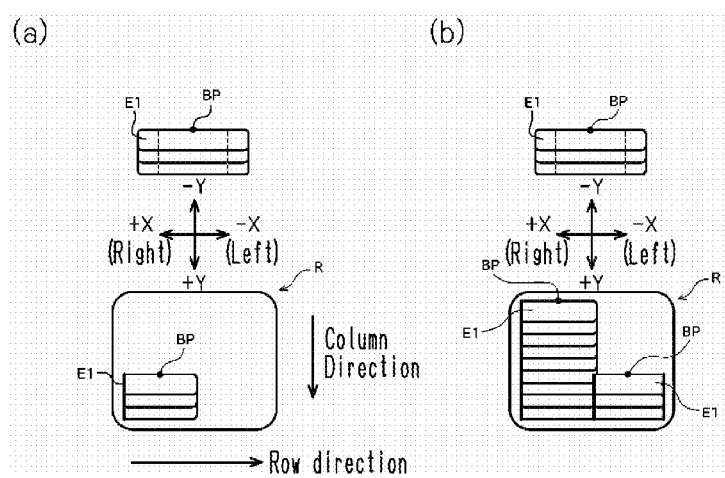
FIG. 52 is an explanatory diagram in which part (a) is an explanatory diagram of a state in which the hand device including the article transfer device of the third embodiment starts arranging, and part (b) is an explanatory diagram of a state during the arrangement.

As a result, as shown in part (a) in FIG. 52, the meat slice batch E1 of the first column is transferred into the set region R with its end portions folded downward.

S118

Then, the robot controller 34 controls the robot arm 12 to move the control point from point P6 to point P7.

S120

After the control point moves to point P7, the robot controller 34 sends outputs to the left and right air cylinders 140L and 140R to cause the left and right pivot arms 152LM and 152RM of the folding device 138 to pivot and open.

S122

Subsequently, the robot controller 34 controls the robot arm 12 to move the control point from point P7 to point P0, which is the initial position.

This transfer operation is also performed for the set position in the second column adjacent in the set region R.

Consequently, as shown in part (b) in FIG. 52, the meat slice batch E1 is arranged in the second column overlapping the meat slice batch E1 in the first column and with their end portions folded downward. The arrangement of the meat slice batches E1 on the set region R is finished upon completion of the arrangement on the set positions in the second column, forming a batch of meat slice batches E1 (this batch formed by multiple meat slice batches E1 also corresponds to the food batch in the claims) on the set region R.

Total Weight Convergence

The convergence of the total weight of the meat slice batches E1 arranged in the set region R in the third embodiment is performed in the same manner as the convergence of the total weight of the meat slices E arranged in the set region R in the first embodiment. Its description is therefore omitted.

Fourth Embodiment

FIGS. 53 to 56 show a hand device 33 of a fourth embodiment.

The hand device 33 of the fourth embodiment differs from the hand device of the first embodiment shown in FIGS. 3 and 4 in that it includes a scooping portion 175, which moves into and out of the space between the left and right finger-shaped portions 55L and 55R.

This hand device 33 includes a frame 160 as a base.

To the upper portion of this frame 160, a mount plate 161, which is to be attached to the lower surface of the hand mount seat 30 through a detachment/attachment device 180 described below, is fixed.

Scooping Portion

Figure 53:
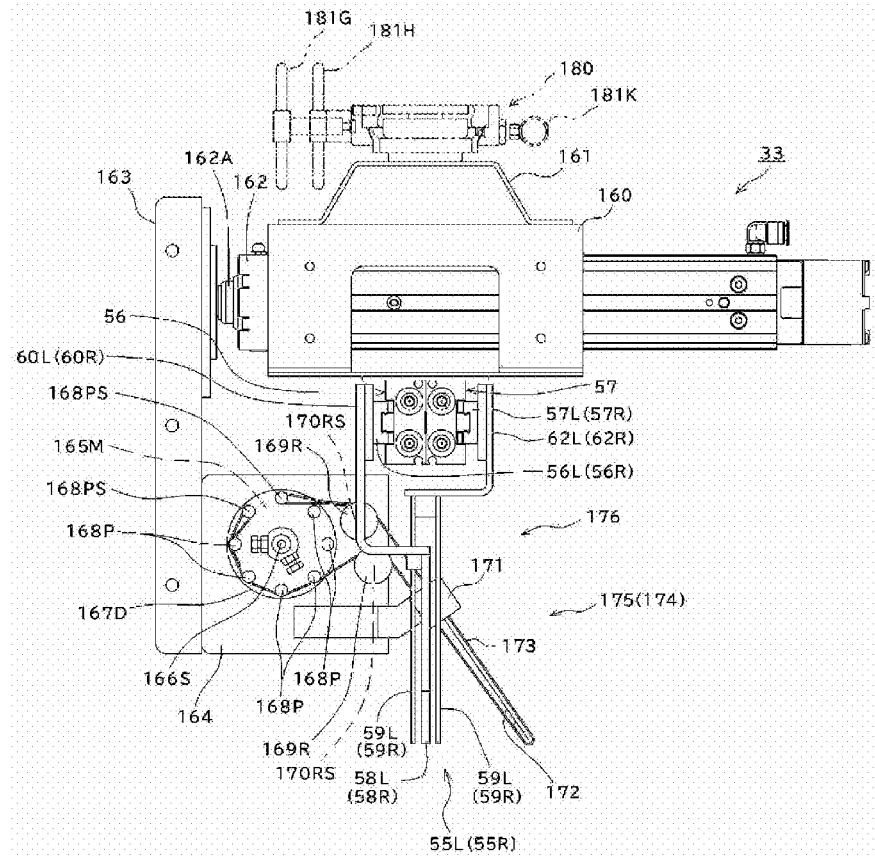
FIG. 53 is a left side view for illustrating a hand device including an article transfer device of a fourth embodiment.
Figure 54:
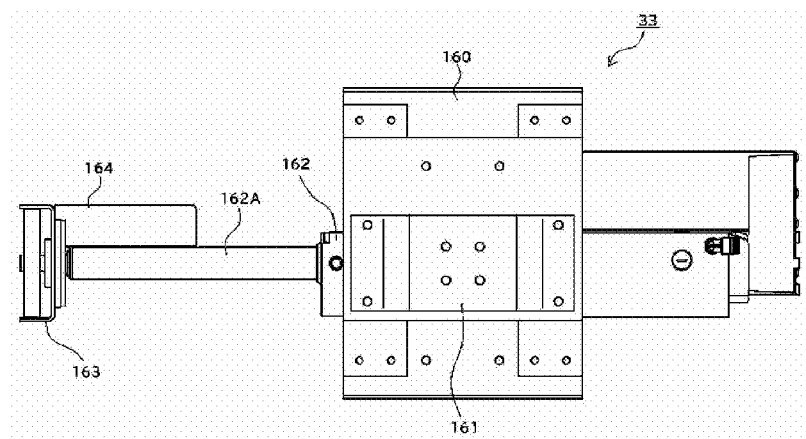
FIG. 54 is a plan view for illustrating the hand device including the article transfer device of the fourth embodiment.

As shown in FIGS. 53 and 54, a cylinder portion of an electric cylinder 162, which extends and contracts in the Y-axis directions, is fixed to the inner portion of the frame 160. A drive case 164 is attached to the distal end portion of an operation rod 162A of the electric cylinder 162 through a support member 163.

As such, the electric cylinder 162 is located in the upper portion of the hand device 33 and less likely to be affected by water (such as cleaning water used to clean the slicer 1) or meat scraps.

The drive case 164 projects forward from the front surface of the support member 163. A rotation disc 167D is placed on the left outer surface of the drive case 164. The rotation disc 167D is attached to an output shaft 166S, which is driven and rotated by a servomotor 165M in the drive case 164.

The bases of eight pins 168P are fixed in a cantilevered manner to the outer circumference portion of the rotation disc 167D along an arcuate locus having the output shaft 166S in the center. The distal end portions of these pins 168P extend to the left.

Of these pins 168P, two adjacent pins 168PS and 168PS are used as retention pins for retaining a belt.

A section of the left side surface of the drive case 164 that is located frontward of the rotation disc 167D rotationally supports upper and lower guide rollers 169R and 169R through rotation shafts 170RS and 170RS.

The base of a support stay 171 is fixed to a lower part of the left side surface of the drive case 164, and the distal end portion of the support stay 171 projects frontward.

The distal end part (front end portion) of the support stay 171 is bent obliquely upward, and this bent end portion has a surface inclined downward toward the front. The base of a support plate 172, which is narrow and rectangular, extends along and is fixed to this inclined surface.

Thus, the support plate 172 extends in an orientation tilted downward at a predetermined angle, and is supported on the drive case 164.

The distal end portion (extending end portion) of the support plate 172 is folded back toward the lower surface, forming a curved surface of this folded end portion (substantially the distal end of the support plate 172).

A plastic belt (conveyance member in the claims) 173 includes, at its opposite ends, loop-shaped retention portions having a width equivalent to the width in the right-left direction of the support plate 172. The retention portion at one end is retained by one of the retention pins 168PS.

The belt 173 is extended over the upper circumference surface of the upper guide roller 169R, supported on the upper surface of the support plate 172, and then folded back at the distal end of the support plate 172 to the lower surface.

The section at the other end of the folded belt 173 substantially extends on the lower surface of the support plate 172 and then extends on the upper circumference surface of the lower guide roller 169R and the outer circumference sides of multiple pins 168P. The retention portion at the other end is retained by the other retention pin 168PS.

The transfer device 174 is configured as described above, and when the electric cylinder 162 performs extension and contraction operations, the drive case 164 supported by the distal end portion of the operation rod 162A reciprocates in the Y-axis directions.

Also, when the servomotor 165M is driven, the belt 173 reciprocates in the forward and reverse directions.

That is, in FIG. 53, when the servomotor 165M is driven to rotate the rotation disc 167D counterclockwise, the retention portion at one end of the belt 173 retained by the front retention pin 168PS is pulled rearward, causing the section of the belt 173 at one end to be taken up.

As a result, the section of the belt 173 supported on the upper surface of the support plate 172 moves obliquely upward along the upper surface of the support plate 172.

At this time, the rear retention pin 168PS descends and causes the other end of the belt 173 to be unwound. As such, the winding length of the belt 173 remains substantially unchanged, and the tension is also maintained within a predetermined range.

In contrast, when the servomotor 165M is driven in the reverse direction to rotate the rotation disc 167D clockwise, the retention portion at one end of the belt 173 retained by the front retention pin 168PS is pressed forward, causing the section of the belt 173 at one end is unwound.

As a result, the section of the belt 173 supported on the upper surface of the support plate 172 moves obliquely downward along the upper surface of the support plate 172.

At this time, the rear retention pin 168PS ascends and causes the other end of the belt 173 to be wound. As such, the winding circumferential length of the belt 173 remains substantially unchanged, and the tension is also maintained within a predetermined range.

As described above, the scooping portion 175 is formed mainly by the section of the belt 173 supported on the upper surface of the support plate 172.

Finger-Shaped Portion

As shown in FIGS. 55 to 59, a first air cylinder 56 and a second air cylinder 57, which open and close the left and right finger-shaped portions 55L and 55R, are fixed to the lower surface of the frame 160 and spaced apart from each other in the Y-axis direction. As such, the first and second air cylinders 56 and 57 are located in the upper portion of the hand device 33 and less likely to be affected by water (such as cleaning water used to clean the slicer 1) or meat scraps.

Figure 55:
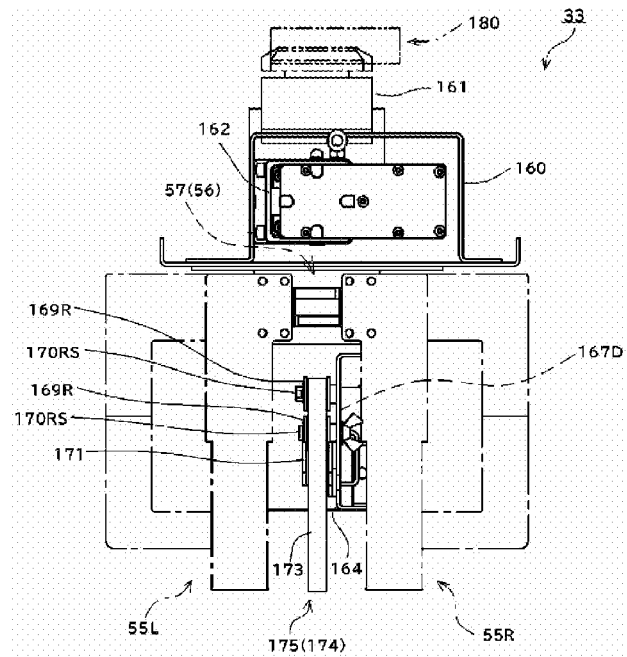
FIG. 55 is a schematic front view for illustrating the hand device including the article transfer device of the fourth embodiment.
Figure 56:
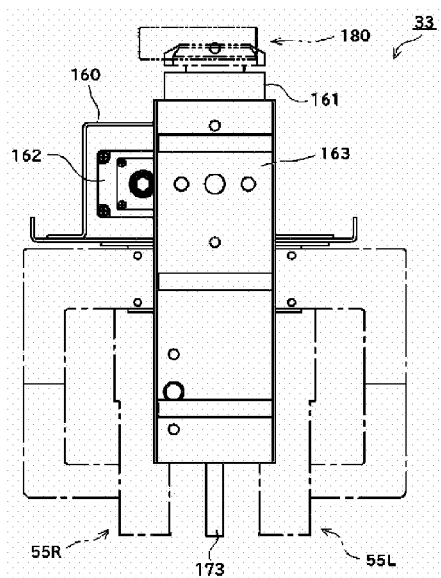
FIG. 56 is a schematic rear view for illustrating the hand device including the article transfer device of the fourth embodiment.

In FIGS. 55 and 56, the installation areas of the left and right finger-shaped portions 55L and 55R are schematically indicated by dashed dotted lines.

Figure 59:
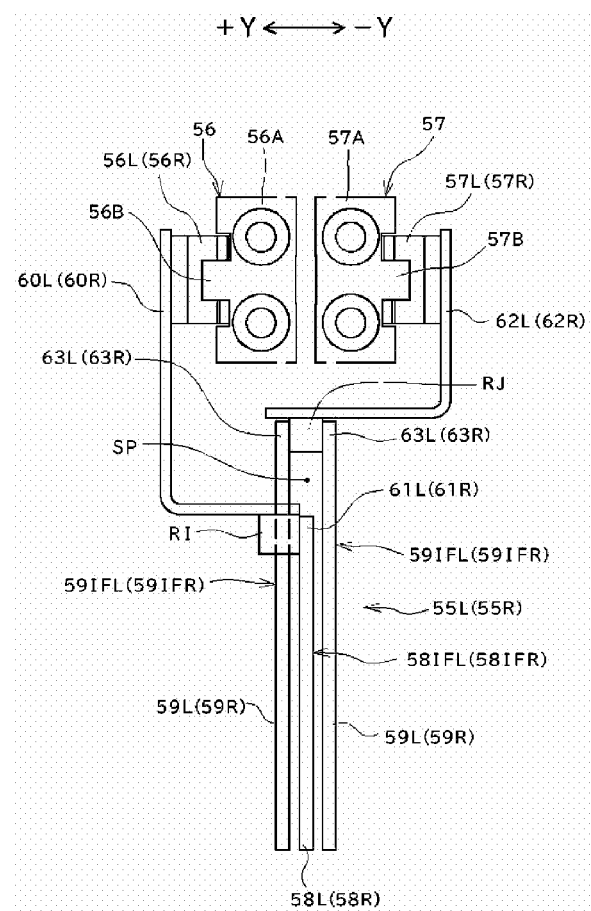
FIG. 59 is a side view for illustrating a part of the hand device including the article transfer device of the fourth embodiment.

As shown in FIG. 59, the first air cylinder 56 on the +Y side includes a cylinder block 56A having a side surface on the +Y side forming a guide rail 56B extending in the right-left direction (X-axis direction).

Two left and right sliders 56L and 56R are fitted to the guide rail 56B in a slidable manner.

Upper and lower cylinder holes are formed in the cylinder block 56A in parallel. Each cylinder hole accommodates a separate piston (not shown) in a reciprocally slidable manner. The pistons are coupled to the respective left and right sliders 56L and 56R.

The pistons are configured to slide in directions opposite to each other when air is supplied, so that the left and right sliders 56L and 56R coupled to the pistons slide in directions opposite to each other.

The second air cylinder 57 on the −Y side includes a cylinder block 57A having a side surface on the −Y side forming a guide rail 57B extending in the right-left direction (X-axis direction).

Two left and right sliders 57L and 57R are fitted to the guide rail 57B in a slidable manner.

Upper and lower cylinder holes are formed in the cylinder block 57A in parallel. Each cylinder hole accommodates a separate piston (not shown) in a reciprocally slidable manner. The pistons are coupled to the respective left and right sliders 57L and 57R.

The pistons are configured to slide in directions opposite to each other when air is supplied, so that the left and right sliders 57L and 57R coupled to the pistons slide in directions opposite to each other.

The left and right finger-shaped portions 55L and 55R include left and right first members 58L and 58R and left and right second members 59L and 59R.

First Member

Figure 57:
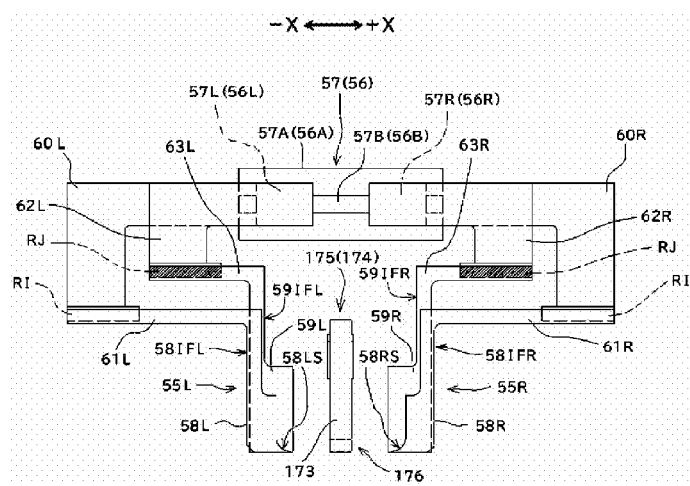
FIG. 57 is a front view for illustrating a part of the hand device including the article transfer device of the fourth embodiment.
Figure 58:
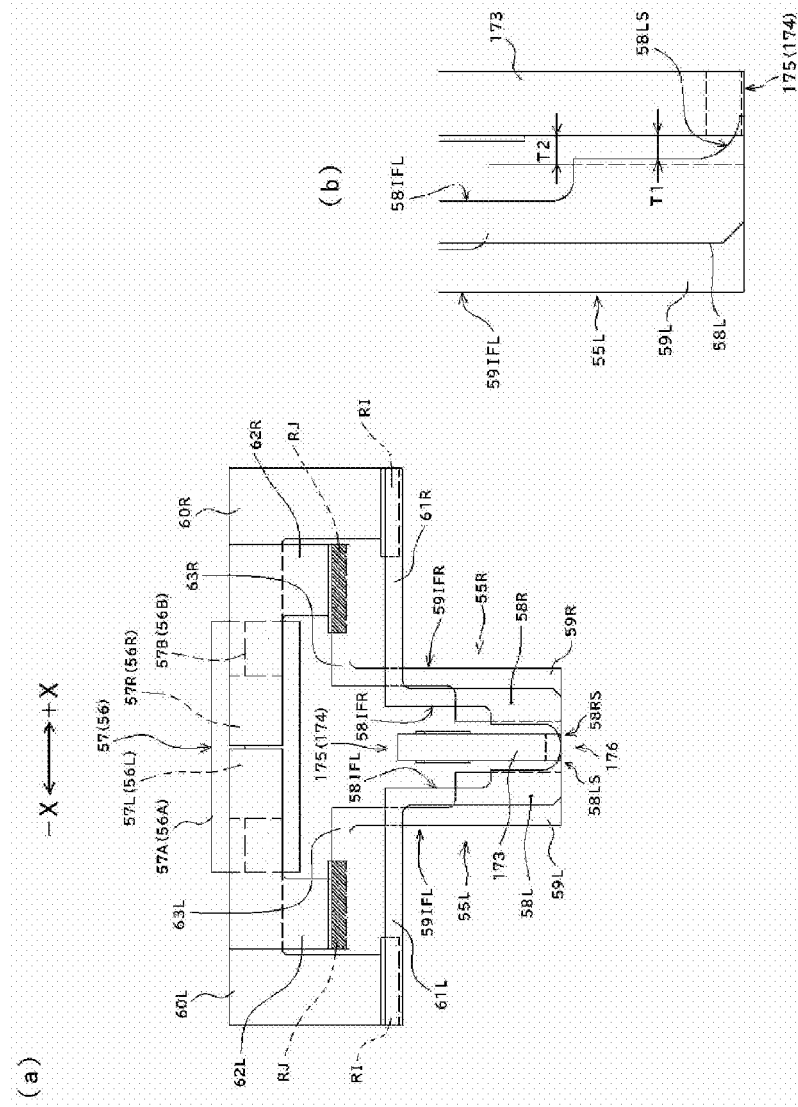
FIG. 58 is a diagram of the hand device including the article transfer device of the fourth embodiment in which part (a) is a front view for illustrating a part of the hand device, and part (b) is an enlarged view of a part of the hand device.

As shown in FIGS. 57 to 59, the left and right first members 58L and 58R are supported by left and right sliders 56L and 56R, respectively, of the first air cylinder 56.

That is, the inner end portions of left and right first support members 60L and 60R, which are plate-shaped and extend in the right-left direction, are fixed to the surfaces of the left and right sliders 56L and 56R on the +Y side.

The outer end portions of the left and right first support members 60L and 60R are bent and extended downward (−Z direction) and then bent and extended to −Y direction.

The left and right extending end portions thus formed have lower surfaces to which the outer end portions of first sub-support members 61L and 61R extending in the right-left direction are fixed through square bar-shaped first reinforcement members RI and RI, respectively.

These left and right first sub-support members 61R and 61L have inner end portions bent and extended downward (−Z direction) to form left and right inner fingers 58IFL and 58IFR.

Also, the inner fingers 58IFL and 58IFR each have a section at its lower end that is wider in the right-left direction. This section has a predetermined height from the lower end. These sections that are wider in the right-left direction are referred to as first members 58L and 58R.

The inner edge portions of these left and right first members 58L and 58R extend in a substantially vertical direction to the vicinity of their lower end portions.

Then, at the lower end portions, the inner edges of the left and right first members 58L and 58R extend inward (toward each other) in arc shapes to form left and right engagement portions 58LS and 58RS.

Second Member

As shown in FIGS. 24 to 26, the left and right second members 59L and 59R are supported by left and right sliders 57L and 57R, respectively, of the second air cylinder 57.

That is, the inner end portions of left and right second support members 62L and 62R, which are plate-shaped and extend in the right-left direction, are fixed to the surfaces of the left and right sliders 57L and 57R on the −Y side.

The outer end portions of the left and right second support members 62L and 62R are bent and extended downward (−Z direction), and then bent and extended in the +Y direction.

The left and right extending end portions thus formed have lower surfaces to which the outer end portions of second sub-support members 63L and 63R extending in the right-left direction are fixed through second reinforcement members RJ and RJ, respectively.

These left and right second sub-support members 63R and 63L have inner end portions that are bent downward and extended downward (−Z direction) to form left and right outer fingers 59IFL and 59IFR.

Also, the outer fingers 59IFL and 59IFR each have a section at its lower end that is wider in the right-left direction. This section has a predetermined height from the lower end. These sections that are wider in the right-left direction are referred to as second members 59L and 59R.

The inner edge portions of these second members 59L and 59R are formed to extend in a substantially vertical direction to their lower end portions.

As shown in FIGS. 57 to 59, two sets of a left second sub-support member 63L and a left outer finger 59IFL, which are formed integrally. One of the sets is fixed to the front surface (surface on the −Y side) of the left second reinforcement member RJ, and the other set is fixed to the rear surface (surface on the +Y side).

A gap SP in the Y-axis direction is thus formed between the front and rear second members 59L and 59L on the left side.

Also, two sets of a right second sub-support member 63R and a right outer finger 59IFR, which are formed integrally, are provided. One of the sets is fixed to the front surface (surface on the −Y side) of the right second reinforcement member RJ, and the other set is fixed to the rear surface (surface on the +Y side).

Thus, a gap SP in the Y-axis direction is also formed between the front and rear second members 59R and 59R on the right side.

The left and right first members 58L and 58R are arranged to selectively project and retract relative to the left and right gaps SP and SP, respectively.

Collection Portion

As shown in FIG. 53, the scooping portion 175 and the left and right finger-shaped portions 55L and 55R form the collection portion 176.

In the initial state, the drive case 164 is separated in the +Y direction, and the distal end portion of the belt 173 supported on the upper surface of the support plate 172 of the scooping portion 175 is retracted in the +Y direction from between the left and right finger-shaped portions 55L and 55R.

As shown in FIG. 53, when the electric cylinder 162 performs contraction operation and the drive case 164 moves in the −Y direction by a set distance, the scooping portion 175 enters between the left and right fingers 55L and 55R.

In this state, the distal end portion of the scooping portion 175 (the −Y side end portion of the section of the belt 173 supported on the upper surface of the support plate 172) projects beyond the left and right finger-shaped portions 55L and 55R to the −Y side.

FIG. 57 shows a state in which the scooping portion 175 has entered between the left and right first members 58L and 58R and the left and right second members 59L and 59R in the open state.

Part (a) in FIG. 58 shows a state in which the left and right second members 59L and 59R and the left and right first members 58L and 58R have moved to their stroke ends in the closing directions with the scooping portion 175 located between the left and right second members 59L and 59R and the left and right first members 58L and 58R.

In this state, as shown partly enlarged in part (b) of FIG. 58, the positional relationship of the stroke ends is set such that a first gap T1 formed between the left side edge of the scooping portion 175 (side edge of the belt 173) and the inner edge portion of the left first member 58L is smaller than a second gap T2 formed between the side edge of the scooping portion 175 and the inner edge portion of the second member 59L.

Although not shown, the positional relationships between the right side edge of the scooping portion 175, the right first member 58R, and the right second member 59R are similarly set.

The setting of the first gap T1 and the second gap T2 is determined by the length of extension in the right-left direction of the members forming the left and right finger-shaped portions 55L and 55R, the position settings of the slide stroke ends of the first and second air cylinders 56 and 57, and the like.

The cylinder block 56A of the first air cylinder 56 and the cylinder block 57A of the second air cylinder 57 may be configured to be elastically supported so as to be movable in the up-down direction relative to the frame 36.

Furthermore, the sections of the outer end portions of the left and right first support members 60L and 60R that are bent downward, the sections of the outer end portions of the left and right second support members 62L and 62R that are bent downward, the sections of the inner end portions of the left and right first sub-support members 61L and 61R that are bent downward, and the sections of the inner end portions of the left and right second sub-support members 63L and 63R that are bent downward may each include a joint portion (up-down pivot portion). This joint portion may include a return spring that urges the joint point to the initial orientation (vertical orientation).

Consequently, even when the lower end portions of the left and right finger-shaped portions 55L and 55R interfere with the conveyance surface 3a of the belt 3 of the slicer 1, the left and right finger-shaped portions 55L and 55R retract upward, preventing damage and deformation of belt 3 and the finger-shaped portions 55L and 55R.

Block Circuit of Arrangement System

Figure 60:
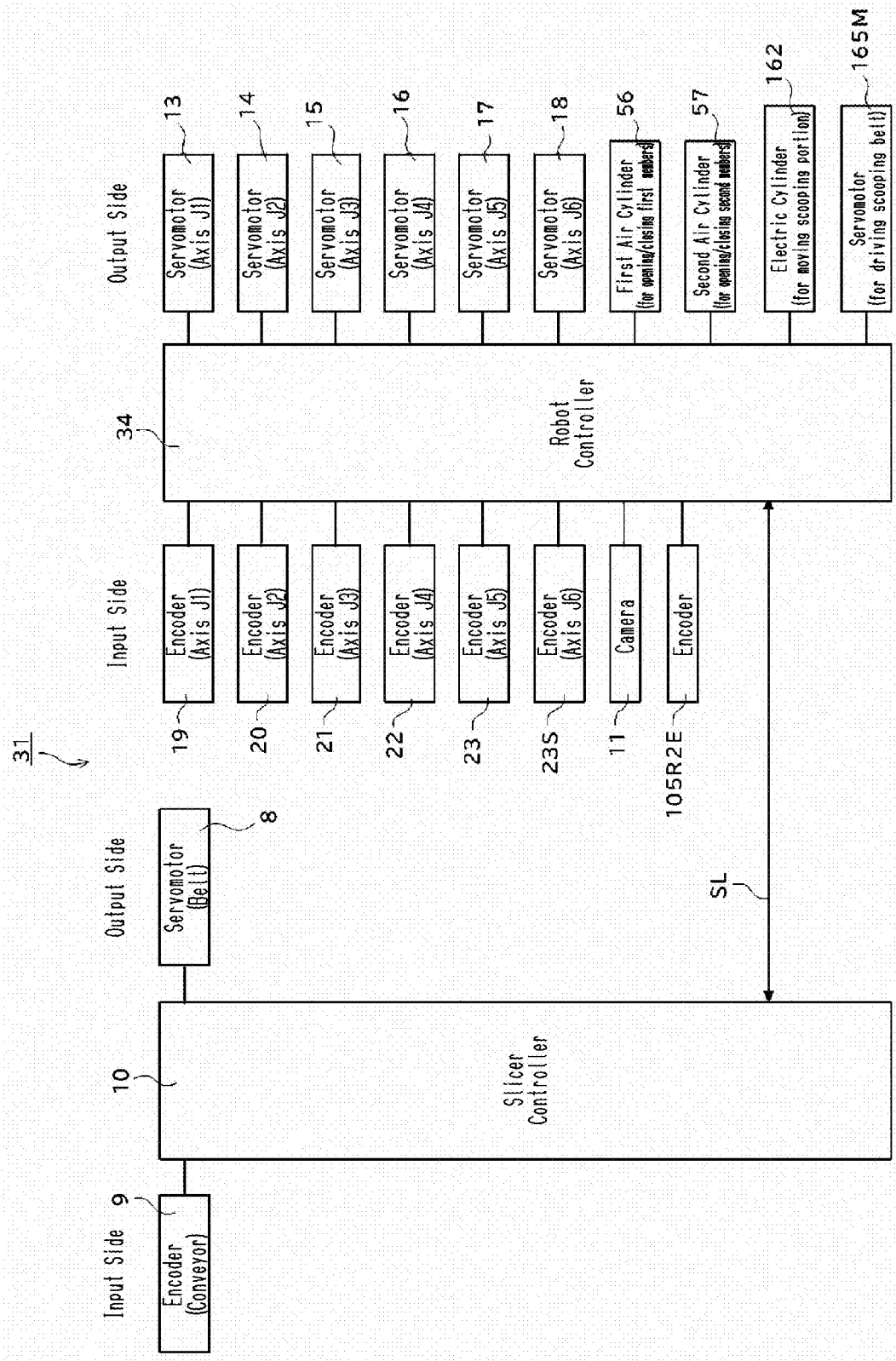
FIG. 60 is a block diagram of an arrangement system using the hand device including the article transfer device of the fourth embodiment.

As shown in FIG. 60, in place of the servomotor 94R2 coupled to the output side of the robot controller 34 in the block diagram of FIG. 41, a first air cylinder 56, a second air cylinder 57, an electric cylinder 162, and a servomotor 165M are coupled.

Arrangement Control

The control point described below is the center position of the space between the distal end (inner end) of the engagement portion 58LS of the left first member 58L and the distal end (inner end) of the engagement portion 58RS of the right first member 58R.

FIGS. 65 to 68 show the process from collecting a meat slice E with the hand device 33 to placing the meat slice E that is deformed substantially into the shape of letter U.

When arrangement control starts, an output from the robot controller 34 drives and controls the robot arm 12, and the left and right finger-shaped portions 55L and 55R and the scooping portion 175 are positioned at their respective initial positions.

Figure 65:
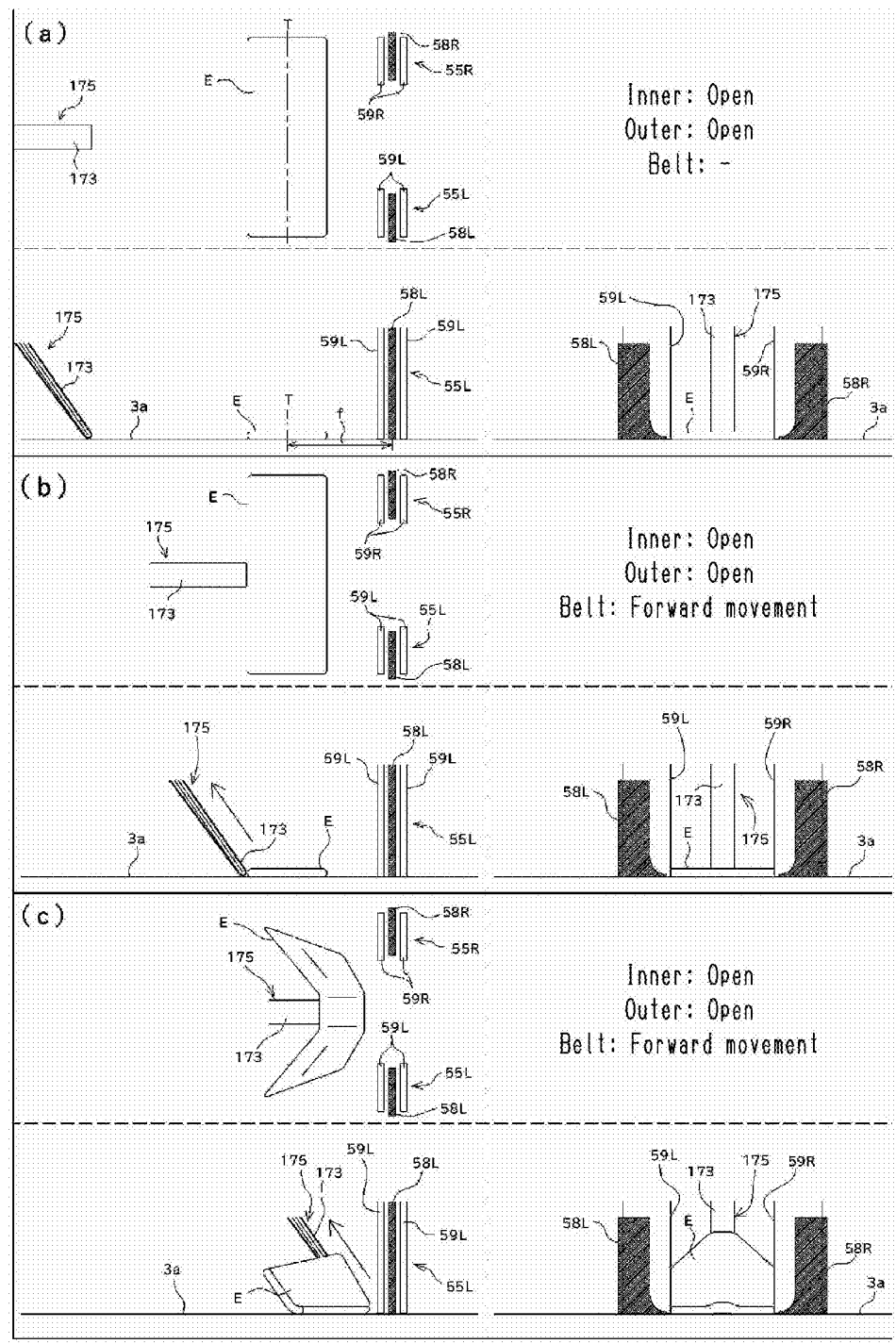
FIG. 65 includes plan views, side views, and front views schematically showing an initial state of the start of collecting an article (meat slice), part (a) being an explanatory diagram of a standby state, part (b) being an explanatory diagram of a collection start state, and part (c) being an explanatory diagram of a state during scooping.

The initial points of the left and right finger-shaped portions 55L and 55R are at positions directly above positions that are offset to the −Y side from the collection position T of the meat slice E by an offset amount f (see part (a) in FIG. 65). The initial points are separated from the conveyance surface 3a by a predetermined distance.

At this time, the scooping portion 175 is arranged at a position offset from the initial point in the +Y direction by a predetermined distance.

The offset amount f is set to an amount that allows the belt 173, which moves obliquely upward, of the scooping portion 175 to scoop up the meat slice E located at the collection position T while the distal end of scooping portion 175 moves from the collection position T to the position directly under the initial point.

Also, at the initial point, the left and right finger-shaped portions 55L and 55R of the hand device 33 are in an open state and separated from each other.

That is, the left and right inner fingers 58IFL and 58IFR and the left and right outer fingers 59IFL and 59IFR are in the open state and separated from each other by the maximum distances.

In this state, the first members 58L and 58R of the left and right inner fingers 58IFL and 58IFR are retracted in the gaps SP and SP between the second members 59L and 59R of the left and right outer fingers 59IFL and 59IFR.

Also, the inner edge portions of the left and right first members 58L and 58R are retracted outward of the inner edge portions of the left and right second members 59L and 59R (into the gaps SP).

Then, the slicer controller 10 obtains the attributes of the meat slice E that is being conveyed to the collection position T.

That is, the slicer controller 10 receives a detection result from a thickness (height) sensor (not shown), which is provided in the slicer 1 to detect the thickness (height) of the leading end of the block of meat before slicing.

The slicer 1 cuts the block of meat, which is supplied in a lateral orientation, in the up-down direction from its leading end. As such, the thickness (height) of the leading end of the block of meat is a dimension that approximates the length in the Y-axis direction of the meat slice E placed on the conveyance surface 3a.

When the meat slice E is folded at its central portion in the Y-axis direction, the length of the meat slice E in the Y-axis direction is about ½ the thickness (height).

The slicer controller 10 sends the thickness (height) of the leading end of the block of meat before slicing to the robot controller 34.

Also, the robot controller 34 processes an image of the meat slice E captured by the camera 11 and obtains the size of the meat slice E (the length (width) in the X-axis direction and the area of the meat slice E) based on the result.

According to the obtained size of the meat slice E, the meat slice E is classified into one of four classes of large, medium (standard), small, and unsuitable for collection.

Collection and Arrangement of Meat Slice E Suitable for Collection

First, the robot controller 34 selects, from multiple predetermined numbers of rows M stored as fixed values, a predetermined number of rows M corresponding to the size of the tray 6 to be used.

Also, the predetermined number of columns N is automatically calculated from the thickness (height) of the leading end of the block of meat and the size of the meat slice E based on the image processing.

Figure 70:
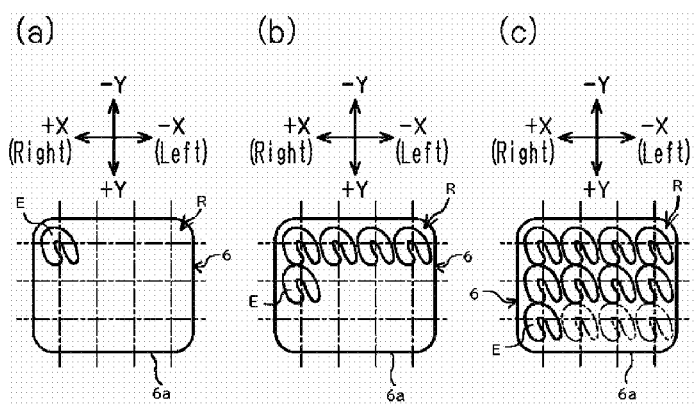
FIG. 70 is an explanatory diagram in which parts (a) to (c) show states in which articles (meat slices) are arranged in a matrix in the set region.
Figure 71:
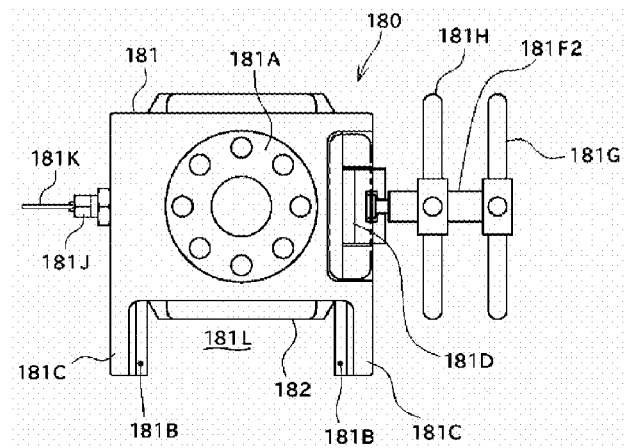
FIG. 71 is a plan view of an attachment/detachment device.
Figure 72:
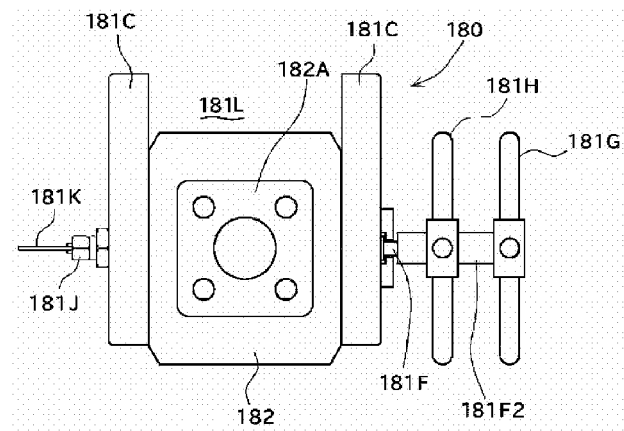
FIG. 72 is a bottom view of the attachment/detachment device.
Figure 73:
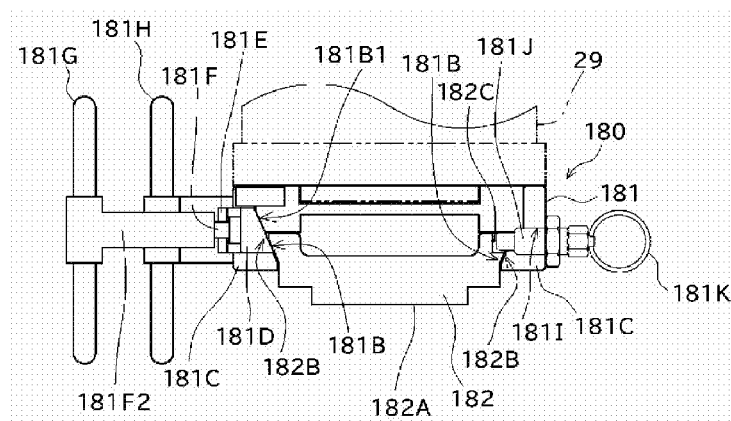
FIG. 73 is a rear view showing a part of the attachment/detachment device in section.
Figure 74:
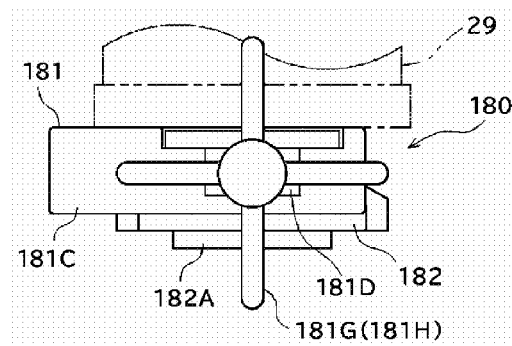
FIG. 74 is a right side view of the attachment/detachment device.
Figure 75:
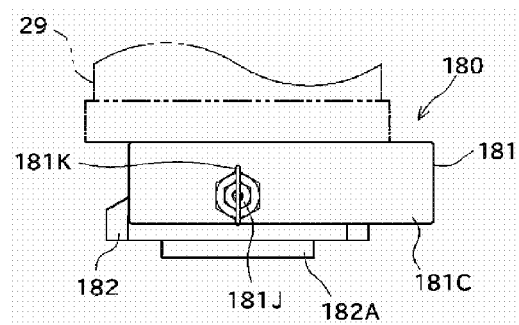
FIG. 75 is a left side view of the attachment/detachment device.

As a result, as shown in part (a) in FIG. 70, rows of a predetermined number of rows M and columns of a predetermined number of columns N are set in the set region R on the inner base surface of the tray 6.

The rows and the columns are set at regular intervals.

The processing is now described in which the initially calculated predetermined number of columns N is applied to all rows (a situation where N columns (N slices) of meat slices E are placed in each row).

The process of calculating the predetermined number of columns N for each row will be described below.

First, the robot controller 34 sets the count value m of the row counter and the count value n of the column counter to 1, and then the process proceeds to the meat slice arrangement process.

Meat Slice Arrangement Process

As shown in part (a) in FIG. 70, the inner base surface of the tray 6 is divided into multiple meat slice placement segments arranged in a matrix. In this embodiment, a meat slice arrangement process is performed for the first row in the order of columns. After completing one row, a similar arrangement process is performed for the next adjacent row, so that (m, n)=(1, 1), (1, 2), (1, 3), (1, 4), (2, 1), (2, 2), . . . , (M, N).

The first row is represented by m=1 and the farthest to the −Y side on the inner base surface of the tray 6.

The first column is represented by n=1 and the farthest to the +X side on the inner base surface of the tray 6.

First, the robot controller 34 performs collection target position setting processing and path generation processing.

Collection Target Position Setting Processing

On the basis of the size of the meat slice E obtained from the image-capturing result of the camera 11, the central section or a position adjacent to the central section in the X-axis direction of the meat slice E is set as a holding target portion B (see FIG. 2), and the collection target position of this holding target portion B is calculated.

Path Generation Processing

Path generation processing generates a path from collection to arrangement completion and a path for returning to the initial point. The robot controller 34 controls the position and orientation of the hand device 33 at each time.

Meat Slice Arrangement Control

As shown in the upper left plan view of part (a) in FIG. 65, when the hand device 33 is in the initial state, the left and right finger-shaped portions 55L and 55R are opened to the positions forming the maximum distance in the X-axis direction.

That is, the left and right first members 58L and 58R and the left and right second members 59L and 59R are opened to their maximum positions, and the inner edge portions of the first members 58L and 58R are retracted to positions offset outward from the inner edge portions of the second members 59L and 59R.

In this state, when a meat slice E conveyed by the first conveyance apparatus 2 reaches the collection position T, the robot controller 34 receives (obtains) a collection start signal from the slicer controller 10.

Then, an output from the robot controller 34 controls the robot arm 12 to slowly lower the control point.

As a result, as shown in the lower left side view of part (a) in FIG. 65, the lower ends of the finger-shaped portions 55L and 55R (the lower ends of the first members 58L and 58R and the lower ends of the second members 59L and 59R) and the lower end (distal end) of the belt 173 of the scooping portion 175 are positioned in the closest proximity to the conveyance surface 3a while maintaining a slight gap separating the lower ends from the conveyance surface 3a.

The lower end of the belt 173 may be brought into light contact with the conveyance surface 3a.

Then, an output from the robot controller 34 causes the electric cylinder 162 to perform contraction operation, and the scooping portion 175 is moved from the initial position to the scooping position (in the −Y direction).

That is, the scooping portion 175 is moved from the downstream side (+Y side) of the first conveyance apparatus 2 to the upstream side (−Y side) toward the vicinity of the middle portion in the X-axis direction (target point BP) of the meat slice E.

Then, after a set time has elapsed from the start of the movement of the scooping portion 175, an output from the robot controller 34 rotates the servomotor 165M to move the belt 173 on the support plate 172 in an upward oblique direction (forward movement).

The above set time is set to a time that is equal to or slightly shorter than the time required for the scooping portion 175 to reach the meat slice E located at the collection position T from the initial position.

Accordingly, as shown in parts (b) and (c) in FIG. 65, the central portion in the width direction (X-axis direction) of the meat slice E at the collection position T is scooped obliquely upward by the belt 173 moving in the upward oblique direction.

At this time, opposite end portions of the meat slice E that are not supported on the belt 173 begin to be deformed to hang down by their weight.

The speed at which the belt 173 of the scooping portion 175 moves obliquely upward is preferably set equal to or slightly higher than the moving speed of the scooping portion 175 in the −Y direction.

This setting allows the meat slice E to be transferred from the conveyance surface 3a to the belt 173 in a satisfactory manner, limiting the formation of creases in the meat slice E.

Figure 66:
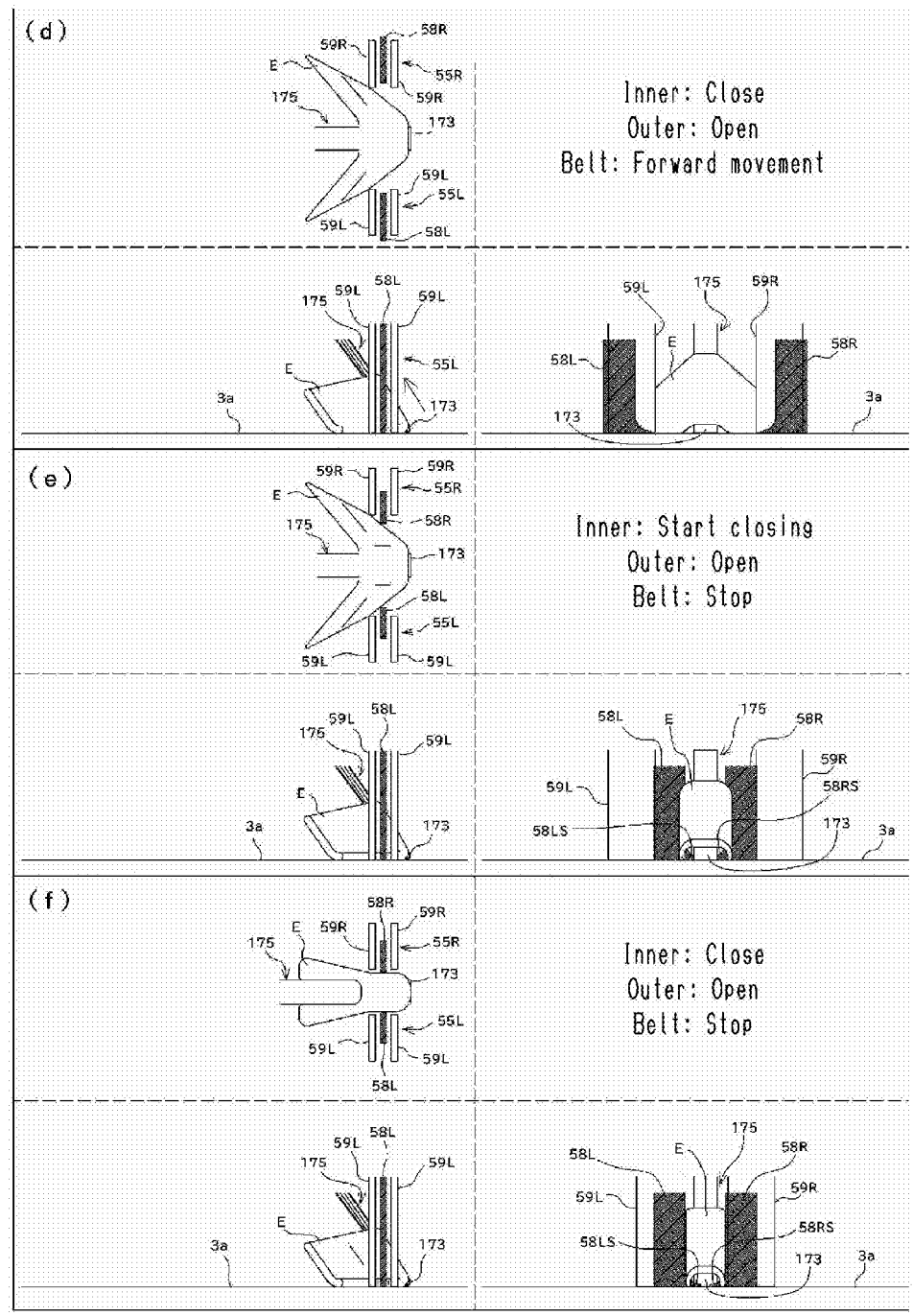
FIG. 66 includes plan views, side views, and front views showing states before the collection of the article (meat slice) is completed following part (c) in FIG. 65, part (d) being an explanatory diagram of a state in which scooping is completed, part (e) being an explanatory diagram showing a state in which the article is enfolded, and part (f) being an explanatory diagram of a state in which the article is collected and starts to be moved.

As shown in part (d) in FIG. 66, when the scooping portion 175 moves further to the −Y side, opposite end portions of the meat slice E whose central portion is scooped by the belt 173 come into contact with the inner edge portions of the second members 59L and 59R, which are located on the left and right sides of the meat slice E on the +Y side. The contact resistance corrects the orientation of the meat slice E so as to extend along the upper surface of the belt 173. The left and right second members 59L and 59R and the left and right first members 58L and 58R are both kept open.

In this state, the scooping portion 175 enters between the left and right finger-shaped portions 55L and 55R with the scooped meat slice E held by the scooping portion 175.

Thus, the distal end portion of the scooping portion 175 (the distal end portion of the belt 173) projects from the space between the left and right finger-shaped portions 55L and 55R to the −Y side.

Then, after stopping the movement of the belt 173 of the scooping portion 175, an output from the robot controller 34 starts the operation of the first air cylinder 56, and the left and right inner fingers 58IFL and 58IFR of the left and right finger-shaped portions 55L and 55R start to move inward (in directions toward each other).

As shown in part (e) in FIG. 66, when the left and right inner fingers 58IFL and 58IFR start to move inward, the inner edge portions of the left and right first members 58L and 58R come into contact with the end portions of the meat slice E and start to press these contact portions inward.

At this time, the left and right engagement portions 58LS and 58RS enter under the meat slice E and start to enfold the meat slice E.

Then, after a set time has elapsed since the left and right inner fingers 58IFL and 58IFR started moving inward, the left and right outer fingers 59IFL and 59IFR are moved inward (in directions toward each other).

As shown in part (f) in FIG. 66, the end portions of the meat slice E are pressed by the inner edge portions of the left and right first members 58L and 58R toward the opposite side edges of the belt 173 and are deformed substantially into the shape of letter U (similar to a horseshoe shape) in plan view.

In this state, the meat slice E is supported and enfolded toward the lower side of the scooping portion 175 (lower side of the belt 173) by the left and right engagement portions 58LS and 58RS that are close to each other.

At this time, the first gaps T1 and T1 remain between the inner edge portions of the left and right first members 58L and 58R and the left and right side edges of the scooping portion 175 (belt 173). As such, the meat slice E is not gripped too tightly, preventing any damage.

Although the inner edge portions of the left and right second members 59L and 59R also approach the left and right side edges of the scooping portion 175, the second gaps T2 and T2, which are larger than the first gaps T1 and T1, remain between the inner edge portions of the left and right second members 59L and 59R and the left and right side edges of the scooping portion 175.

The presence of the second gaps T2 and T2 prevents the inner edge portions of the left and right second members 59L and 59R from actively coming into contact with the meat slice E.

After supporting the meat slice E in this manner, the process proceeds to the next step.

That is, an output from the robot controller 34 controls the robot arm 12 to lift the control point.

When the control point is lifted, both ends of the meat slice E become suspended above the conveyance surface 3*a* and kept at positions higher than the peripheral wall 6*a* of the tray 6.

This prevents interference between the meat slice E and the peripheral wall 6*a* when the control point moves to the set region R.

Then, an output from the robot controller 34 controls the robot arm 12 to move the control point to pass above the peripheral wall 6*a* of the tray 6 and reach a point above the set region R.

As a result, the lower ends of the left and right finger-shaped portions 55L and 55R and the lower end (distal end) of the belt 173 of the scooping portion 175 approach the inner base surface of the tray 6 on which the set region R is set.

This point is set on the downstream side (+Y side) of the m-th row including the meat drop point Rmn to which the meat slice E is to be lowered.

During movement to this point, the robot controller 34 controls the robot arm 12 so that the hand device 33 assumes an orientation having a twist angle θ with respect to the Y-axis direction.

Then, an output from the robot controller 34 controls the robot arm 12 to move the control point to the next point.

During movement to this point, the end portions of meat slice E are dragged on the inner base surface of the tray 6.

Then, after a preset time has elapsed since the control point started to move to this point, an output from the robot controller 34 causes the first air cylinder 56 to operate in the reverse direction.

Figure 67:
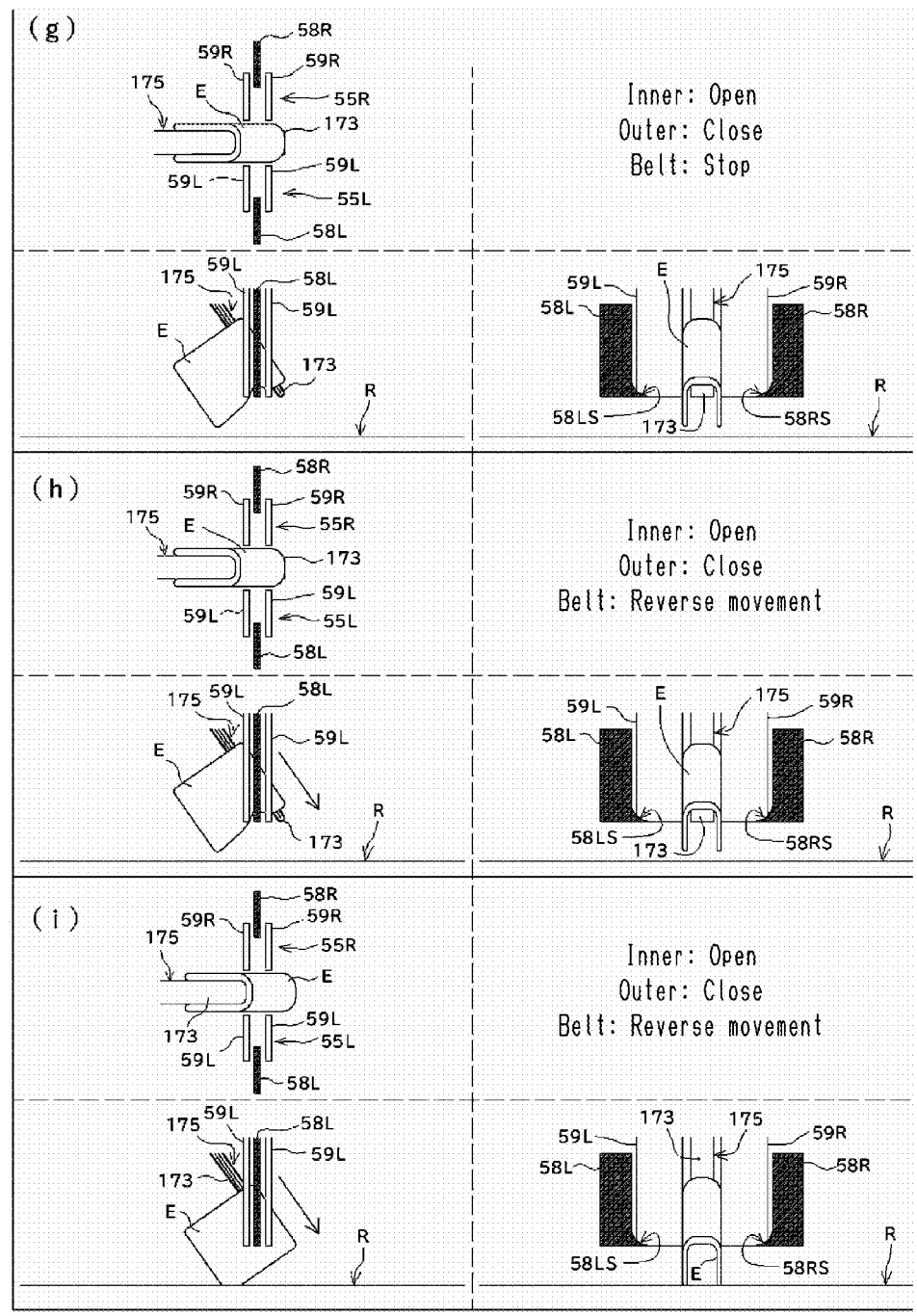
FIG. 67 includes plan views, side views, and front views showing states in which, following part (f) in FIG. 66, the collected article (meat slice) is moved and then placed at a predetermined position, part (g) being an explanatory diagram of a state in which the enfolding of the article is discontinued, part (h) being an explanatory diagram of a state in which the placement of the article at the predetermined position is started, and part (i) being an explanatory diagram of a state in which the article is placed at the predetermined position.

As a result, as shown in part (g) in FIG. 67, the left and right inner fingers 58IFL and 58IFR of the left and right finger-shaped portions 55L and 55R move outward (in directions away from each other).

Also, the pressing on the meat slice E toward the opposite side edges of the belt 173 by the inner edge portions of the left and right first members 58L and 58R, and the enfolding by the left and right engagement portions 58LS and 58RS are discontinued.

However, at this time point, the robot controller 34 does not send an output to the second air cylinder 57, so that the left and right outer fingers 59IFL and 59IFR remain at the positions close to each other.

Thus, the members that are in contact with the meat slice E are switched from the inner edge portions of the left and right first members 58L and 58R to the inner edge portions of the left and right second members 59L and 59R.

That is, the meat slice E that is sticking to (by being pressed by) the inner edge portions of the first members 58L and 58R is transferred to the inner edge portions of the second members 59L and 59R and thus removed from the first members 58L and 58R and the second members 59L and 59R.

Subsequently, an output from the robot controller 34 controls the robot arm 12 to move the control point to the next point.

During this movement, an output from the robot controller 34 rotates the servomotor 165M in the reverse direction.

As a result, the belt 173 of the scooping portion 175 moves obliquely downward (reverse direction) so that the meat slice E starts to be obliquely lowered toward the inner base surface of the tray 6 as shown in part (h) in FIG. 67.

At this time, the left and right outer fingers 59IFL and 59IFR are maintained at positions in the vicinity of each other, and the second gaps T2 and T2 are formed between the side edges of the scooping portion 175 and the inner edge portions of the left and right second members 59L and 59R.

Also, unlike the first members 58L and 58R, the lower end portions of the second members 59L and 59R do not have engagement portions.

Figure 68:
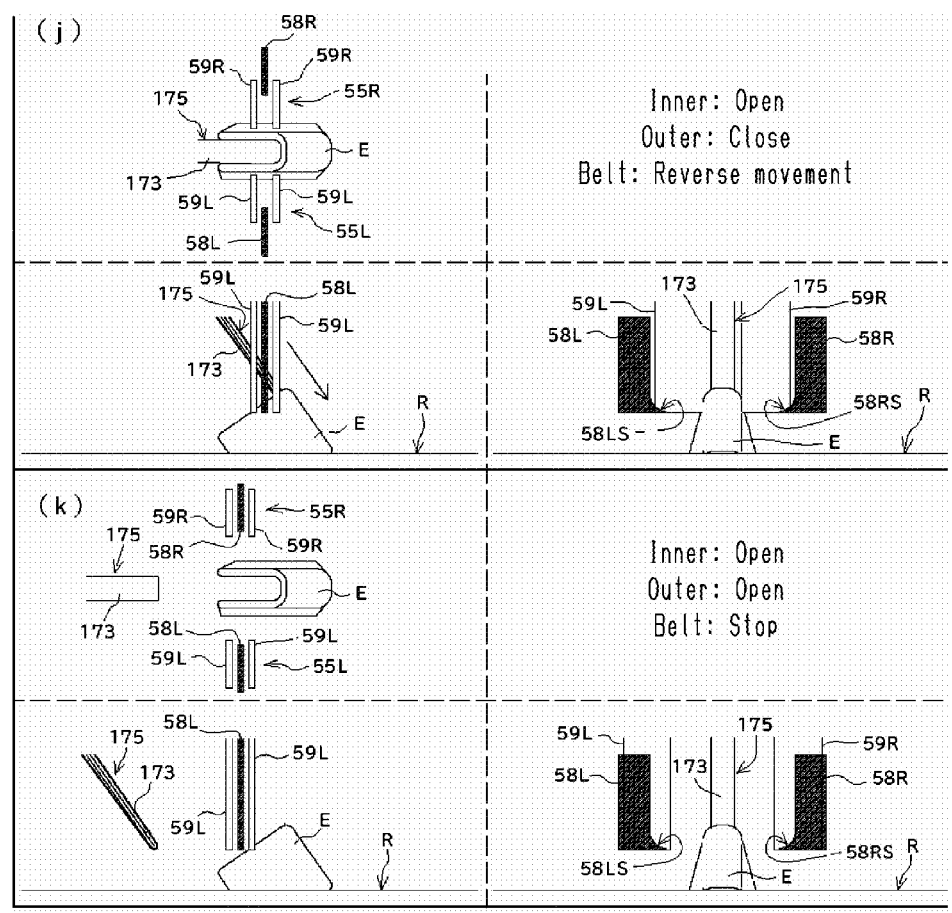
FIG. 68 includes plan views, side views, and front views showing states in which, following part (i) in FIG. 67, the article (meat slice) is placed at the predetermined position and then the scooping portion is retracted from this article, part (j) being an explanatory diagram of a state in which the article has been placed, and part (k) being an explanatory diagram of a state in which the scooping portion has been retracted from the article.

Thus, as shown in the state change from part (i) in FIG. 67 to part (j) in FIG. 68, the left and right side portions of the meat slice E that is obliquely lowered pass through the second gaps T2 and T2 and are smoothly lowered while being kept from returning to the original shape from the substantially U-shaped state by the inner edge portions of the left and right second members 59L and 59R.

The lowered meat slice E is placed on the inner base surface of the tray 6 while substantially maintaining the shape of letter U.

Also, an output from the robot controller 34 controls the robot arm 12 to cause the twist angle θ of the hand device 33 to be 0 and return the direction in which the left and right finger-shaped portions 55L and 55R are aligned to the X-axis direction.

Subsequently, an output from the robot controller 34 stops the movement of the belt 173 and then controls the robot arm 12 to move the control point to the next point.

The hand device 33 thus moves upward and in the +Y direction (downstream side) and moves away from the lowered meat slice E.

Then, as shown in part (k) in FIG. 68, when the control point starts to move, an output from the robot controller 34 causes the electric cylinder 162 to perform extension operation to move the scooping portion 175 to the initial position.

At the same time, an output from the robot controller 34 causes the second air cylinder 57 to operate in the reverse direction, so that the left and right outer fingers 59IFL and 59IFR move outward (in directions away from each other) increasing the distance between the inner edge portions of the left and right second members 59L and 59R.

Alternatively, the left and right outer fingers 59IFL and 59IFR may move outward (in directions away from each other) to increase the distance between the inner edge portions of the left and right second members 59L and 59R when the scooping portion 175 is retracted from between the left and right finger-shaped portions 55L and 55R (after retraction).

Subsequently, an output from the robot controller 34 controls the robot arm 12 to move the control point to a position that is higher and farther to the downstream side (+Y side).

Then, the control point is moved to the initial point.

An arrangement process of one meat slice E onto the meat drop point Rmn thus completes.

Then, the robot controller 34 determines whether the count value n of the column counter exceeds the predetermined number of columns N.

When the count value n does not exceed the predetermined number of columns N, the process returns, and a process of arranging a meat slice E onto the meat drop point Rmn in the next column in the current row m is performed.

As such, this process of arranging a meat slice E is performed N times per row.

When the count value n exceeds the predetermined number of columns N, a process of arranging a meat slice E onto the meat drop point Rmn in the first column of the next row starts.

The above process is repeated to complete the arrangement of the meat slices E onto all meat drop points Rmn in the predetermined number of rows M and the predetermined number of columns N.

Example of Arrangement for 3 Rows and 4 Columns

Figure 69:
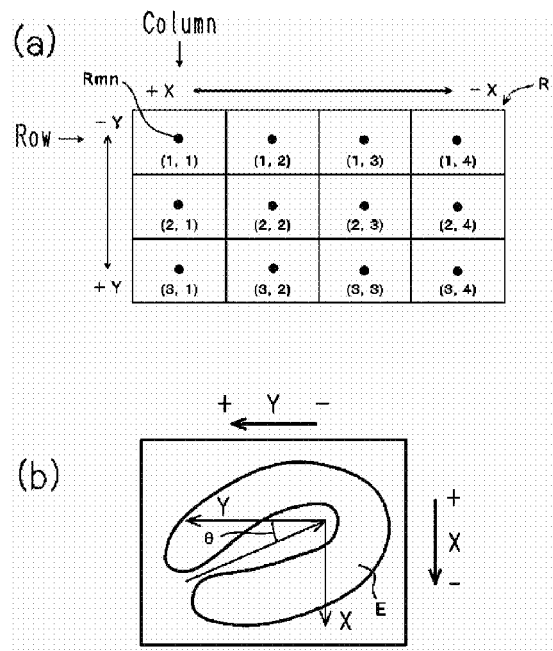
FIG. 69 is an explanatory diagram in which part (a) is an explanatory diagram of a set region of an embodiment, and part (b) is a plan view for illustrating a state in which an article (meat slice) is twisted and placed.

Part (a) in FIG. 69 and parts (a) to (c) in FIG. 70 show an example in which the predetermined number of rows M is 3 and the predetermined number of columns N is 4.

Part (a) in FIG. 70 is a plan view illustrating the state of the tray 6 after the arrangement of a meat slice E is finished for the meat drop point Rmn (=R11) in the first column in the first row.

Part (b) in FIG. 70 is a plan view for illustrating the trays 6 in a state in which the arrangement of a meat slice E is finished for all meat drop points Rmn in the first row and the meat drop point Rmn (=R21) in the first column in the second row.

Part (c) in FIG. 70 is a plan view for illustrating the tray 6 in a state in which the arrangement of a meat slice E is completed for all meat drop points Rmn in the first and second rows and the meat drop point Rmn (=R31) in the first column of the third row.

Process of Calculating Predetermined Number of Columns N for Each Row

The above description is directed to the process in which the initially calculated predetermined number of columns N is applied to all rows (a situation where N columns (N slices) of meat slices E are placed in each row).

However, a process may also be performed in which the predetermined number of columns N described above may be calculated for each row according to the size of the food to be placed at the beginning of each row.

When Medium (Standard) Class Meat Slices E are Available

An arrangement process is performed in the same manner as in FIG. 29.

That is, when the first meat slice E to be placed at the beginning (the farthest position to the +X side) of the first row, which is the farthest to the −Y side in the set region R, is classified into the middle (standard) class, it is determined that four columns (four slices) of meat slices E are placed in the first row.

Accordingly, in the first row, four columns (four slices) of meat slice E are placed at regular intervals in sequence from the first meat slice E to the fourth meat slice E (from the +X side to the −X side).

Subsequently, an arrangement process for the second row adjacent to and the +Y side of the first row is started.

Then, when the fifth meat slice E to be placed at the beginning of the second row is also classified into the medium class, it is determined that four columns (four slices) of meat slice E are also placed in the second row, and four columns (four slices) of meat slices E are placed at regular intervals successively from the fifth meat slice E to the eighth meat slice E.

Subsequently, an arrangement process for the third row adjacent to and on the +Y side of the second row is started.

Then, when the ninth meat slice E to be placed at the beginning of the third row is also classified into the medium class, it is determined that four columns (four slices) of meat slice E are also placed in the third row, and four columns (four slices) of meat slices E are placed at regular intervals in sequence from the 9th meat slice E to the 12th meat slice E.

In this manner, a total of 12 meat slice plates E are placed in the set region R, and an arrangement process for one tray 6 is finished.

Because of the position of the meat slice E cut and discharged from the slicer 1 onto the conveyance surface 3a, the target point BP of a meat slice E classified into the middle (standard) class substantially agrees in the X-axis direction with the center position of the width in the X-axis direction of the conveyance surface 3a (position of the center line t of the belt 3).

As such, it is not necessary to correct the reference position of the control point at the collection position T in the X-axis direction.

When Meat Slices E of Medium and Small Classes are Mixed

An arrangement process is performed in the same manner as in FIG. 30.

That is, for the above-described first row, when the first meat slice E to be placed at the beginning of this first row is classified into the medium class, four columns (four slices) of meat slices E are placed successively from the first meat slice E to the fourth meat slices E in the same manner as described above.

Then, an arrangement process for the second row is started, and when the fifth meat slice E to be placed at the beginning of the second row is classified into the small class, it is determined that five columns (five slices) of meat slices E are placed in this second row.

Accordingly, in the second row, five columns (five slices) of meat slice E are placed at regular intervals in sequence from the fifth meat slice E to the ninth meat slice E.

Then, an arrangement process for the third row is started, and when the tenth meat slice E to be placed at the beginning of the third row is also classified into the small class, it is determined that five columns (five slices) of meat slice E are also placed in the third row, and five columns (five slices) of meat slices E are placed at regular intervals in sequence from the 10th meat slice E to the 14th meat slice E.

In this manner, a total of 14 meat slice plates E are placed in the set region R, and an arrangement process for one tray 6 is finished.

The target portion BP of a meat slice E that is classified into the small class is offset in the X-axis direction from the center position of the conveyance surface 3a (position on the center line t of the belt 3) to the −X side by distance Xa. Accordingly, the reference position of the control point at the collection position T is corrected to the −X side by the distance Xa.

When Meat Slices E of Medium and Large Classes are Mixed

An arrangement process is performed in the same manner as in FIG. 31.

That is, for the above-described first row, when the first meat slice E to be placed at the beginning of the first row is classified into the medium class, four columns (four slices) of meat slices E are placed in sequence from the first meat slice E to the fourth meat slices E in the same manner as described above.

Then, an arrangement process for the second row is started, and when the fifth meat slice E to be placed at the beginning of the second row is classified into the large class, it is determined that three columns (three slices) of meat slices E are placed in this second row.

Accordingly, in the second row, three columns (three slices) of meat slice E are placed at regular intervals in sequence from the fifth meat slice E to the seventh meat slice E.

Then, an arrangement process for the third row is started, and when the eighth meat slice E to be placed at the beginning of the third row is also classified into the large class, it is determined that three columns (three slices) of meat slice E are also placed in the third row, and three columns (three slices) of meat slices E are placed at regular intervals in sequence from the eighth meat slice E to the tenth meat slice E.

In this manner, a total of ten meat slice plates E are placed in the set region R, and an arrangement process for one tray 6 is finished.

When the number of columns in each row is automatically changed, the intervals between the columns are also automatically changed.

However, a configuration is also possible in which the number of columns in each row is automatically changed, but the intervals between the columns are not automatically changed.

The target point BP of a meat slice E that is classified into the large class is offset in the X-axis direction from the center position of the conveyance surface 3a (position on the center line t of the belt 3) to the +X side by distance Xb. Accordingly, the reference position of the control point at the collection position T is corrected to the +X side by the distance Xb.

Total Weight Convergence

As shown in FIG. 32, the automatic adjustment of the quantity of arranged slices in the above arrangement process allows the total weight of the meat slices E arranged in the set region R of each tray 6 to be within a set range a.

A vertical drop part (step part) in the total weight line indicating a situation where the quantity control is performed appears when the number of meat slices E arranged on the tray 6 decreases.

That is, the total weight of the arranged meat slices E gradually increases as the size of each meat slice E increases with the number of slices remaining unchanged, but a reduction in the quantity by one lowers the total weight for a time.

When the quantity of arranged meat slices E is different such as 12 slices, 14 slices, and 10 slices, increasing or reducing the quantity of meat slices E to be arranged according to the size of the meat slice E in this manner allows the total weight to be within the set range.

Moreover, the quantity control of meat slices E also automatically adjusts the intervals between adjacent meat slices E, allowing the meat slices E to be neatly arranged in the set region R.

Additional Description on Control Details

Additional descriptions on the above control are given below.

Figure 61:
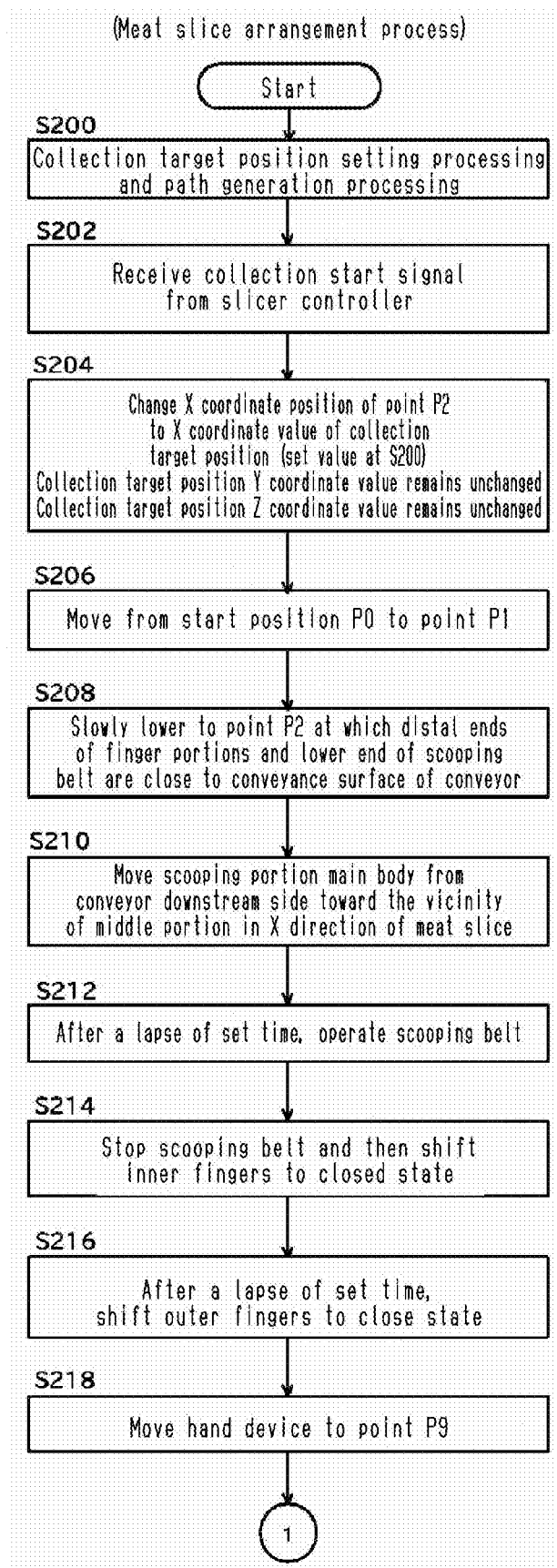
FIG. 61 is a flowchart of food arrangement control.
Figure 62:
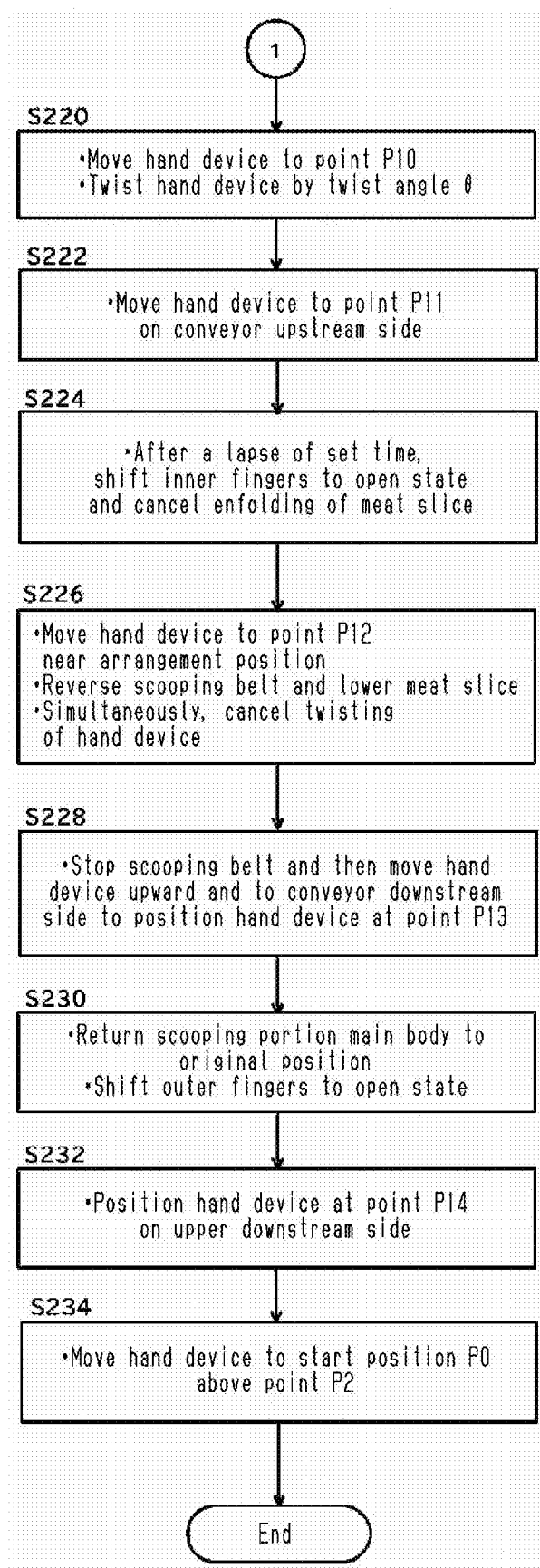
FIG. 62 is a flowchart of food arrangement control following FIG. 61.

The flowcharts shown in FIGS. 61 and 62 show another example of the process at S18A in the flowchart shown in FIG. 19.

S200

At S200, the robot controller 34 first performs collection target position setting processing and path generation processing.

Collection Target Position Setting Processing

On the basis of the size of the meat slice E obtained from the image-capturing result of the camera 11, the central section or a position near the central section in the X-axis direction of the meat slice E is set as a holding target portion B (see FIG. 2), and the collection target position of this holding target portion B is calculated.

Path Generation Processing

Figure 63:
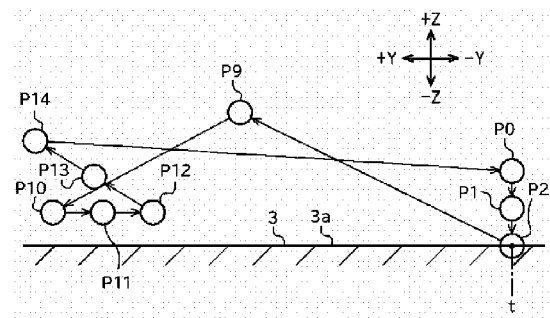
FIG. 63 is a side view for illustrating a path of a control point of an embodiment.
Figure 64:
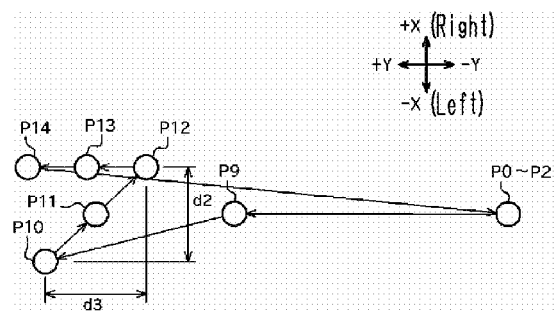
FIG. 64 is a plan view for illustrating the path of the control point of the embodiment.

Path generation processing generates a path from collection to arrangement completion of points P0 to P2 to P9 to P14 and a path for returning from point P14 to point P0 shown in FIGS. 63 and 64. The robot controller 34 controls the position and orientation of the hand device 33 at each time.

Movement of Control Point

Referring to FIGS. 63 and 64, the movement of the control point between different points is now described.

Point P0 is the initial position of the control point and is fixed at a location directly above the center line t of the belt 3 of the first conveyance apparatus 2.

Point P1 is a middle point on the path between points P0 and P2.

Point P2 is set to a height that creates a slight gap separating the lower ends of the left and right finger-shaped portions 55L and 55R and the lower end (distal end) of the belt 173 of the scooping portion 175 from the conveyance surface 3a.

The Y-axis coordinate value of point P9 is set to a value of a location before the hand device 33 moving from point P2 reaches the set region R, and the X-axis coordinate value of point P9 is set to the same value as the X-axis coordinate value of point P2.

In this embodiment, the Z-axis coordinate value of point P9 is set to a value greater than the Z-axis coordinate value of point P0, so that opposite ends (hanging ends) of the meat slice E held by the hand device 33 do not interfere with the peripheral wall 6a of the tray 6 when the meat slice E passes over the peripheral wall 6a.

For the sake of convenience in explanation, point P12 is first described in the description of points P10 to P14.

Point P12 is set for each meat slice placement segment (m, n) described above at a position directly above the meat drop point Rmn set on the inner base surface of the tray 6, which is the set region R.

That is, the X-axis coordinate value and Y-axis coordinate value of point P12 match the X-axis coordinate value and Y-axis coordinate value of the meat drop point Rmn.

The meat drop point Rmn is the center point of the meat slice placement segment (m, n).

Each time the column n and/or the row m is updated at S20A, S24A, and S28A, which will be described below, the X-axis and Y-axis coordinate values of point P12 are changed to the X-axis coordinate value and Y-axis coordinate value of the updated meat drop point Rmn.

The Z-axis coordinate value of point P12 is set smaller than the Z-axis coordinate value of point P9 and set to a height that the lower end of the belt 173 of the scooping portion 175 and the lower ends of the left and right finger-shaped portions 55L and 55R are located above and separated from the inner base surface of the tray 6 in the set region R.

This height is set such that the meat slice E supported by the collection portion 176 does not come into contact with the inner base surface of the tray 6.

When the control point reaches point P12, the meat slice E stops being supported and is lowered onto the inner base surface of the tray 6.

As shown in FIG. 64, the X-axis coordinate value of point P10 is set to a value separated by a predetermined distance d2 from the X-axis coordinate value of point P12 so as to be offset to the −X side.

The Y-axis coordinate value of point P10 is set to a value that is offset by a predetermined distance d3 from the Y-axis coordinate value of point P12 so as to be offset to the +Y side.

The Z-axis coordinate value of point P10 is set to the same value as point P12.

Point P11 is a middle point on a straight path connecting points P10 and P12.

The three-dimensional coordinate values of this point P11 are coordinate values on a linear path connecting points P10 and P12.

The orientation of the robot arm 12 is controlled when the control point moves from point P9 to point P10. At point P10, the hand device 33 assumes an orientation having a twist angle θ with respect to the Y-axis direction as shown in part (b) in FIG. 69.

As a result, the direction in which the left and right finger-shaped portions 55L and 55R are aligned is changed from a direction along the X-axis to a direction perpendicular to an intersecting line that intersects the Y-axis direction at the twist angle θ.

Due to this twisting, when the electric cylinder 162 performs contraction operation, the scooping portion 175 moves to the −Y side while being inclined at the twisting angle θ with respect to the Y-axis direction.

Orientation of Hand Device

Orientation control with the twist angle θ is performed while the control point moves from points P9 to P10, and orientation control for canceling the twist angle θ is performed when the control point moves to point P12.

In the path between the remaining points excluding points P9 to P10, orientation control is performed to align the left and right fingers 55L and 55R in the X-axis direction.

The description is given returning to FIG. 61.

S202 to S206

An output from the robot controller 34 controls the robot arm 12 to move the control point from point P0 to point P1.

S202

When the hand device 33 is in the initial state, the left and right finger-shaped portions 55L and 55R are opened to the positions forming the maximum distance in the X-axis direction.

That is, the left and right first members 58L and 58R and the left and right second members 59L and 59R are opened to their maximum positions, and the inner edge portions of the first members 58L and 58R are retracted to positions offset outward from the inner edge portions of the second members 59L and 59R.

At S202, when a meat slice E conveyed by the first conveyance apparatus 2 reaches the collection position T, the robot controller 34 receives (obtains) a collection start signal from the slicer controller 10.

Thus, the process proceeds to S204.

S204

At S204, the robot controller 34 changes the X-axis coordinate value of the three-dimensional coordinates of point P2 to the X-axis coordinate value at the collection target position obtained at S200.

The Y-axis coordinate value and Z-axis coordinate value of the collection target position are not changed.

The process then proceeds to S206.

S206

At S206, an output from the robot controller 34 controls the robot arm 12 to move the control point from the start position (point P0) to point P1, and the process proceeds to S208.

S208

At S208, an output from the robot controller 34 controls the robot arm 12 to slowly lower the control point from point P1 to point P2.

As a result, as shown in part (a) in FIG. 65, the lower ends of the finger-shaped portions 55L and 55R (the lower ends of the first members 58L and 58R and the lower ends of the second members 59L and 59R) and the lower end (distal end) of the belt 173 of the scooping portion 175 are positioned in the closest proximity to the conveyance surface 3a while maintaining a slight gap separating the lower ends from the conveyance surface 3a.

The lower end portion of the belt 173 may be brought into light contact with the conveyance surface 3a.

The process then proceeds to S210.

S210

At S210, after the control point reaches point P2 as described above, an output from the robot controller 34 causes the electric cylinder 162 to perform contraction operation, and the scooping portion 175 is moved from the initial position to the scooping position (in the −Y direction).

That is, the scooping portion 175 is moved from the downstream side (+Y side) of the first conveyance apparatus 2 to the upstream side (−Y side) toward the vicinity of the middle portion in the X-axis direction (held portion B) of the meat slice E, and the process proceeds to S212.

S212

At S212, after a set time has elapsed from the start of the movement of the scooping portion 175, an output from the robot controller 34 moves the belt 173 in an upward oblique direction (forward movement).

The above set time is set to a time that is equal to or slightly shorter than the time required for the scooping portion 175 to reach the meat slice E located at the collection position T from the initial position.

Accordingly, as shown in parts (b) and (c) in FIG. 65, the central portion in the width direction (X-axis direction) of the meat slice E at the collection position T is scooped obliquely upward by the belt 173 moving in the upward oblique direction.

At this time, opposite end portions of the meat slice E that are not supported on the belt 173 begin to be deformed to hang down by their weight.

The speed at which the belt 173 of the scooping portion 175 moves obliquely upward is preferably set equal to or slightly higher than the moving speed of the scooping portion 175 in the −Y direction.

This setting allows the meat slice E to be transferred from the conveyance surface 3*a* to the belt 173 in a satisfactory manner, limiting the formation of creases in the meat slice E.

As shown in part (d) in FIG. 66, when the scooping portion 175 moves further to the −Y side, opposite end portions of the meat slice E whose central portion is scooped up by the belt 173 come into contact with the inner edge portions of the second members 59L and 59R, which are located on the left and right sides of the meat slice E on the +Y side. The contact resistance corrects the orientation of the meat slice E so as to extend along the upper surface of the belt 173. Also, the left and right second members 59L and 59R and the left and right first members 58L and 58R are both kept open.

In this state, the scooping portion 175 enters between the left and right finger-shaped portions 55L and 55R with the scooped meat slice E held by the scooping portion 175.

Thus, the distal end portion of the scooping portion 175 (the distal end portion of the belt 173) projects from the space between the left and right finger-shaped portions 55L and 55R to the −Y side.

The process then proceeds to S214.

S214

At S214, after stopping the movement of the belt 173 of the scooping portion 175, an output from the robot controller 34 starts the operation of the first air cylinder 56, and the left and right inner fingers 58IFL and 58IFR of the left and right finger-shaped portions 55L and 55R start to move inward (in directions toward each other).

As shown in part (e) in FIG. 66, when the left and right inner fingers 58IFL and 58IFR start to move inward, the inner edge portions of the left and right first members 58L and 58R come into contact with the end portions of the meat slice E and start to press these contact portions inward.

At this time, the left and right engagement portions 58LS and 58RS enter under the meat slice E and start to enfold the meat slice E.

The process then proceeds to S216.

S216

At S216, after a set time has elapsed since the left and right inner fingers 58IFL and 58IFR started moving inward, the left and right outer fingers 59IFL and 59IFR are moved inward (in directions toward each other).

As shown in part (f) FIG. 66, the end portions of the meat slice E are pressed by the inner edge portions of the left and right first members 58L and 58R toward the opposite side edges of the belt 173 and are deformed substantially into the shape of letter U (similar to a horseshoe shape) in plan view.

In this state, the meat slice E is supported and enfolded toward the lower side of the scooping portion 175 (lower side of the belt 173) by the left and right engagement portions 58LS and 58RS that are close to each other.

The food arrangement method performed by the food arrangement controller 31 includes a step of supporting and collecting a meat slice E by the hand device 33 at point P2 described above.

At this time, as shown in part (b) in FIG. 58, the first gaps T1 and T1 remain between the inner edge portions of the left and right first members 58L and 58R and the left and right side edges of the scooping portion 175 (belt 173). As such, the meat slice E is not gripped too tightly, preventing any damage.

Although the inner edge portions of the left and right second members 59L and 59R also approach the left and right side end portions of the scooping portion 175, the second gaps T2 and T2, which are larger than the first gaps T1 and T1, remain between the inner edge portions of the left and right second members 59L and 59R and the left and right side edges of the scooping portion 175.

The presence of the second gaps T2 and T2 prevents the inner edge portions of the left and right second members 59L and 59R from actively coming into contact with the meat slice E.

After supporting the meat slice E in this manner, the process proceeds to S218.

S218

An output from the robot controller 34 controls the robot arm 12 to move the control point from point P2 to point P9.

When the control point is moved to point P9, both ends of the meat slice E become suspended above the conveyance surface 3*a* and kept at positions higher than the peripheral wall 6*a* of the tray 6.

This prevents interference between the meat slice E and the peripheral wall 6*a* when the control point moves to the set region R.

Subsequently, the process proceeds to S220 shown in FIG. 62.

S220

At S220, an output from the robot controller 34 controls the robot arm 12 so that the control point moves from point P9, passes above the peripheral wall 6*a* of the tray 6, and reaches point P10 above the set region R.

As a result, the lower ends of the left and right finger-shaped portions 55L and 55R and the lower end (distal end) of the belt 173 of the scooping portion 175 approach the inner base surface of the tray 6 on which the set region R is set.

This point P10 is set on the downstream side (+Y side) of the m-th row including the meat drop point Rmn to which the meat slice E is to be lowered.

During movement from point P9 to point P10, the robot controller 34 controls the robot arm 12 so that the hand device 33 assumes an orientation having a twist angle θ3 with respect to the Y-axis direction at point P10.

Thus, the food arrangement method performed by the food arrangement controller 31 includes a step of moving the hand device 33 from point P2 to point P10.

The process then proceeds to S222.

S222

At S222, an output from the robot controller 34 controls the robot arm 12 to move the control point from point P10 to point P11.

During movement from point P10 to point P11, the end portions of meat slice E are dragged on the inner base surface of the tray 6.

The process then proceeds to S224.

S224

At S224, after a preset time has elapsed since the control point started to move to point P11, an output from the robot controller 34 causes the first air cylinder 56 to operate in the reverse direction.

As a result, as shown in part (g) in FIG. 67, the left and right inner fingers 58IFL and 58IFR of the left and right finger-shaped portions 55L and 55R move outward (in directions away from each other).

Also, the pressing on the meat slice E toward the opposite side edges of the belt 173 by the inner edge portions of the left and right first members 58L and 58R, and the enfolding by the left and right engagement portions 58LS and 58RS are discontinued.

However, at this time point, the robot controller 34 does not send an output to the second air cylinder 57, so that the left and right outer fingers 59IFL and 59IFR remain at the positions in the vicinity of each other.

Thus, the members that are in contact with the meat slice E are switched from the inner edge portions of the left and right first members 58L and 58R to the inner edge portions of the left and right second members 59L and 59R.

That is, the meat slice E that is sticking to (by being pressed onto) the inner edge of the first members 58L and 58R is transferred to the inner edge portions of the second members 59L and 59R and thus removed from the first members 58L and 58R and the second members 59L and 59R.

The process then proceeds to S226.

S226

At S226, an output from the robot controller 34 controls the robot arm 12 to move the control point from point P11 to point P12.

During this movement, an output from the robot controller 34 causes the belt 173 of the scooping portion 175 to move obliquely downward (reverse direction) so that the meat slice E starts to be obliquely lowered toward the inner base surface of the tray 6 as shown in part (h) in FIG. 67.

At this time, the left and right outer fingers 59IFL and 59IFR are maintained at positions in the vicinity of each other, and second gaps T2 and T2 are formed between the side edges of the scooping portion 175 and the inner edge portions of the left and right second members 59L and 59R.

Also, unlike the first members 58L and 58R, the lower end portions of the second members 59L and 59R do not have engagement portions.

Thus, as shown in the state change from part (i) in FIG. 67 to part (j) in FIG. 68, the left and right side portions of the meat slice E that is obliquely lowered pass through the second gaps T2 and T2 and are smoothly lowered while being kept from returning to the original shape from the substantially U-shaped state (while limiting opening of an end portion of the food article in the claims) by the inner edge portions of the left and right second members 59L and 59R.

The lowered meat slice E is placed on the inner base surface of the tray 6 while substantially maintaining the shape of letter U.

Also, an output from the robot controller 34 controls the robot arm 12 to cause the twist angle θ3 of the hand device 33 to be 0 and return the direction in which the left and right finger-shaped portions 55L and 55R are aligned to the X-axis direction.

As described above, the food arrangement method performed by the food arrangement controller 31 includes a step of moving the control point from point P10 to point P12.

The process then proceeds to S228.

S228

At S228, an output from the robot controller 34 stops the movement of the belt 173 and then controls the robot arm 12 to move the control point from point P12 to point P13.

The hand device 33 thus moves upward and in the +Y direction (downstream side) from point P12 and moves away from the lowered meat slice E.

The process then proceeds to S230.

S230

At S230, as shown in part (k) in FIG. 68, when the control point starts to move from point P12, an output from the robot controller 34 causes the electric cylinder 162 to perform extension operation to move the scooping portion 175 to the initial position.

At the same time, an output from the robot controller 34 causes the second air cylinder 57 to operate in the reverse direction, so that the left and right outer fingers 59IFL and 59IFR move outward (in directions away from each other) increasing the distance between the inner edge portions of the left and right second members 59L and 59R.

Alternatively, the portions may be controlled such that left and right outer fingers 59IFL and 59IFR move outward (in directions away from each other) to increase the distance between the inner edge portions of the second members 59L and 59R when the scooping portion 175 is retracted from between the left and right finger-shaped portions 55L and 55R (after retraction).

The process then proceeds to S232.

S232

At S232, an output from the robot controller 34 controls the robot arm 12 to move the control point from point P13 to point P14, which is farther to the downstream side (+Y side) and higher than point P13.

After that, the process proceeds to S234.

S234

At S234, an output from the robot controller 34 controls the robot arm 12 to move the control point from point P14 to point P0 of the initial position.

An arrangement process of one meat slice E onto the meat drop point Rmn is completed in this manner, and the process proceeds to S20A in the flow shown in FIG. 19.

The process after S20A is the same as the process described above.

The above process is repeated to complete the arrangement of the meat slices E onto all meat drop points Rmn in the predetermined number of rows M and the predetermined number of columns N.

Example of Arrangement for 3 Rows and 4 Columns

Parts (a) to (c) in FIG. 70 show an example in which the above arrangement control is performed with the predetermined number of rows M set to 3 and the predetermined number of columns N set to 4.

Part (a) in FIG. 70 is a plan view illustrating the state of the tray 6 after the arrangement of a meat slice E is finished for the meat drop point Rmn (=R11) in the first column in the first row.

Part (b) in FIG. 70 is a plan view for illustrating the trays 6 in a state in which the arrangement of a meat slice E is finished for all meat drop points Rmn in the first row and the meat drop point Rmn (=R21) in the first column in the second row.

Part (c) in FIG. 70 is a plan view for illustrating the tray 6 in a state in which the arrangement of a meat slice E is completed for all meat drop points Rmn in the first and second rows and the meat drop point Rmn (=R31) in the first column of the third row.

In the present embodiment, a process may also be performed in which the predetermined number of columns N at S14 described above is calculated for each row according to the size of the food to be placed at the beginning of each row.

In any of a case in which medium (standard) class meat slices E are available, a case in which medium/small class meat slices E are mixed, and a case in which medium/large class meat slices E are mixed, the number of meat slices E to be placed in the set region R is controlled in the same manner as the first embodiment, so that the total weight of the meat slice batch is within the set range.

Attachment/Detachment Device

FIGS. 71 to 75 show an embodiment of an attachment/detachment device 180.

The attachment/detachment device 180 includes an upper holding member 181 to be fixed to the lower end of the wrist 29 of the robot arm 12 and a held member 182 to be fixed to the upper portion of the hand device 33.

The holding member 181 has an upper surface including a coupling seat 181A to be coupled to the wrist 29. Left and right slide support portions 181C and 181C are symmetrically formed on the left and right sides of the coupling seat 181A. The slide support portions 181C and 181C include inclined surfaces 181B and 181B inclined downward toward the inner side.

In the slide support portion 181C on one side of the left and right slide support portions 181C and 181C, the inclined surface 181B is divided at its middle portion in the front-rear direction to form a gap. A moving member 181D, which includes an inclined surface 181B1 having the same inclination angle as the inclined surface 181B, is fitted in this gap.

Additionally, an operating handle 181G is provided that includes an external thread portion 181F, which is threadedly engaged with an internal thread portion 181E of the slide support portion 181C. The distal end portion of the external thread portion 181F is in contact with the outer side surface of the moving member 181D.

By rotating the operating handle 181G to one side, the external thread portion 181F is tightened, and the distal end portion of the external thread portion 181F pushes and moves the moving member 181D inward.

Also, a lock handle 181H is threadedly engaged with the outer circumference of a shaft 181F2, which is integral with the external thread portion 181F. By rotating the lock handle 181H to one side, the operating handle 181G can be fixed in a state in which the rotation of the operating handle 181G is disabled.

Furthermore, in the slide support portion 181C on the other side of the left and right slide support portions 181C and 181C, a through hole 181I is formed in a portion on the side facing the moving member 181D. A plunger pin 181J is inserted in the through hole 181I.

This plunger pin 181J is always elastically urged to project inward, and an annular member 181K for pulling operation is attached to the outer end of the plunger pin 181J.

A cutout section 181L is formed to partly open the upper surface of the holding member 181, so that the end portions of the left and right slide support portions 181C and 181C are exposed in plan view.

The above-mentioned held member 182 has a lower surface including a coupling seat 182A to be coupled to the hand device 33. Inclined surfaces 182B and 182B, which are inclined upward to the outer side at an inclination angle equivalent to that of the inclined surfaces 181B and 181B of the holding member 181 described above, are formed on the left and right sides of the coupling seat 182A.

Also, a fitting hole 182C is formed in a central portion in the length direction of the section of the held member 182 on the other side.

With the above configuration, when attaching the hand device 33 to the wrist 29, the hand device 33 is first lifted, and the left and right inclined surfaces 182B and 182B of the held member 182 are moved downward through the cutout section 181L and supported on the left and right inclined surfaces 181B and 181B of the holding member 181.

When the held member 182 is slid to toward the bottom of the holding member 181, the distal end portion of the plunger pin 181J of the holding member 181 engages with the fitting hole 182C of the held member 182 and is thus positioned.

In this state, the operating handle 181G is rotated to move the moving member 181D inward, and the inclined surface 181B1 of the moving member 181D is pressed against the inclined surface 182B of the held member 182 and fixed.

Furthermore, by rotating the lock handle 181H, the rotated operating handle 181G is fixed to prevent loosening due to vibration or the like.

To remove the hand device 33 from the wrist 29, the procedure for attaching the hand device 33 may be reversed.

The attachment/detachment device 180 facilitates operations such as cleaning the hand device 33 and switching between hand devices 33 with different shapes.

CLAUSES

The technical ideas obtainable from the above embodiments and the modifications are described below.

Clause A-1

A food arrangement method including:
a first step of supporting a middle portion of food located at a collection position with a collection portion of a hand device so that opposite end portions hang down;
a second step of moving the hand device to a position above an arrangement region that is spaced apart from the collection position; and
a third step of moving the hand device in a downward direction and a direction perpendicular to the downward direction to bring the food in contact with the arrangement region from its hanging end side, lay down the food in a folded state, and discontinue the support by the collection portion.

Clause A-2

The food arrangement method according to clause A-1, in which the direction perpendicular to the downward direction is set to have a predetermined angle with respect to a direction in which the hand device moves from the collection position in the first step to a position above the arrangement region in the second step.

Clause A-3

The food arrangement method according to clause A-1 or A-2, in which
target placement points at which the food is arranged with at least one of a predetermined number of rows M and a predetermined number of columns N are set in the arrangement region,
the first step, the second step, and the third step are each performed for each of the target placement points arranged in an order of columns or an order of rows, and
the food is arranged so as to have a weight in a set range.

Clause A-4

The food arrangement method according to any one of clauses A-1 to A-3, in which
the collection portion includes
a plurality of finger portions disposed to selectively open and close relative to each other, and
claw portions that operate so as to advance to and retract from the finger portions to support the food,
in the first step, the finger portions are shifted to a closed state, the claw portions are advanced, and the food located at the collection position is supported with the claw portions and then moved upward so that opposite end portions of the food hang down, and
in the third step, the finger portions are shifted to an open state, and the claw portions are retracted to stop supporting the food.

Clause A-5

The food arrangement method according to any one of clauses A-1 to A-4, in which
the collection position is set on a conveyance surface of a conveyor that conveys the food,
the arrangement region is set in a predetermined position other than the conveyance surface of the conveyor, and
the food conveyed by the conveyor is collected at the collection position and arranged in the arrangement region.

Clause A-6

The food arrangement method according to clause A-5, in which a moving state of the conveyance surface caused by intermittent driving or continuous driving of the conveyor that conveys the food is synchronized with a timing of collecting the food on the conveyance surface.

Clause A-7

The food arrangement method according to clause A-5 or A-6, in which
an image of the food of a collection target that is conveyed by the conveyor is captured by an image-capturing means, and
on the basis of a result of the capturing, a support target point of the food is set to a center position along a length of the food in a direction intersecting a conveyance direction by the conveyor in plan view, or a position adjacent to the center position.

Clause A-8

The food arrangement method according to clause A-7, in which the support target point for the food can be changed and set to a position that is offset from the center position along the length of the food in the direction intersecting the conveyance direction by the conveyor in plan view.

Clause A-9

A hand device that is attachable to a distal end of a robot arm and includes a collection portion, in which
the collection portion includes:
a plurality of finger portions disposed to selectively move between closed positions in a vicinity of each other and open positions spaced apart from each other;
a finger portion drive source that drives and reciprocates the finger portions between the open positions and the closed positions;
claw portions disposed on the finger portions to selectively move between advanced positions in a vicinity of each other and retracted positions spaced apart from each other; and
a claw portion drive source configured to move the claw portions to the advanced positions when the finger portions are at the closed positions, and to operate the claw portions to the retracted positions when the finger portions are at the open positions.

Clause A-10

A food arrangement device including a robot including a hand device at a distal end of a robot arm having a plurality of degrees of freedom, in which
the hand device includes a collection portion including a plurality of finger portions disposed to selectively open and close relative to each other and a finger portion drive source that drives and reciprocates the finger portions between open positions and closed positions,
the robot arm is configured to move the hand device to a collection position at which food is located from a standby position that is spaced apart from the collection position,
the finger portion drive source is configured to, when the hand device moves to the collection position, move the finger portions toward the closed positions and support the food through the finger portions,
the robot arm is configured to move the hand device to a position above an arrangement region that is spaced apart from the collection position with an end portion of the food supported by the hand device hanging down, and then move the hand device in a downward direction and a direction perpendicular to the downward direction to bring the food in contact with the arrangement region from its hanging end side and lay down the food in a folded state, and
the finger portion drive source is configured to stop supporting the laid food through the finger portions.

Clause A-11

A food arrangement device including a robot including the hand device according to clause A-9 at a distal end of a robot arm having a plurality of degrees of freedom, in which
the robot arm is configured to move the hand device to a collection position at which food is located from a standby position that is spaced apart from the collection position,
when the hand device moves to the collection position, the finger portion drive source operates the finger portions to the closed positions, the claw portion drive source moves the claw portions from the retracted positions to the advanced positions, and the food is supported by at least one of operation of the finger portions to the closed positions and movement of the claw portions to the advanced positions,
the robot arm is configured to support the food with the hand device, move the hand device to a position above an arrangement region that is spaced apart from the collection position with an end portion of the food hanging down, and then move the hand device in a downward direction and a direction perpendicular to the downward direction to bring the food in contact with the arrangement region from its hanging end side and lay down the food in a folded state, and
the finger portion drive source and the claw portion drive source are configured to move the finger portions and the claw portions to open positions and retracted positions to stop supporting the laid food.

Clause A-12

A food arrangement controller including a control unit for performing control of the food arrangement device according to clause A-10, in which
the control unit includes a first control function for controlling active joints of the robot arm and a second control function for controlling the hand device, the first control function drives and controls the active joints of the robot arm and moves the hand device from a standby position that is farther from food to a closer collection position at which the food is located, the second control function drives and controls the finger portion drive source when the hand device moves to the collection position and moves the finger portions from open positions to closed positions to support the food through the finger portions, the first control function drives and controls the active joints of the robot arm, supports the food with the hand device, moves the hand device to a position above an arrangement region that is spaced apart from the collection position with the food handing down, and then moves the hand device in a downward direction and a direction perpendicular to the downward direction to bring the food in contact with the arrangement region from its hanging end side and lay down the food in a folded state, and the second control function drives and controls the finger portion drive source to move from the advanced positions to the retracted positions and stop supporting the laid food through the finger portions.

Clause A-13

A food arrangement controller including a control unit for performing control of the food arrangement device according to clause A-11, in which the control unit includes a first control function for controlling active joints of the robot arm and a second control function for controlling the hand device, the first control function drives and controls the active joints of the robot arm and moves the hand device from a standby position that is farther from food to a closer collection position at which the food is located, the second control function drives and controls the finger portion drive source and the claw portion drive source when the hand device moves to the collection position, moves the finger portions to the closed positions, and moves the claw portions from the retracted positions to the advanced positions to support the food, the first control function drives and controls the active joints of the robot arm, supports the food with the hand device, moves the hand device to a position above an arrangement region that is spaced apart from the collection position with the food handing down, and then moves the hand device in a downward direction and a direction perpendicular to the downward direction to bring the food in contact with the arrangement region from its hanging end side and lay down the food in a folded state, and the second control function drives and controls the finger portion drive source and the claw portion drive source to stop supporting the laid food.

Clause A-14

A food arrangement method using a hand device including a collection portion including a plurality of finger portions capable of shifting between an open state and a closed state and a scooping portion disposed to selectively advance into and retract from between the finger portions, the method including:

a first step of scooping food located at a collection position obliquely upward with the scooping portion advancing into between the finger portions in the open state, and causing the finger portions to shift to the closed state so as to deform the scooped food substantially into a shape of letter U in plan view and support the food;

a second step of moving the hand device to a position above an arrangement region that is spaced apart from the collection position; and a third step of stopping supporting the food and lowering the food obliquely downward with the scooping portion in the arrangement region so as to place the food remaining substantially in the shape of letter U in plan view.

Clause A-15

The food arrangement method according to clause A-14, in which the finger portions include a plurality of claw portions disposed to selectively move to advanced positions in proximity to each other and retracted positions spaced apart from each other, the open state of the finger portions includes a state in which the claw portions are located at the advanced positions and a state in which the claw portions are located at the retracted positions, and in the closed state of the finger portions, a lower portion of the food scooped obliquely upward by the scooping portion in the first step is placed and supported on the claw portions.

Clause A-16

The food arrangement method according to clause A-14 or A-15, in which target placement points at which the food is arranged with at least one of a predetermined number of rows M and a predetermined number of columns N are set in the arrangement region, the first step, the second step, and the third step are each performed for each of the target placement points arranged in an order of columns or an order of rows, and the food is arranged to have a weight in a set range.

Clause A-17

The food arrangement method according to any one of clauses A-14 to A-16, in which the hand device is twisted in a direction perpendicular to the downward direction in the second step, and the food is lowered obliquely downward by the scooping portion in the subsequent third step to place the food remaining substantially in the shape of letter U in plan view.

Clause A-18

The food arrangement method according to any one of clauses A-14 to A-17, in which the collection position is set on a conveyance surface of a conveyor that conveys the food, the arrangement region is set in a predetermined position other than the conveyance surface of the conveyor, and the food conveyed by the conveyor is collected at the collection position and arranged in the arrangement region.

Clause A-19

The food arrangement method according to clause A-18, in which a moving state of the conveyance surface caused by intermittent driving or continuous driving of the conveyor that conveys the food is synchronized with a timing of collecting the food on the conveyance surface.

Clause A-20

The food arrangement method according to clause A-18 or A-19, in which an image of the food of a collection target that is conveyed by the conveyor is captured by an image-capturing means, and on the basis of a result of the capturing, a support target point of the scooping portion with respect to the food is set to a center position along a length of the food in a direction intersecting a conveyance direction by the conveyor in plan view, or a position adjacent to the center position.

Clause A-21

The food arrangement method according to clause A-20, in which the support target point for the food can be changed and set to a position that is offset from the center position along the length of the food in the direction intersecting the conveyance direction by the conveyor in plan view.

Clause A-22

A hand device that is attachable to a distal end of a robot arm and includes a collection portion, in which
  the collection portion includes:
    a plurality of finger portions capable of shifting between an open state and a closed state;
    a finger portion drive source configured to cause the finger portions to shift between the open state and the closed state;
    a scooping portion that is disposed to selectively advance into and retract from between the finger portions and operate to scoop food in an obliquely upward direction and lower the scooped food in a direction that is opposite to the obliquely upward direction;
    a first drive source configured to operate the scooping portion; and
    a second drive source configured to operate the scooping portion so as to advance into and retract from between the finger portions.

Clause A-23

A hand device that is attachable to a distal end of a robot arm and includes a collection portion, in which
  the collection portion includes:
    a plurality of finger portions capable of shifting between an open state and a closed state;
    a finger portion drive source configured to cause the finger portions to shift between the open state and the closed state;
    claw portions disposed on the finger portions to selectively move to advanced positions in proximity to each other and retracted positions spaced apart from each other;
    a claw portion drive source configured to drive and reciprocate the claw portions between the advanced positions and the retracted positions;
    a scooping portion that is disposed to selectively advance into and retract from a gap formed between the claw portions that are at the advanced positions when the finger portions are in the open state, and configured to scoop food obliquely upward and lower the scooped food obliquely downward;
    a first drive source configured to operate the scooping portion in the obliquely upward direction and in an obliquely downward direction; and
    a second drive source configured to operate the scooping portion so as to advance into and retract from the gap,
  in a state in which the finger portions are in the open state and the claw portions are at the advanced positions, the scooping portion scoops the food obliquely upward, and then the finger portions are shifted to the closed state to place and support a lower portion of the food on the claw portions, the food is moved to a position above the arrangement region by movement of the hand device, and then the claw portions are moved to the retracted positions to discontinue the support of the food by the claw portions.

Clause A-24

A food arrangement device including a robot including the hand device according to clause A-22 at a distal end of a robot arm having a plurality of degrees of freedom, in which
  the robot arm is configured to move the hand device to a collection position at which food is located from a standby position that is spaced apart from the collection position,
  the scooping portion is configured to be operated by the second drive source to advance to between the finger portions in the open state when the hand device moves to the collection position, and operated by the first drive source to scoop the food located at the collection position obliquely upward,
  the finger portions are configured to permit, in the open state, entry of the scooping portion into between the finger portions and scooping operation of the food, and to be operated by the finger portion drive source to shift to the closed state to deform the scooped food substantially into a shape of letter U in plan view,
  the robot arm is configured to, after the food is deformed, move the hand device to a position above an arrangement region that is spaced apart from the collection position,
  the finger portions are configured to, after the hand device is moved by the robot arm to above the arrangement region, be operated by the finger portion drive source to shift to the open state to stop supporting the food by the finger portions, and
  the scooping portion is configured to be operated by the first drive source to lower the food, which has stopped being supported, obliquely downward and place the food remaining substantially in the shape of letter U in plan view on the arrangement region.

Clause A-25

A food arrangement device including a robot including the hand device according to clause A-23 at a distal end of a robot arm having a plurality of degrees of freedom, in which
  the robot arm is configured to move the hand device to a collection position at which food is located from a standby position that is spaced apart from the collection position,
  the scooping portion is configured to, when the hand device moves to the collection position, be operated by the second drive source to advance into the gap in a state in which the finger portions are in the open state or the closed state and the claw portions are at the advanced positions, and be operated by the first drive source to scoop the food located at the collection position obliquely upward,
  the finger portions are moved by the finger portion drive source to the closed state so as to deform the scooped food substantially into a shape of letter U in plan view,
  the claw portions at the advanced positions support the scooped food,
  the robot arm is configured to, after the food is supported by the claw portions, move the hand device to a position above an arrangement region that is spaced apart from the collection position,
  when the hand device moves to the position above the arrangement region, the claw portions are moved by the claw portion drive source to the retracted positions to stop supporting the food, and the scooping portion is configured to be caused by the first drive source to lower the food, which has stopped being supported by the claw portions, obliquely downward and place the food remaining substantially in the shape of letter U in plan view on the arrangement region.

Clause A-26

A food arrangement controller including a control unit for controlling the food arrangement device according to clause A-25, in which the control unit includes a first control function for controlling active joints of the robot arm and a second control function for controlling the hand device, the first control function drives and controls the active joints of the robot arm to move the hand device from the standby position to the collection position, the second control function controls the second drive source when the hand device moves to the collection position and advances the scooping portion into the gap while the finger portions are in the open state or the open state and the claw portions are at the advanced positions, and controls the first drive source to scoop the food located at the collection position obliquely upward, the second control function controls the finger portion drive source to move the finger portions to closing directions so as to deform the scooped food substantially into a shape of letter U in plan view and to support the scooped food with the claw portions located at the advanced positions, the first control function controls, after the food is supported by the claw portions, the active joints to move the hand device to a position above an arrangement region that is spaced apart from the collection position, and the second control function performs, after the hand device is moved to the position above the arrangement region, at least control that causes the claw portion drive source to move the claw portions to the retracted positions of control that causes the finger portion drive source to shift the finger portions to the open state and the control that causes the claw portion drive source to move the claw portions to the retracted positions so as to stop supporting the food, and controls the first drive source to cause the scooping portion to lower the food, which has stopped being supported, obliquely downward so as to place the food remaining substantially in the shape of letter U in plan view on the arrangement region.

Clause A-27

The food arrangement controller according to clause A-26, in which when the first control function controls the active joints to move the hand device to the position above the arrangement region that is spaced apart from the collection position through the distal end of the robot arm, the hand device is temporarily twisted in a direction perpendicular to a downward direction at the position above the arrangement region or in its vicinity, and the second control function then controls the first drive source to cause the scooping portion to lower the food obliquely downward while reversing the twist so as to place the food remaining substantially in the shape of letter U in plan view.

Clause B-1

A food arrangement method including:

a first step of advancing a hand device including an upper belt portion and a lower belt portion extending obliquely downward to a downstream side in a conveyance direction of food while driving the upper belt portion to scoop and support food located at a collection position causing an end portion of the food to hang down, and folding the end portion with a folding portion of the hand device toward the lower belt portion;

a second step of moving the hand device to above an arrangement region that is spaced apart from the collection position; and a third step of driving the upper belt portion and the lower belt portion in a reverse direction while retracting the hand device at the position above the arrangement region to remove a supported section of the food that is supported by the upper belt and the end portion folded toward the lower belt portion from the both belt portions, and transferring the food to the arrangement region.

Clause B-2

The food arrangement method according to clause B-1, in which a plurality of release start points for arranging the food in a predetermined number of columns are set in the arrangement region, and the first step, the second step, and the third step are successively performed for each of the release start points arranged in an order of performance to arrange the food.

Clause B-3

The food arrangement method according to clause B-1 or B-2, in which the collection position is set on a conveyance surface of a conveyor that conveys the food, the arrangement region is set in a predetermined position other than the conveyance surface of the conveyor, and the food conveyed by the conveyor is collected at the collection position and arranged in the arrangement region.

Clause B-4

The food arrangement method according to clause B-3, in which a moving state of the conveyance surface caused by intermittent driving or continuous driving of the conveyor that conveys the food is synchronized with a timing of collecting the food on the conveyance surface.

Clause B-5

The food arrangement method according to clause B-4, in which an image of the food of a collection target that is conveyed by the conveyor is captured by an image-capturing means, and on the basis of a result of the capturing, a support reference point used when the food is collected is set to a middle section of the food in a direction intersecting a conveyance direction of the conveyor in plan view.

Clause B-6

The food arrangement method according to clause B-5, in which a first state in which the folding portion folds both end portions of the food and a second state in which the folding portion folds only one end portion of the food are selectable, when the first state is selected, a central portion of the food in a direction intersecting the conveyance direction of the conveyor in plan view is set as the support reference point used when the food is collected, and when the second state is selected, a section offset from the central portion of the food by a set distance is set as the support reference point used when the food is collected.

Clause B-7

A hand device attachable to a distal end of a robot arm, the hand device including:
- a collection portion including an upper belt portion and a lower belt portion extending obliquely downward;
- a belt driving source configured to drive and rotate the belt portions in forward and reverse directions;
- a folding portion configured to fold, toward the lower belt portion, an end portion of food scooped by the upper belt portion and thus hanging down; and
- a folding portion drive source configured to cause the folding portion to perform folding operation and unfolding operation.

Clause B-8

A food arrangement device including a robot including the hand device according to clause B-7 at a distal end of a robot arm having a plurality of degrees of freedom, in which
- the robot arm is configured to move the hand device to a collection position at which food is located from a standby position that is spaced apart from the collection position,
- in the robot arm, when the hand device is advanced to the collection position with a lower end of the upper belt portion positioned along a plane that is substantially the same as a food placement surface located at the collection position, the hand device is lifted while the food is scooped by driving and rotating the upper belt portion and the lower belt portion in the forward direction by the belt drive source or after the food is scooped and supported,
- the folding portion drive source is configured to, during or after the lifting of the hand device, cause the folding portion to perform folding operation to fold a hanging end portion toward the lower belt portion, and
- in the robot arm, after the hand device is moved to above an arrangement region that is spaced apart from the collection position, the belt drive source rotates the upper belt portion and the lower belt portion in the reverse direction while the hand device is retracted, and a supported section of the food that is supported by the upper belt and the end portion folded toward the lower belt portion are removed from the both belt portions to arrange the food in the arrangement region.

Clause B-9

A food arrangement controller including a control unit for performing control of the food arrangement device according to clause B-8, in which
- the control unit includes a first control function for controlling the robot arm and a second control function for controlling the hand device,
- the first control function drives and controls the robot arm to advance the hand device from a standby position that is farther from food to a closer collection position at which the food is located with the lower end of the upper belt portion positioned along a plane that is substantially the same as a food placement surface located at the collection position,
- when the hand device advances to the collection position, the second control function drives and controls the belt drive source to rotate the upper belt portion and the lower belt portion in a forward direction to scoop and support the food,
- the first control function drives and controls the robot arm to lift the hand device so that an end portion of the food hangs down,
- the second control function controls the folding portion drive source and causes, during or after the lifting of the hand device, the folding portion to perform folding operation to fold the hanging end portion toward the lower belt portion,
- the first control function controls and drives the robot arm to move the hand device to a release start point that is preset at the position above the arrangement region that is spaced apart from the collection position and then retract the hand device at the position above the arrangement region, and
- during the retraction, the second control function drives and controls the belt drive source to rotate the upper belt portion and the lower belt portion in a reverse direction to remove the supported section and the end portion folded toward the lower belt portion of the food from the both belt portions and arrange the food on the arrangement region.

Clause B-10

A food arrangement controller that includes a control unit for controlling the food arrangement device according to clause B-8 and is configured to perform a control such that j (j>1, j is an integer) food articles placed at a collection position on a food placement surface at intervals of a predetermined pitch are successively collected and arranged in an arrangement region, in which
- the control unit includes a first control function for controlling the robot arm and a second control function for controlling the hand device,
- the first control function drives and controls the robot arm to advance the hand device from a standby position to the collection position in an arrangement direction of the food articles on the food placement surface while causing a lower end of the upper belt portion to slide on the food placement surface,
- during the advancement of the hand device, the second control function drives and controls the belt drive source to drive the upper belt portion and successively scoop the j food articles,
- the first control function drives and controls the robot arm to lift the hand device and support the j food articles so that end portions of the food articles hang down,
- the second control function controls the folding portion drive source and causes, during or after the lifting of the hand device, the folding portion to perform folding operation to fold the hanging end portions toward the lower belt portion,
- when advancement of the hand device to a preset release start point and retraction of the hand device from the release start point to a release end point form one cycle, the first control function drives and controls the robot arm to perform j cycles, and
- during the retraction of the hand device in each cycle, the second control function drives and controls the belt drive source to drive the upper belt portion and the lower belt portion to successively remove a supported portion and an end portion folded toward the lower belt portion of each food article from the both belt portions and arrange the removed food articles on the arrangement region in the arrangement direction.

Clause B-11

The food arrangement controller according to clause B-9 or B-10, in which the release start point is one of a plurality of release start points set in a matrix in the arrangement region, and each time arrangement of the food article is finished while the hand device is retracted from one release start point to the release end point, a process by the first control function and the second control function is performed at another adjacent release start point.

Clause C-1

A food batch forming method including:

a first step of collecting a food article having a predetermined thickness at a collection position;

a second step of moving the food article collected at the collection position to above a set region that is spaced apart from the collection position; and a third step of placing the food article moved to above the set region to an individual position in the set region, in which the food batch forming method automatically repeats the first to third steps to form a food batch including a plurality of food articles in the set region, and a number of food articles forming the food batch is automatically changed according to a size of each food article to adjust a weight of the food batch to be within a set range.

Clause C-2

A food batch forming method including:

a first step of collecting a food article having a predetermined thickness at a collection position;

a second step of moving the food article collected at the collection position to above a set region that is spaced apart from the collection position; and a third step of placing the food article moved to above the set region to an individual position in the set region, in which the food batch forming method automatically repeats the first to third steps to form a food batch including a plurality of food articles in the set region, a plurality of rows and a plurality of columns for arranging food articles are set in the set region, and a number of columns in each row is automatically changed according to a size of a food article to adjust a weight of the food batch to be within a set range.

Clause C-3

The food batch forming method according to clause C-2, in which the number of columns in each row, or the number of columns in each row and intervals between the columns are automatically changed according to a size of the food article to be placed at a beginning of each row.

Clause C-4

The food batch forming method according to clause C-1, C-2, or C-3, further including an image-capturing means for capturing an image of a food article before being collected, in which a size of the food article is obtained from an image-capturing result of the image-capturing means.

Clause C-5

The food batch forming method according to any one of clauses C-1 to C-4, in which, when the size of the food article is smaller than a set size, collection of this food article is automatically prohibited.

Clause C-6

A food batch forming method including:

a first step of collecting a food article having a predetermined thickness at a collection position;

a second step of moving the food article collected at the collection position to a position above a set region that is spaced apart from the collection position; and a third step of placing the food article moved to the position above the set region to an individual position in the set region, in which the food batch forming method automatically repeats the first to third steps to form a food batch including a plurality of food articles in the set region, a plurality of rows and a plurality of columns for arranging food articles are set in the set region, an image-capturing means for capturing an image of the food article before being collected is provided, a width and an area of the food article is calculated from an image-capturing result of the image-capturing means, a size of the food article is classified into a plurality of classes according to the width and the area, and a number of columns in each row is automatically changed according to the class of the food article to be placed at a beginning of each row to adjust a weight of the food batch to be within a set range.

Clause C-7

The food batch forming method according to clause C-6, in which, when the food article is classified into a class that is smaller than a predetermined class, collection of this food article is automatically prohibited.

Clause C-8

The food batch forming method according to any one of clauses C-1 to C-7, in which an image-capturing means for capturing an image of a food article before being collected is provided, suitability for food batch formation is determined from a color of the food article captured by the image-capturing means, and when a food article is determined to be unsuitable, collection of this food article is automatically prohibited.

Clause C-9

The food batch forming method according to any one of clauses C-1 to C-7, in which an image-capturing means for capturing an image of a food article before being collected is provided, and when a proportion of an area of a specific color to an entire area of a food article captured by the image-capturing means is greater than a predetermined value, collection of this food article is automatically prohibited.

Clause C-10

The food batch forming method according to clause C-5, C-7, C-8, or C-9, further including a removal means configured to automatically remove a food article for which collection is prohibited.

Clause C-11

The food batch forming method according to any one of clauses C-1 to C-10, in which the set region is set on a base surface of a food tray.

Clause C-12

A food batch forming method including:

a first step of supporting and collecting a food article having a predetermined thickness at a collection position with a support portion of a hand device;

a second step of moving the hand device that has collected the food article to above a set region that is spaced apart from the collection position; and a third step of retracting the support portion of the hand device that has moved to above the set region to stop supporting the food article and place this food article at an individual position in the set region, in which the food batch forming method automatically repeats the first to third steps to form a food batch including a plurality of food articles in the set region, a plurality of rows and a plurality of columns for arranging food articles are set in the set region, and a number of columns in each row is automatically changed according to a size of a food article to be placed at a beginning of each row to adjust a weight of the food batch to be within a set range.

Clause C-13

The food batch forming method according to clause C-12, in which an image-capturing means for capturing an image of a food article before being collected by the hand device is provided, a width of the food article is calculated from an image-capturing result of the image-capturing means, and a position of the hand device is controlled such that the support portion supports a central portion of the width of the food article or a section near the central portion.

Clause C-14

The food batch forming method according to clause C-12 or C-13, in which the hand device includes a dropping aid means that causes a food article supported by the support portion to be peeled off and drop from the support portion, and the dropping aid means is operated when the support portion retracts from a support position to cause the food article supported by the support portion to drop and be placed in the set region.

Clause C-15

The food batch forming method according to clause C-14, in which an upper portion of the food article supported by the support portion is pressed downward by the dropping aid means.

Clause D-1

A hand device, including:

left and right finger-shaped portions configured to operate to open and close; and a scooping portion configured to advance into and retract from a space between the left and right finger-shaped portions, in which each of the left and right finger-shaped portions includes a first member and a second member having a predetermined length in an up-down direction, and the left and right first members and the left and right second members are configured to independently operate to open and close.

Clause D-2

The hand device according to clause D-1, in which first gaps formed between side edges of the scooping portion and the first members in a state in which the scooping portion advances to between the left and right finger-shaped portions and the left and right first members and the left and right second members operate in closing directions are set to be smaller than second gaps formed between the side edges of the scooping portion and the second members.

Clause D-3

The hand device according to clause D-1 or D-2, in which the first member and the second member are disposed in proximity to each other in each finger-shaped portion, and an inner edge portion of the first member is configured to project and retract relative to an inner edge portion of the second member.

Clause D-4

The hand device according to clause D-3, in which the second member includes a space portion, and the inner edge portion of the first member is configured to project from and retract into the space portion.

Clause D-5

The hand device according to any one of clauses D-1 to D-4, in which an inner edge portion of each of the left and right first members and the left and right second members is formed in an up-down direction, and lower end portions of the left and right first members include engagement portions extending toward each other.

Clause D-6

The hand device according to any one of clauses D-1 to D-5, in which a driving device configured to cause opening and closing of the left and right first members, opening and closing of the left and right second members, and advancement and retraction of the scooping portion to be performed individually or synchronously is disposed in an upper portion of the hand device.

Clause D-7

The hand device according to any one of clauses D-1 to D-6, in which the scooping portion includes a belt-shaped conveyance member that is inclined at a predetermined angle with respect to an up-down direction.

Clause D-8

The hand device according to any one of clauses D-1 to D-7, in which, when the scooping portion advances to between the left and right finger portions, the left and right first members operate in closing directions before the left and right second members.

Clause D-9

The hand device according to clause D-8, in which the left and right first members are configured to open before the scooping portion retracts from between the left and right finger portions, and the left and right second members are configured to open in a process in which the scooping portion retracts from between the left and right finger portions or when the scooping portion has retracted from between the left and right finger portions.

Clause D-10

A food batch forming method using the hand device according to any one of clauses D-1 to D-9, the method including:

a first step of scooping a food article located at a collection position obliquely upward with the scooping portion of the hand device and operating the left and right first members and the left and right second members in closing directions to collect the scooped food article in a state of being deformed substantially in a shape of letter U in plan view;

a second step of moving the hand device that has collected the food article to a position above a set region that is spaced apart from the collection position; and a third step of operating the left and right first members in opening directions at the position above the set region and lowering the food article obliquely downward with the scooping portion while limiting opening of an end portion of the food article with the second members to place the food article remaining substantially in the shape of letter U in plan view in the set region, in which the food batch forming method automatically repeats the first to third steps to form a food batch including a plurality of food articles in the set region.

Clause D-11

A food batch forming method using the hand device according to any one of clauses D-1 to D-10, the method including:
- a first step of scooping, at a collection position, a food article having a predetermined thickness obliquely upward with the scooping portion of the hand device and operating the left and right first members and the left and right second members in closing directions to collect the food article in a state of being deformed substantially in a shape of letter U in plan view;
- a second step of moving the hand device that has collected the food article to a position above a set region that is spaced apart from the collection position; and
- a third step of operating the left and right first members in opening directions at the position above the set region and lowering the food article obliquely downward with the scooping portion while limiting opening of an end portion of the food article with the second members to place the food article remaining substantially in the shape of letter U in plan view at an individual position in the set region,
- in which, when the first to third steps are automatically repeated to form a food batch including a plurality of food articles in the set region, a number of food articles forming the food batch is automatically changed according to a size of each food article to adjust a weight of the food batch to be within a set range.

Clause D-12

The food batch forming method according to clause D-11, in which, when the first to third steps are automatically repeated to form a food batch including a plurality of food articles in the set region, a plurality of rows and a plurality of columns for arranging food articles are set in the set region, and a number of columns in each row, or a number of columns in each row and intervals between the columns are automatically changed according to a size of the food article to be placed at a beginning of each row.

Clause D-13

The food batch forming method according to clause D-11 or D-12, further including an image-capturing means for capturing an image of a food article before being collected, in which a size of the food article is obtained from an image-capturing result of the image-capturing means.

Clause D-14

The food batch forming method according to clause D-11, D-12, or D-13, in which the set region is set on a base surface of a food tray.

Clause E-1

A hand device for holding a food article with left and right finger-shaped portions that are configured to operate to open and close, in which
- each of the left and right finger-shaped portions includes a first finger-shaped member and a second finger-shaped member that are configured to independently operate to open and close,
- the first finger-shaped member and the second finger-shaped member are disposed in a vicinity of each other in each finger-shaped portion, and an inner edge portion of the first finger-shaped member is configured to project and retract relative to an inner edge portion of the second finger-shaped member.

Clause E-2

The hand device according to clause E-1, in which the second finger-shaped member includes a space portion, and the inner edge portion of the first finger-shaped member is configured to project from and retract into the space portion.

Clause E-3

The hand device according to clauses E-1 or E-2, in which
- the inner edge portion of each of the left and right first finger-shaped members and the left and right second finger-shaped members is formed in an up-down direction, and
- lower end portions of the left and right first finger-shaped members include engagement portions extending toward each other.

Clause E-4

The hand device according to clause E-1, E-2, or E-3, in which, when the hand device holds a food article with the left and right finger-shaped portions, the left and right first finger-shaped members operate in closing directions before the left and right second finger-shaped members, and the inner edge portions of the left and right first finger-shaped members project inward beyond the inner edge portions of the left and right second finger-shaped members.

Clause E-5

The hand device according to any one of clauses E-1 to E-4, in which, when the hand device removes the held food article from the left and right finger-shaped portions, the left and right first finger-shaped members open before the second finger-shaped members, and inner edge portions of the left and right first finger-shaped members retract outward beyond inner edge portions of the left and right second finger-shaped members.

Clause E-6

The hand device according to any one of clauses E-1 to E-5, further including a removal aid means configured to operate in conjunction with opening operation of the left and right first finger-shaped members to aid removal of the held food article.

Clause E-7

The hand device according to clause E-6, in which the removal aid means is configured to eject fluid such as air to a center position between the left and right finger-shaped portions or a position adjacent to the center position.

Clause E-8

The hand device according to clause E-6 or E-7, in which, when the hand device removes the held food article from the left and right finger-shaped portions, the left and right first finger-shaped members open before the second finger-shaped members, and the removal aid means operates substantially at the same as when the left and right first finger-shaped members start to open.

Clause E-9

The hand device according to any one of clauses E-1 to E-8, in which a driving device configured to cause the left and right first finger-shaped members and the left and right second finger-shaped members to operate to open and close is disposed in an upper portion of the hand device.

Clause E-10

A food batch forming method using the hand device according to any one of clauses E-6 to E-9, the method including:
- a first step of holding a middle portion in a length direction of a food article located at a collection position by operating the left and right first finger-shaped members and the left and right second finger-shaped members in closing directions and lifting the hand device to collect the food article with opposite end portions of the food article hanging down;

a second step of changing an orientation in plan view of the hand device that has collected the food article and moving the hand device to a position above a set region that is spaced apart from the collection position; and a third step of lowering the hand device while moving the hand device in a direction substantially opposite to a moving direction in the second step at the position above the set region and removing the held food article by operating the left and right first finger-shaped members and the left and right second finger-shaped members in opening directions and operating the removal aid means to place the food article in the set region in a state of being folded in half, in which the food batch forming method automatically repeats the first to third steps to form a food batch including a plurality of food articles in the set region.

Clause E-11

A food batch forming method using the hand device according to clause E-10, in which a predetermined turning angle is formed between a moving direction of the hand device in the second step and a moving direction of the hand device in the third step in plan view.

Clause E-12

A food batch forming method using the hand device according to any one of clauses E-6 to E-11, the method including:

a first step of holding a middle portion in a length direction of a food article located at a collection position by operating the left and right first finger-shaped members and the left and right second finger-shaped members in closing directions and lifting the hand device to collect the food article with opposite end portions of the food article hanging down;

a second step of changing an orientation in plan view of the hand device that has collected the food article and moving the hand device to above a set region that is spaced apart from the collection position; and a third step of lowering the hand device while moving the hand device in a direction substantially opposite to a moving direction in the second step above the set region and removing the held food article by operating the left and right first finger-shaped members and the left and right second finger-shaped members in opening directions and operating the removal aid means to place the food article in the set region in a state of being folded in half, in which, when the first to third steps are automatically repeated to form a food batch including a plurality of food articles in the set region, a number of food articles forming the food batch is automatically changed according to a size of each food article to adjust a weight of the food batch to be within a set range.

Clause E-13

The food batch forming method according to clause E-12, in which, when the first to third steps are automatically repeated to form a food batch including a plurality of food articles in the set region, a plurality of rows and a plurality of columns for arranging food articles are set in the set region, and a number of columns in each row, or a number of columns in each row and intervals between the columns are automatically changed according to a size of the food article to be placed at a beginning of each row.

Clause E-14

The food batch forming method according to clause E-12 or E-13, further including an image-capturing means for capturing an image of a food article before being collected, in which a size of the food article is obtained from an image-capturing result of the image-capturing means.

Clause E-15

The food batch forming method according to clause E-12, E-13, or E-14, in which the set region is set on a base surface of a food tray.

Clause F-1

An article transfer device including a belt-shaped member that is capable of transferring an article, folded back at a distal end portion of a support member from an upper surface side of the support member, and looped to a lower surface side of the support member, and configured to transfer an article by advancement and retraction of the support member relative to the article and movement of the belt-shaped member relative to the upper surface of the support member in forward and reverse directions, in which opposite ends of the belt-shaped member are attached to a single rotation member or a plurality of coaxially-rotational rotation members disposed on a base side of the support member, and the rotation member is configured to be rotated while unwinding one end of the belt-shaped member and winding the other end so as to move the belt-shaped member relative to the upper surface of the support member.

Clause F-2

The article transfer device according to clause F-1, in which winding directions at one end and the other end of the belt-shaped member with respect to the rotation member are set to opposite directions, and a length of the belt-shaped member that is unwound at one end by rotation of the rotation member is set to be substantially equal to a length of the belt-shaped member that is wound at the other end.

Clause F-3

The article transfer device according to clause F-1 or F-2, in which narrow sections are formed at opposite ends of the belt-shaped member, and the narrow sections are wound around sections of the rotation member that are different in a rotation axis direction.

Clause F-4

The article transfer device according to clause F-1 or F-2, in which at each of opposite ends of the belt-shaped member, a cutout section and a narrow section are formed adjacent to each other in a width direction of the belt-shaped member, a width of the cutout section formed at one end of the belt-shaped member is set greater than a width of the narrow section formed at the other end of the belt-shaped member, and the narrow section at one end of the belt-shaped member and the narrow section at the other end are wound around sections of the rotation member that are adjacent in a rotation axis direction.

Clause F-5

The article transfer device according to any one of clauses F-1 to F-4, in which one or both of opposite end sides of the belt-shaped member are selectively attached to and detachable from an outer circumference portion of the rotation member.

Clause F-6

The article transfer device according to any one of clauses F-1 to F-5, in which the belt-shaped member is moved in a forward direction relative to the upper surface of the support member while the support member is advanced toward a lower surface side of the article to scoop the article, and the support member is retracted from the lower surface side of the article while the belt-shaped member is moved in a reverse direction relative to the upper surface of the support member to lower the article.

Clause F-7

An attachment and detachment device for a hand device including the article transfer device according to any one of clauses F-1 to F-6, in which a hand device including the belt-shaped member, a support member, and a rotation member is provided, the attachment and detachment device is provided that allows the hand device to be selectively attached and detached with respect to a wrist portion of a robot arm, the attachment and detachment device includes a holding member to be fixed to the wrist portion of the robot arm and a held member to be fixed to the hand device, and the holding member includes:

a slide support portion that supports the held member in a mount state so as to be slidable in a lateral direction;

an engagement portion that engages with the held member at a predetermined position in a direction of the sliding; and a fixing portion that presses the held member at a position at which the engagement portion engages and fixes the held member in a non-slidable manner.

Clause F-8

The attachment and detachment device for the hand device including the article transfer device according to clause F-7, in which the fixing portion includes:

a first operating tool that presses the held member by rotation operation; and a second operating tool that locks the rotation of the first operating tool.

REFERENCE SIGNS LIST

4 ... Food Arrangement Device; 6 ... Tray; 11 ... Camera (Image-capturing Means) 33 ... Hand Device: 34 ... Robot Controller (Controller); 55L ... Left Finger-shaped Portion; 55R ... Right Finger-shaped Portion; 56 ... First Air Cylinder (Driving Device); 57 ... Second Air Cylinder (Driving Device); 58L ... Left First Member; 58R ... Right First Member; 58LS ... Left Engagement Portion; 58RS ... Right Engagement Portion; 59L ... Left Second Member; 59R ... Right Second Member; 99 ... Belt (Upper Belt/Lower Belt); 173 ... Belt (Conveyance Member); 175 ... Scooping Portion; 138 ... Folding Device (Folding Portion); 130R2 ... Servomotor (Belt Drive Source); 140L ... Left Air Cylinder (Folding Portion Drive Source); 140R ... Right Air Cylinder (Folding Portion Drive Source); E ... Meat Slice (Food); E1 ... Meat Slice Batch (Food); R ... Set Region; SP ... Gap (Space Portion); T ... Collection Position; N1 ... Nozzle (Removal Aid Means)

The invention claimed is:

1. A hand device for holding a food article with left and right finger-shaped portions that are configured to be operated to open and close, wherein each of the left and right finger-shaped portions includes a first member and a second member that are configured to be independently operated to open and close, the first member and the second member are disposed in a vicinity of each other in each of the left and right finger-shaped portion, and for each of the left and right finger-shaped portions, an inner edge portion of the first member is configured to be projected and retracted relative to an inner edge portion of the second member when the first member is being operated to open and close, wherein the hand device further comprises a scooping portion configured to be advanced into and retracted from a space between the left and right finger-shaped portions, wherein the scooping portion includes a belt-shaped conveyance member that is inclined at a predetermined angle with respect to an up-down direction.

2. The hand device according to claim 1, wherein for each of the left and right finger-shaped portions, the second member includes a space portion, and the inner edge portion of the first member is configured to be projected from and retracted into the space portion when the first member is being operated to open and close.

3. The hand device according to claim 1, wherein the inner edge portion of each of the left and right first members and the left and right second members is formed in an up-down direction, and lower end portions of the left and right first members include engagement portions extending toward each other.

4. The hand device according to claim 1, wherein when the hand device holds a food article with the left and right finger-shaped portions, the left and right first members operate in closing directions before the left and right second members, and the inner edge portions of the left and right first members project inward beyond the inner edge portions of the left and right second members, and when the hand device removes the held food article from the left and right finger-shaped portions, the left and right first members open before the second members, and the inner edge portions of the left and right first members retract outward beyond the inner edge portions of the left and right second members.

5. The hand device according to claim 1, wherein a driving device is disposed in an upper portion of the hand device, the driving device being configured to cause the left and right first members to open and close and cause the left and right second members to open and close.

6. The hand device according to claim 1, further comprising:

a removal aid means configured to operate in conjunction with opening operation of the left and right first members to aid removal of the held food article, wherein the removal aid means includes a means for ejecting fluid toward a center position between the left and right finger-shaped portions or a position adjacent to the center position.

7. A food batch formation device using the hand device according to claim 6, the food batch formation device comprising a controller configured to perform the steps of:

holding a middle portion in a length direction of a food article located at a collection position by operating the left and right first members and the left and right second members in closing directions and lifting the hand device to collect the food article with opposite end portions of the food article hanging down;

changing an orientation in plan view of the hand device that has collected the food article and moving the hand device to a position above a set region that is spaced apart from the collection position; and lowering the hand device while moving the hand device in a direction opposite to a moving direction in the immediately prior step at the position above the set region and removing the held food article by operating the left and right first members and the left and right second members in opening directions and operating the removal aid means to place the food article in the set region in a state of being folded in half, wherein the controller is configured to automatically and repeatedly perform the steps to form a food batch including a plurality of food articles in the set region.

8. The hand device according to claim 1, wherein when the scooping portion is being advanced to between the left and right finger-shaped portions, the left and right first members operate in the closing directions before the left and right second members, the left and right first members are configured to be opened before the scooping portion retracts from between the left and right finger-shaped portions, and the left and right second members are configured to be opened in a process in which the scooping portion retracts from between the left and right finger-shaped portions or when the scooping portion has retracted from between the left and right finger-shaped portions.

9. A food batch formation device using the hand device according to claim 1, the food batch formation device comprising a controller configured to perform the steps of:

scooping a food article located at a collection position obliquely upward with the scooping portion of the hand device and operating the left and right first members and the left and right second members in closing directions to collect the scooped food article in a state of being deformed in a shape of letter U;

moving the hand device that has collected the food article to a position above a set region that is set on a base surface of a tray or the like spaced apart from the collection position; and operating the left and right first members in opening directions at a position above the set region and lowering the food article obliquely downward with the scooping portion while limiting opening of an end portion of the food article with the second members to place the food article remaining in the shape of letter U in plan view in the set region, wherein the controller is configured to automatically and repeatedly perform the steps to form a food batch including a plurality of food articles in the set region.

10. A food arrangement device using a hand device for holding a food article with left and right finger-shaped portions that are configured to be operated to open and close, wherein each of the left and right finger-shaped portions includes a first member and a second member that are configured to be independently operated to open and close, the first member and the second member are disposed in a vicinity of each other in each of the left and right finger-shaped portion, and for each of the left and right finger-shaped portions, an inner edge portion of the first member is configured to be projected and retracted relative to an inner edge portion of the second member when the first member is being operated to open and close, the food arrangement device comprising a controller configured to perform the steps of:

holding a middle portion in a length direction of a food article located at a collection position with the left and right finger-shaped portions of the hand device to cause opposite end portions of the food article to hang down;

moving the hand device to a position above a set region that is spaced apart from the collection position; and lowering and laterally moving the hand device relative to the set region to bring the food article into contact with the set region from a hanging end side of the food article, cause the food article to lay down in a folded state, and discontinue the hold by the left and right finger-shaped portions.

11. A food batch formation device using a hand device for holding a food article with left and right finger-shaped portions that are configured to be operated to open and close, wherein each of the left and right finger-shaped portions includes a first member and a second member that are configured to be independently operated to open and close, the first member and the second member are disposed in a vicinity of each other in each of the left and right finger-shaped portion, and for each of the left and right finger-shaped portions, an inner edge portion of the first member is configured to be projected and retracted relative to an inner edge portion of the second member when the first member is being operated to open and close, the food batch formation device comprising a controller configured to perform the steps of:

holding a middle portion in a length direction of a food article located at a collection position by operating the left and right first members and the left and right second members in closing directions and lifting the hand device to collect the food article with opposite end portions of the food article hanging down;

moving the hand device that has collected the food article to a position above a set region that is spaced apart from the collection position; and lowering the hand device while laterally moving the hand device at the position above the set region and operating the left and right first members and the left and right second members in opening directions to place the food article in the set region in a state of being folded in half, wherein the controller is configured to automatically and repeatedly perform the steps to form a food batch including a plurality of food articles in the set region.

12. The food batch formation device according to claim 11, wherein a number of food articles forming the food batch is automatically changed according to sizes of the food articles to adjust a weight of the food batch to be within a set range.

13. The food batch formation device according to claim 12, further comprising:

an image-capturing means for capturing an image of a food article before being collected at the collection position, wherein a size of the food article is obtained from an image-capturing result of the image-capturing means.

14. The food batch formation device according to claim 12, wherein, when a size of the food article is smaller than a set size, collection of the food article is automatically prohibited.

15. The food batch formation device according to claim 11, wherein a plurality of rows and a plurality of columns for arranging food articles are set in the set region, and a number of columns in each row is automatically changed according to a size of a food article to adjust a weight of the food batch to be within a set range.

16. The food batch formation device according to claim 11, wherein
a plurality of rows and a plurality of columns for arranging food articles are set in the set region, and
a number of columns in each row, or a number of columns in each row and intervals between the columns are automatically changed according to a size of the food article to be placed at a beginning of each row.

* * * * *